US012622557B2

(12) United States Patent
Lee et al.

(10) Patent No.: US 12,622,557 B2
(45) Date of Patent: May 12, 2026

(54) METHOD OF AUTOMATICALLY ADJUSTING STRENGTH OF SUCTION POWER OF SUCTION MOTOR AND CORDLESS VACUUM CLEANER THEREFOR

(71) Applicant: Samsung Electronics Co., Ltd., Suwon-si (KR)

(72) Inventors: Seongu Lee, Suwon-si (KR); Hyunkoo Kang, Suwon-si (KR); Seehyun Kim, Suwon-si (KR); Sanghyuk Park, Suwon-si (KR); Yeongju Lee, Suwon-si (KR); Jaeshik Jeong, Suwon-si (KR); Jeonghee Cho, Suwon-si (KR); Jiwon Choi, Suwon-si (KR); Junggyun Han, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 69 days.

(21) Appl. No.: 18/136,287

(22) Filed: Apr. 18, 2023

(65) Prior Publication Data

US 2023/0329499 A1 Oct. 19, 2023

Related U.S. Application Data

(63) Continuation of application No. PCT/KR2023/005000, filed on Apr. 13, 2023.

(30) Foreign Application Priority Data

Apr. 15, 2022 (KR) ........................ 10-2022-0047180
Nov. 1, 2022 (KR) ........................ 10-2022-0143950

(51) Int. Cl.
*A47L 9/28* (2006.01)
*A47L 9/30* (2006.01)
*G05D 16/20* (2006.01)

(52) U.S. Cl.
CPC ........... *A47L 9/2842* (2013.01); *A47L 9/2821* (2013.01); *A47L 9/2826* (2013.01); *A47L 9/2831* (2013.01);
(Continued)

(58) Field of Classification Search
CPC .... A47L 9/2842; A47L 9/2821; A47L 9/2826; A47L 9/2831; A47L 9/2847; A47L 9/30;
(Continued)

(56) References Cited

U.S. PATENT DOCUMENTS 4,733,431 A * 3/1988 Martin .................. A47L 9/1472
96/418
5,255,409 A * 10/1993 Fujiwara ............... A47L 9/2831
15/412
(Continued)

FOREIGN PATENT DOCUMENTS

DE 102016118248 A1 5/2017
DE 102019104429 * 8/2020
(Continued)

OTHER PUBLICATIONS

International Search Report for International Application No. PCT/KR2023/005000; International Filing Date Apr. 13, 2023; Date of Mailing Jul. 25, 2023; 10 Pages.
(Continued)

*Primary Examiner* — Alexander Markoff
(74) *Attorney, Agent, or Firm* — CANTOR COLBURN LLP

(57) ABSTRACT

Provided is a method, performed by a cordless vacuum cleaner, of automatically adjusting the strength of a suction power of a suction motor. More specifically, the method may include obtaining data about a flow path pressure measured by a pressure sensor, obtaining data related to a load of the brush apparatus through a load detection sensor, identifying
(Continued)

a current usage environment state of the brush apparatus by applying the data related to the flow path pressure and the data related to the load of the brush apparatus to an AI model stored in a memory of the cordless vacuum cleaner, and adjusting the strength of the suction power of the suction motor, based on the identified current usage environment state of the brush apparatus.

19 Claims, 40 Drawing Sheets

(52) U.S. Cl.
CPC ............... *A47L 9/2847* (2013.01); *A47L 9/30* (2013.01); *G05D 16/2066* (2013.01)

(58) Field of Classification Search
CPC . A47L 5/26; A47L 9/04; A47L 9/0411; A47L 9/0438; A47L 9/1625; A47L 9/1641; A47L 9/22; A47L 9/28; G05D 16/2066; G01L 19/08; G06N 20/10
See application file for complete search history.

(56) References Cited

U.S. PATENT DOCUMENTS

| | | | |
|---|---|---|---|
| 5,381,584 A | | 1/1995 | Jyoraku et al. |
| 5,722,109 A | * | 3/1998 | Delmas .................. A47L 9/2894 |
| | | | 15/412 |
| 5,881,430 A | * | 3/1999 | Driessen ............... A47L 9/2847 |
| | | | 15/319 |
| 11,064,857 B2 | | 7/2021 | Kim |
| 2019/0387942 A1 | | 12/2019 | Truitt et al. |
| 2021/0007569 A1 | | 1/2021 | Howard et al. |
| 2021/0121033 A1 | | 4/2021 | Kwak et al. |
| 2021/0186291 A1 | * | 6/2021 | Nguyen .................. A47L 9/325 |
| 2021/0251451 A1 | | 8/2021 | Ko et al. |
| 2023/0292967 A1 | * | 9/2023 | Park ...................... A47L 9/2884 |
| | | | 15/319 |
| 2023/0329499 A1 | * | 10/2023 | Lee ........................ A47L 9/2826 |

FOREIGN PATENT DOCUMENTS

| | | | |
|---|---|---|---|
| EP | 0636341 | * | 2/1995 |
| EP | 0527567 B1 | | 10/1997 |
| EP | 2875766 B1 | | 10/2016 |
| FR | 2590471 | * | 5/1987 |
| GB | 2572433 B | | 11/2020 |
| JP | H0556898 B2 | | 3/1993 |
| JP | 5245080 A | | 9/1993 |
| JP | 5269064 A | | 10/1993 |
| JP | 678862 A | | 3/1994 |
| JP | H0759697 | * | 3/1995 |
| JP | 2573423 B2 | | 1/1997 |
| JP | 2573424 B2 | | 1/1997 |
| JP | 3446836 B2 | | 9/2003 |
| JP | 2010057647 A | | 3/2010 |
| JP | 2020151010 A | | 9/2020 |
| KR | 20090119638 A | | 11/2009 |
| KR | 20210050843 A | | 5/2021 |
| KR | 20210105207 A | | 8/2021 |
| KR | 20220019990 A | | 2/2022 |
| KR | 10-2022-0042746 | * | 4/2022 |
| WO | 2021167361 A1 | | 8/2021 |
| WO | 2022008869 A1 | | 1/2022 |
| WO | 2022008872 A1 | | 1/2022 |

OTHER PUBLICATIONS

Extended European Search Report corresponding to Application No. 23788617.1-1015; Dated Mar. 28, 2025.
European Office Action corresponding to Application No. 23788617. 1; Dated Nov. 20, 2025.

* cited by examiner

100

PROCESSOR (1001)
&
MEMORY (1900)

1000

SUCTION MOTOR (1110)
&
LOAD DETECTION SENSOR
(1134)

PRESSURE SENSOR
(1400)

Figure 5:
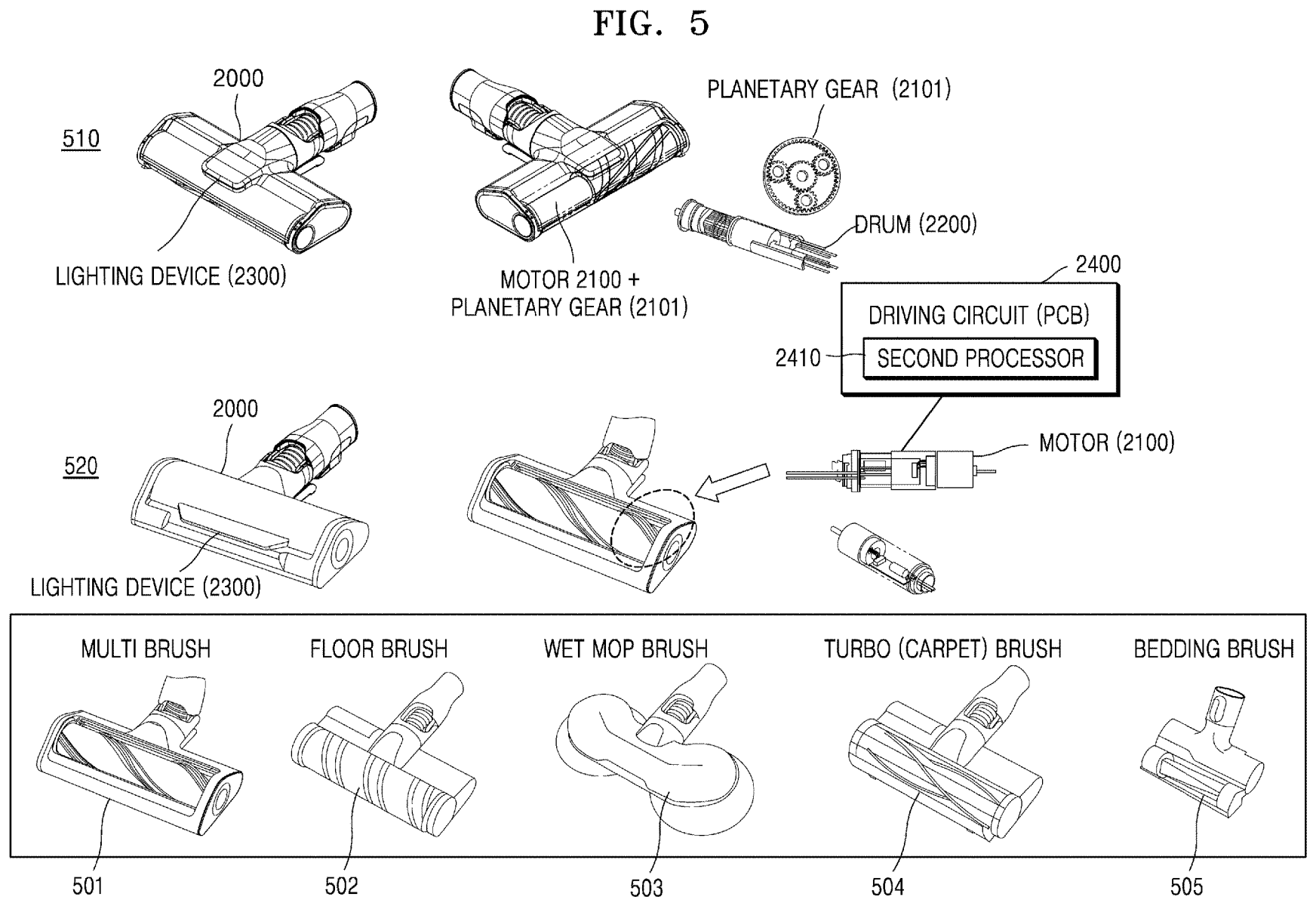

PLANETARY GEAR (2101)

DRUM (2200)

DRIVING CIRCUIT (PCB)

SECOND PROCESSOR

2400

2410

MOTOR (2100)

MOTOR 2100 + PLANETARY GEAR (2101)

2000

510

LIGHTING DEVICE (2300)

2000

520

LIGHTING DEVICE (2300)

MULTI BRUSH

FLOOR BRUSH

WET MOP BRUSH

TURBO (CARPET) BRUSH

BEDDING BRUSH

| Brush Type | ID RESISTANCE (A) | Battery 25V Max (6S1P) | | | Battery 29.2V Max (7S1P) | | | NOTE |
|---|---|---|---|---|---|---|---|---|
| | | 15.6 | 21.6 | 25.0 | 18.2 | 25.2 | 29.2 | |
| Wet Brush | Short | 3.105 | 4.299 | 4.976 | 3.622 | 5.016 | 5.812 | |
| (AI) MULTI Brush | 330K | 1.724 | 2.387 | 2.763 | 2.011 | 2.785 | 3.227 | |
| TURBO 2.0 Brush | 910,000 | 0.968 | 1.340 | 1.551 | 1.129 | 1.563 | 1.811 | |
| (AI) HARD FLOOR Brush | 2,200,000 | 0.490 | 0.678 | 0.785 | 0.571 | 0.791 | 0.917 | |
| SPARE | 6,800,000 | 0.177 | 0.284 | 0.284 | 0.207 | 0.287 | 0.332 | |
| Soft Brush | Open | 0 | 0 | 0 | 0 | 0 | 0 | |

| No | OPERATING CONDITIONS | USAGE ENVIRONMENT STATES | NORMAL MOD 1301 | | AI MODE 1302 | | NOTE |
|---|---|---|---|---|---|---|---|
| | | | POWER CONSUMPTION | RPM | POWER CONSUMPTION | RPM | |
| 1 | CONDITIONS #1 | HARD FLOOR | 115 | 3,800 | 70 | 2,000 | INCREASE USAGE TIME |
| 2 | CONDITIONS #2 | CARPET (NORMAL LOAD) | 115 | 3,800 | 115 | 3,800 | PREFER CLEANING EFFICIENCY |
| 3 | CONDITIONS #3 | CARPET (OVERLOAD) | 115 | 3,800 | 40 | 2,000 | IMPROVE USABILITY (OPERABILITY) |
| 4 | CONDITIONS #4 | MAT | 115 | 3,800 | 58 | 1,500 | IMPROVE USABILITY (OPERABILITY) |
| 5 | CONDITIONS #5 | LIFT (MOVEMENT) | 115 | 3,800 | 40 | 1,500 | INCREASE USAGE TIME |
| 6 | CONDITIONS #6 | CORNER | 115 | 3,800 | 115 | 1,500 | IMPROVE CLEANING EFFICIENCY |

FIG. 14

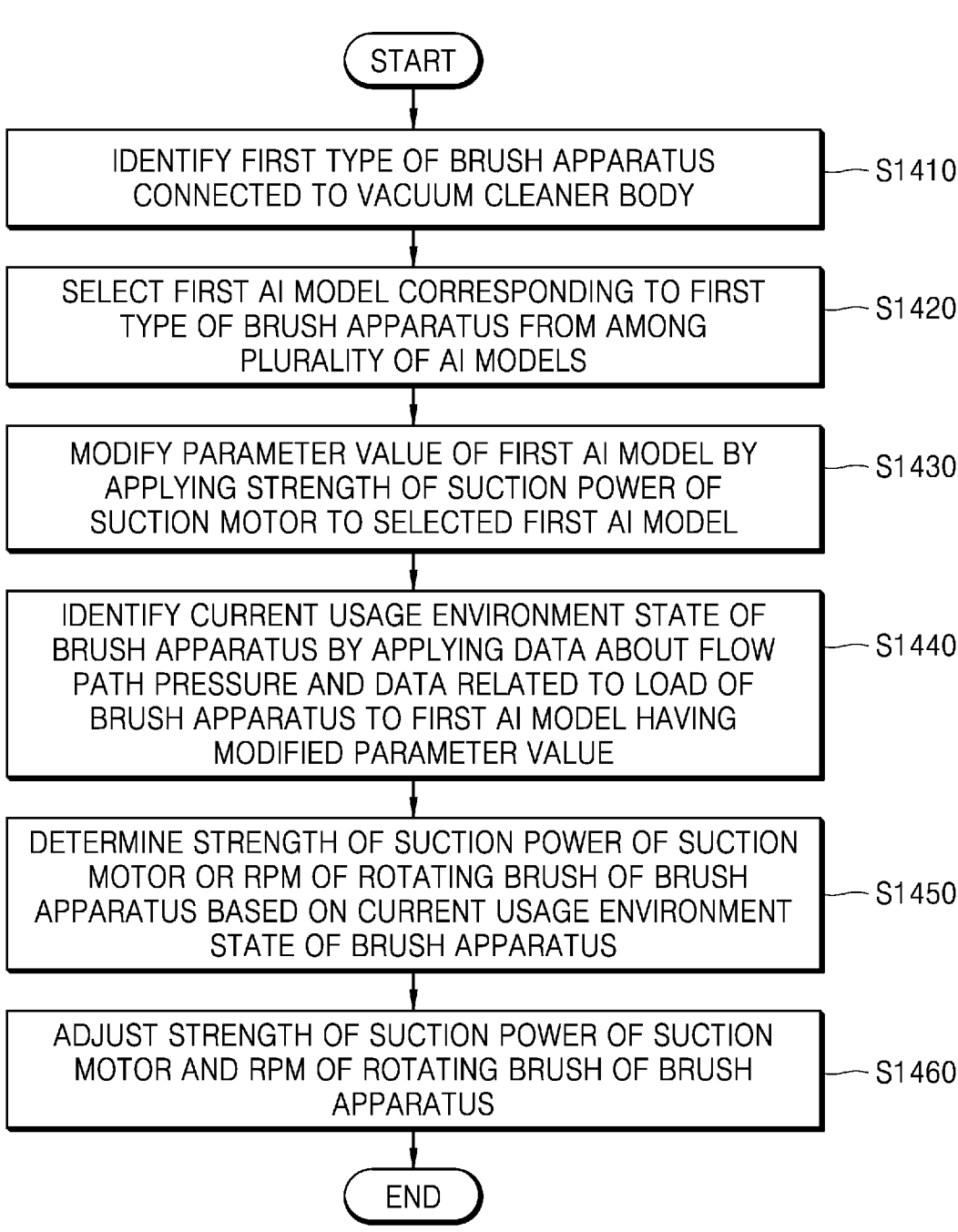

START

IDENTIFY FIRST TYPE OF BRUSH APPARATUS CONNECTED TO VACUUM CLEANER BODY ⸺ S1410

SELECT FIRST AI MODEL CORRESPONDING TO FIRST TYPE OF BRUSH APPARATUS FROM AMONG PLURALITY OF AI MODELS ⸺ S1420

MODIFY PARAMETER VALUE OF FIRST AI MODEL BY APPLYING STRENGTH OF SUCTION POWER OF SUCTION MOTOR TO SELECTED FIRST AI MODEL ⸺ S1430

IDENTIFY CURRENT USAGE ENVIRONMENT STATE OF BRUSH APPARATUS BY APPLYING DATA ABOUT FLOW PATH PRESSURE AND DATA RELATED TO LOAD OF BRUSH APPARATUS TO FIRST AI MODEL HAVING MODIFIED PARAMETER VALUE ⸺ S1440

DETERMINE STRENGTH OF SUCTION POWER OF SUCTION MOTOR OR RPM OF ROTATING BRUSH OF BRUSH APPARATUS BASED ON CURRENT USAGE ENVIRONMENT STATE OF BRUSH APPARATUS ⸺ S1450

ADJUST STRENGTH OF SUCTION POWER OF SUCTION MOTOR AND RPM OF ROTATING BRUSH OF BRUSH APPARATUS ⸺ S1460

END

FIG. 15C

<AI MULTI BRUSH : POWER CONSUMPTION OF SUCTION MOTOR 115W>

<AI HARD FLOOR BRUSH : POWER CONSUMPTION OF SUCTION MOTOR 58W>

| No | Operating conditions | Usage environment states | Operation information of cordless vacuum cleaner | | | Note | Start | Command (#8) | | | Parity | | | Stop |
|----|----|----|----|----|----|----|----|----|----|----|----|----|----|----|
| | | | Power consumption | RPM | Trip | | A | B | C | D | E | F | G | H |
| 1 | CONDITIONS #1 | HARD FLOOR | 70 | 2,000 | 4.0A | | 0 | 0 | 0 | 1 | 1 | 1 | 0 | 1 |
| 2 | CONDITIONS #2 | CARPET (NORMAL LOAD) | 115 | 3,800 | 4.9A | | 0 | 0 | 1 | 0 | 1 | 0 | 1 | 1 |
| 3 | CONDITIONS #3 | CARPET (OVERLOAD) | 40 | 2,000 | 4.9A | | 0 | 0 | 1 | 1 | 1 | 0 | 0 | 1 |
| 4 | CONDITIONS #4 | LIFT | 40 | 1,000 | 4.0A | | 0 | 1 | 0 | 0 | 0 | 1 | 1 | 1 |
| 5 | CONDITIONS #5 | MAT | 58 | 1,000 | 4.9A | | 0 | 1 | 0 | 1 | 0 | 1 | 0 | 1 |
| 6 | CONDITIONS #6 | STOP | 58 | 0 | 0 | | 0 | 1 | 1 | 0 | 0 | 0 | 1 | 1 |
| 7 | SPARE | | | | | | 0 | 1 | 1 | 1 | 0 | 0 | 0 | 1 |
| 8 | SPARE | | | | | | 0 | 0 | 0 | 0 | 1 | 1 | 1 | 1 |

| TYPE OF BRUSH APPARATUS | Start |
|:---:|:---:|
| A Brush | 11 |
| B Brush | 10 |
| C Brush | 01 |
| D Brush | 00 |

FIG. 26

| LIFT | |
|---|---|
| POWER CONSUMPTION | 40W |
| BRUSH RPM | 1,000RPM |
| LED | White |

2601

| HARD FLOOR | |
|---|---|
| POWER CONSUMPTION | 70W |
| BRUSH RPM | 2,000RPM |
| LED | Green |

2602

| MAT | |
|---|---|
| POWER CONSUMPTION | 58W |
| BRUSH RPM | 1,000RPM |
| LED | Yellow |

2603

| CARPET #1 | |
|---|---|
| POWER CONSUMPTION | 115W |
| BRUSH RPM | 3,800RPM |
| LED | Blue |

2604

| CARPET #2 | |
|---|---|
| POWER CONSUMPTION | 40W |
| BRUSH RPM | 2,000RPM |
| LED | Blue |

2605

| WALL (CORNER) | |
|---|---|
| POWER CONSUMPTION | 200W |
| BRUSH RPM | 2,000RPM |
| LED | Orange |

2606

FIG. 36
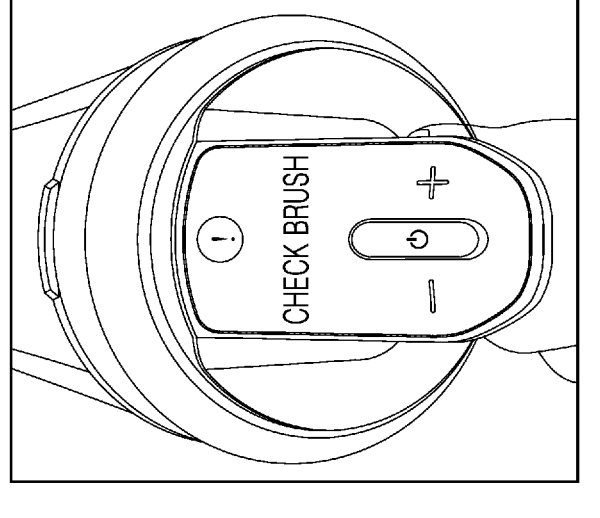
3603
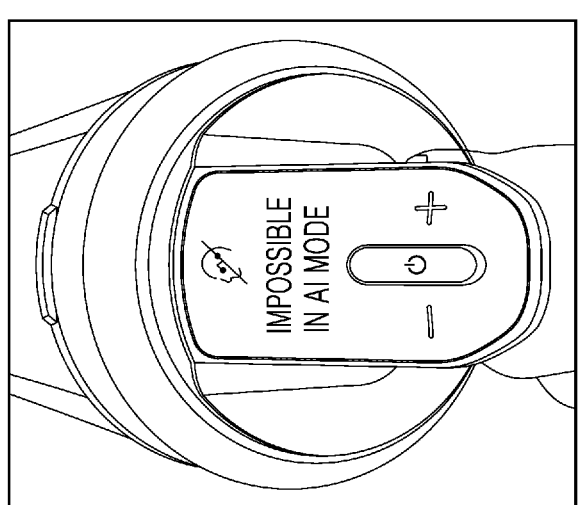
3602
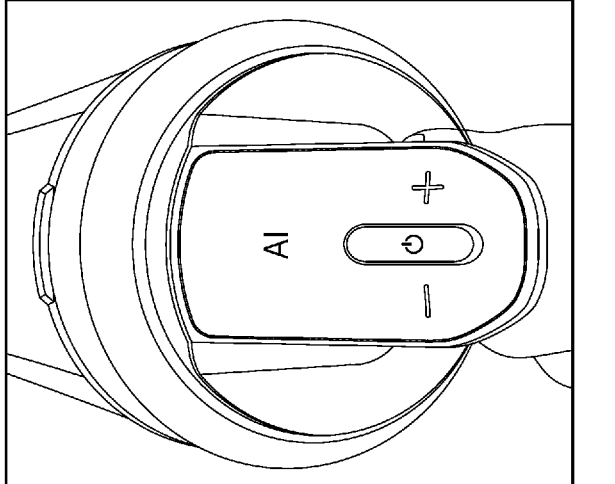
3601

METHOD OF AUTOMATICALLY ADJUSTING STRENGTH OF SUCTION POWER OF SUCTION MOTOR AND CORDLESS VACUUM CLEANER THEREFOR

CROSS-REFERENCE TO RELATED APPLICATION

This application is a continuation application, claiming priority under § 365(c), of International Application No. PCT/KR2023/005000, filed on Apr. 13, 2023, which is based on and claims the benefit of Korean patent application number 10-2022-0143950, filed on Nov. 1, 2022, in the Korean Intellectual Property Office and of Korean patent application number 10-2022-0047180, filed on Apr. 15, 2022, in the Korean Intellectual Property Office, the disclosures of which are incorporated by reference herein in their entireties.

TECHNICAL FIELD

An embodiment of the disclosure relates to a method, performed by a cordless vacuum cleaner, of automatically adjusting the strength of suction power of a suction motor.

BACKGROUND ART

A cordless vacuum cleaner is a type of vacuum cleaner that charges and uses a battery built in the vacuum cleaner itself without having to connect a wire to an outlet. The cordless vacuum cleaner includes a suction motor that generates suction power, and may suck up foreign substances such as dust along with air from a vacuum cleaner head (e.g., a brush) through the suction power generated by the suction motor, separate the sucked up foreign substances from the air, and collect dust.

Recently, types of vacuum cleaner heads or attachments (e.g., brushes) connected to a main body of the cordless vacuum cleaner have been diversified. The brushes, for example, of the cordless vacuum cleaner may be generally divided into a main brush used for cleaning the floor and an auxiliary brush used for a special purpose. In order to be applicable to various cleaning environments, types of auxiliary brushes used for special purposes have been further subdivided. However, it is inconvenient for the consumer to have several different types of brushes depending on the floor state and to directly replace the brushes.

DESCRIPTION OF EMBODIMENTS

Solution to Problem

According to an embodiment of the disclosure, a cordless vacuum cleaner may include a suction motor configured to form a vacuum inside the cordless vacuum cleaner, a pressure sensor configured to measure a flow path pressure inside the cordless vacuum cleaner, a load detection sensor configured to measure a load of a brush apparatus, a memory storing an artificial intelligence (AI) model trained to infer a usage environment state of the brush apparatus, and at least one processor. The at least one processor may be configured to obtain data about the flow path pressure measured by the pressure sensor from the pressure sensor. The at least one processor may be configured to obtain data related to the load of the brush apparatus through the load detection sensor. The at least one processor may be configured to identify a current usage environment state of the brush by applying the data related to the flow path pressure and the data related to the load of the brush apparatus to the AI model stored in the memory. The at least one processor may be configured to adjust the strength of the suction power of the suction motor, based on the identified current usage environment state of the brush apparatus.

According to an embodiment of the disclosure, a method, performed by a cordless vacuum cleaner, of automatically adjusting the strength of a suction power of a suction motor of the cordless vacuum cleaner may include obtaining data about a flow path pressure measured by a pressure sensor of the cordless vacuum cleaner, obtaining data related to a load of the brush apparatus through a load detection sensor of the cordless vacuum cleaner, identifying a current usage environment state of the brush apparatus by applying the data related to the flow path pressure and the data related to the load of the brush apparatus to an AI model stored in a memory of the cordless vacuum cleaner, and adjusting the strength of the suction power of the suction motor, based on the identified current usage environment state of the brush apparatus.

BRIEF DESCRIPTION OF DRAWINGS

FIG. 5 is a diagram illustrating a brush apparatus according to an embodiment of the disclosure.

FIG. 7 is a diagram illustrating an identification (ID) resistance of a brush apparatus according to an embodiment of the disclosure.

FIG. 13 is a diagram illustrating an AI mode according to an embodiment of the disclosure.

FIG. 14 is a diagram illustrating a method performed by a cordless vacuum cleaner of selecting an AI model according to the type of brush apparatus, according to an embodiment of the disclosure.

FIG. 15C is a diagram illustrating an operation of modifying a parameter value of the first SVM model corresponding to the multi-brush according to a change in power consumption of the suction motor.

FIG. 21 is a diagram illustrating a data format included in a signal transmitted between a vacuum cleaner body and a brush apparatus, according to an embodiment of the disclosure.

FIG. 23 is a diagram illustrating an operation in which a brush apparatus transmits a signal to a vacuum cleaner body, according to an embodiment of the disclosure.

FIG. 25 is a diagram illustrating an operation in which a vacuum cleaner body identifies a type of a brush apparatus based on a signal received from the brush apparatus, according to an embodiment of the disclosure.

FIG. 26 is a diagram illustrating an operation of controlling a lighting device according to a usage environment state of a brush apparatus, according to an embodiment of the disclosure.

FIG. 36 is a diagram illustrating a graphical user interface (GUI) of a cordless vacuum cleaner, according to an embodiment of the disclosure.

MODE OF DISCLOSURE

Figure 1:
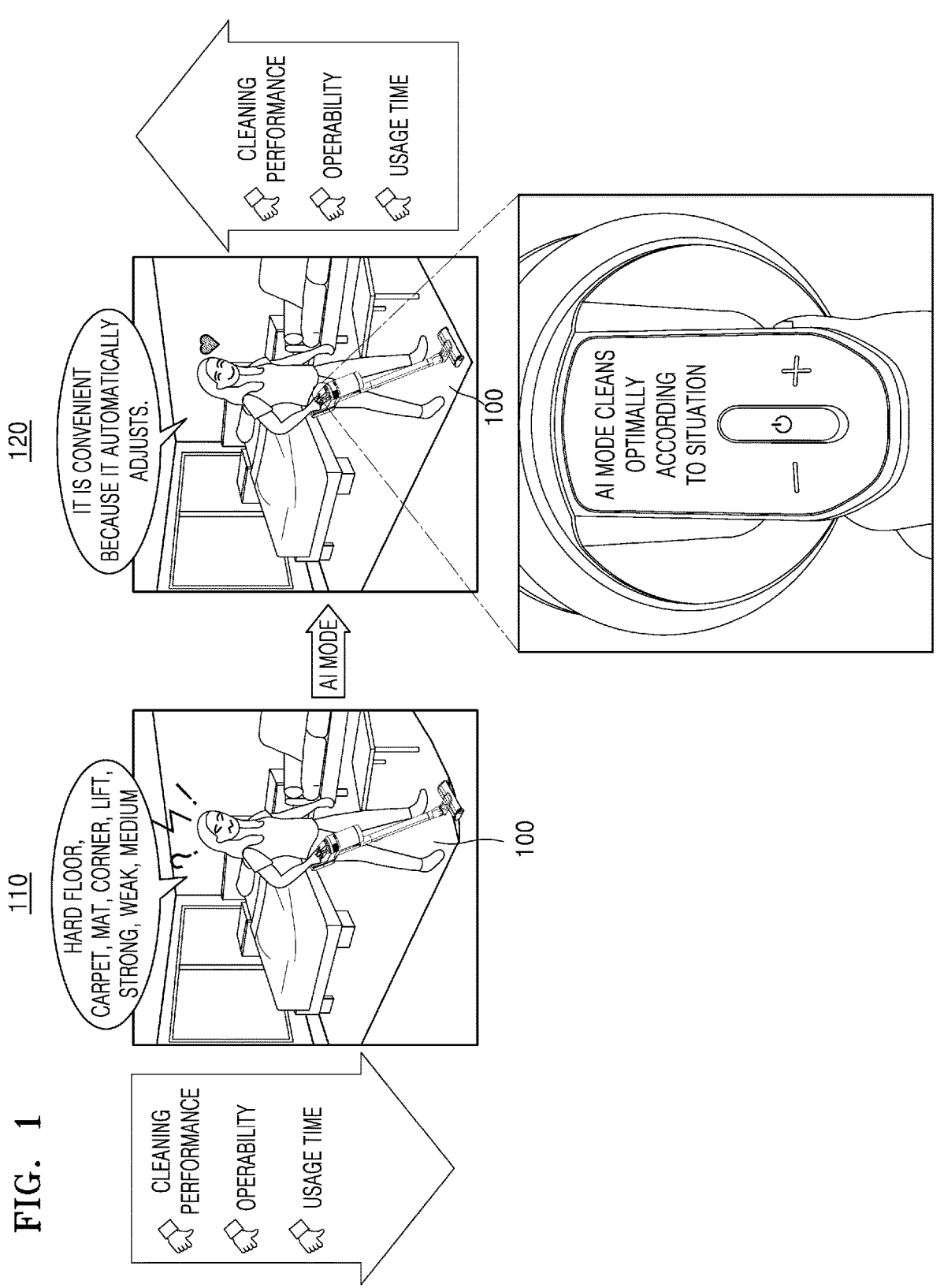
FIG. 1 is a diagram illustrating a cleaning system according to an embodiment of the disclosure.

Hereinafter, the terms used herein will be briefly described, and then, an embodiment of the disclosure will be described in detail.

The terms used herein are those general terms currently widely used in the art in consideration of functions in regard to an embodiment of the disclosure, but the terms may vary according to the intention of those of ordinary skill in the art, precedents, or new technology in the art. In addition, in a specific case, the applicant voluntarily may select terms, and in this case, the meanings of the terms are disclosed in corresponding description parts of embodiments of the disclosure. Thus, the terms used herein have to be defined based on the meanings of the terms together with the description throughout the disclosure.

Throughout the disclosure, the expression "at least one of a, b or c" indicates only a, only b, only c, both a and b, both a and c, both b and c, all of a, b, and c, or variations thereof.

Throughout the disclosure, when a certain part "includes" or "comprises" a certain component, unless there is a particular description contrary thereto, the part may further include or comprise other components, not excluding the other components. In addition, terms such as " . . . er/or" and "module" used herein refer to units that perform at least one function or operation, and the units may be implemented as hardware or software or as a combination of hardware and software.

An embodiment of the disclosure will now be described in detail with reference to accompanying drawings to be readily practiced by those of ordinary skill in the art. An embodiment of the disclosure may, however, be embodied in many different forms and should not be construed as limited to the embodiments set forth herein. Also, in order to clearly describe an embodiment of the disclosure, parts not related to description are omitted in the drawings, and like reference numerals in the drawings denote like parts throughout the disclosure.

FIG. 1 is a diagram illustrating a cleaning system according to an embodiment of the disclosure.

Referring to FIG. 1, a cleaning system according to an embodiment of the disclosure may include a cordless vacuum cleaner 100. The cordless vacuum cleaner 100 may refer to a vacuum cleaner that has a built-in rechargeable battery and requires no connection of a power cord to an outlet during cleaning. Although a cordless vacuum is described herein, it should be appreciated that the cleaning system may include a cord vacuum energized by a wall outlet without departing from the scope of the present disclosure. A user may move the cordless vacuum cleaner 100 back and forth using a handle mounted on a vacuum cleaner body so that a vacuum cleaner head or attachment such as a brush apparatus, for example, sucks up dust or garbage from a surface to be cleaned. Although a brush apparatus is described herein, it should be appreciated that other types of vacuum heads or attachments can be used with the vacuum cleaner without departing from the scope of the invention.

According to an embodiment of the disclosure, the cordless vacuum cleaner 100 may provide a normal mode and an artificial intelligence (AI) mode. The normal mode may be a manual mode in which the strength of suction power of a suction motor is adjusted according to an intensity (e.g., strong, medium, weak, etc.) selected by the user. The AI mode may be an automatic mode in which the strength of suction power of the suction motor or the drum revolutions per minute (hereinafter referred to as drum RPM) of the brush apparatus is automatically adjusted according to the usage environment state (e.g., the state of the surface to be cleaned (hard floor, carpet, mat, corner, etc.)) of the attachment or brush apparatus. The suction power is electrical input power consumed to operate the cordless vacuum cleaner 100, and the strength of the suction power of a suction motor 1110 may be expressed as power consumption of the suction motor 1110.

Referring to 110 of FIG. 1, when the cordless vacuum cleaner 100 operates in the normal mode, the user may need to switch between different types of vacuum attachments. For example, a user may need to replace the vacuum attachment such as a brush apparatus, for example, or manually adjust the strength of suction power of the suction motor according to the state or type of the surface to be cleaned. For example, in order to improve cleaning efficiency, when cleaning a carpet, the user may need to connect a first type of vacuum attachment such as a first type of brush apparatus, for example, suitable for the carpet to the vacuum cleaner body, and when cleaning a hard floor, the user may need to connect a different type of vacuum attachment such as a different type of brush apparatus suitable for the hard floor to the vacuum cleaner body. In addition, the user may need to adjust the suction power of the cordless vacuum 100 based on the floor type or the material of the cleaning area. For example, the user may need to directly increase the strength of the suction power of the cordless vacuum cleaner 100 when cleaning a rug or a wall corner, and may need to reduce the strength of the suction power of the cordless vacuum cleaner 100 when cleaning a mat because the cordless vacuum cleaner 100 is in close contact with the mat.

Meanwhile, when the cordless vacuum cleaner 100 operates in the normal mode, the user may maintain the strength of the suction power at the maximum level without properly adjusting the strength of the suction power according to circumstances. In this case, the battery usage time may be remarkably reduced, and when cleaning the mat, the brush apparatus may come into close contact with the mat, making it difficult for the user to push the cordless vacuum cleaner 100 back and forth.

Also, when the cordless vacuum cleaner 100 operates in the normal mode, the motor revolution speed (e.g., drum RPM) of the brush apparatus or the trip level of the brush apparatus may not be appropriately adjusted according to circumstances. The trip level is for preventing overload of the brush apparatus, and may mean a reference load value (e.g., a reference current value) for stopping the operation of the brush apparatus.

Referring to 120 of FIG. 1, when the cordless vacuum cleaner 100 operates in the AI mode, the cordless vacuum cleaner 100 may use an AI model trained to infer a usage environment state of the vacuum attachment or brush apparatus to infer the current usage environment state of the attachment or brush apparatus, and automatically adjust the strength of the suction power of the suction motor according to the current usage environment state of the attachment or brush apparatus. For example, when the state of the surface to be cleaned changes from a hard floor to a carpet, the cordless vacuum cleaner 100 may increase the strength of the suction power of the suction motor to improve cleaning performance. On the other hand, when the state of the surface to be cleaned changes from the carpet to the hard floor again, the cordless vacuum cleaner 100 may reduce the strength of the suction power of the suction motor again in order to increase the usage time of the battery (in order to reduce operation noise (e.g., drum friction noise of the brush apparatus, suction motor operation noise of the vacuum cleaner body, etc.)), or in order to reduce damage (e.g., scratches, nicks, abrasion, etc.) caused by friction of the surface to be cleaned by drum revolution of the brush apparatus. When the state of the surface to be cleaned changes from the hard floor to the mat, in order to increase operation convenience (or in order to reduce operation noise (e.g., drum friction noise of the brush apparatus, suction motor operation noise of the vacuum cleaner body, etc.)), or in order to reduce damage (e.g., scratches, nicks, abrasion, etc.) caused by friction of the surface to be cleaned by drum revolution of the brush apparatus, the cordless vacuum cleaner 100 may automatically reduce the strength of the suction power of the suction motor, and when the brush apparatus is lifted from the surface to be cleaned (an idle state), in order to increase the usage time of the battery (in order to reduce operation noise (e.g., drum friction noise of the brush apparatus, suction motor operation noise of the vacuum cleaner body, etc.)), the cordless vacuum cleaner 100 may reduce the strength of the suction power of the suction motor as much as possible.

According to an embodiment of the disclosure, when the cordless vacuum cleaner 100 operates in the AI mode, the cordless vacuum cleaner 100 may control the operation of the brush apparatus through communication between the vacuum cleaner body and the brush apparatus. The cordless vacuum cleaner 100 may dynamically adjust at least one of the motor revolution speed (e.g., drum RPM), the trip level, an operation (e.g., a color and brightness) of a lighting device, etc. of the brush apparatus according to the current usage environment state of the brush apparatus.

For example, when the state of the surface to be cleaned changes from the hard floor to the carpet, the cordless vacuum cleaner 100 may increase the motor revolution speed (e.g., drum RPM) of the brush apparatus to improve cleaning performance. On the other hand, when the state of the surface to be cleaned changes from the carpet to the hard floor again, the cordless vacuum cleaner 100 may reduce the motor revolution speed (e.g., drum RPM) of the brush apparatus again in order to increase the usage time of the battery (in order to reduce operation noise (e.g., drum friction noise of the brush apparatus, suction motor operation noise of the vacuum cleaner body, etc.)), or in order to reduce damage (e.g., scratches, nicks, abrasion, etc.) caused by friction of the surface to be cleaned by drum revolution of the brush apparatus. In addition, when the brush apparatus is lifted from the surface to be cleaned (e.g., idle state), the cordless vacuum cleaner 100 may reduce the motor revolution speed (e.g., drum RPM) of the brush apparatus as much as possible in order to increase the usage time of the battery (in order to reduce operation noise (e.g., drum friction noise of the brush apparatus, suction motor operation noise of the vacuum cleaner body, etc.))

Therefore, when the cordless vacuum cleaner 100 operates in the AI mode, the cordless vacuum cleaner 100 may automatically adjust the strength of the suction power of the suction motor and/or the motor revolution speed of the brush apparatus according to the current usage environment state of the brush apparatus inferred by the AI model, thereby efficiently improving cleaning performance, operation convenience of the user, usage time of the battery, operation noise (e.g., drum friction noise of the brush apparatus, suction motor operation noise of the vacuum cleaner body, etc.), damage (e.g., scratches, nicks, abrasion, etc.) caused by friction of the surface to be cleaned by drum revolution of the brush apparatus, etc. In addition, the cordless vacuum cleaner 100 may provide optimal control suitable for various living environments of users by using the AI model.

An operation in which the cordless vacuum cleaner 100 provides optimal control by using the AI model is described in detail below with reference to FIG. 8, and hereinafter, with reference to FIG. 2, the configuration of the cordless vacuum cleaner 100 according to an embodiment of the disclosure is described.

Figure 2:
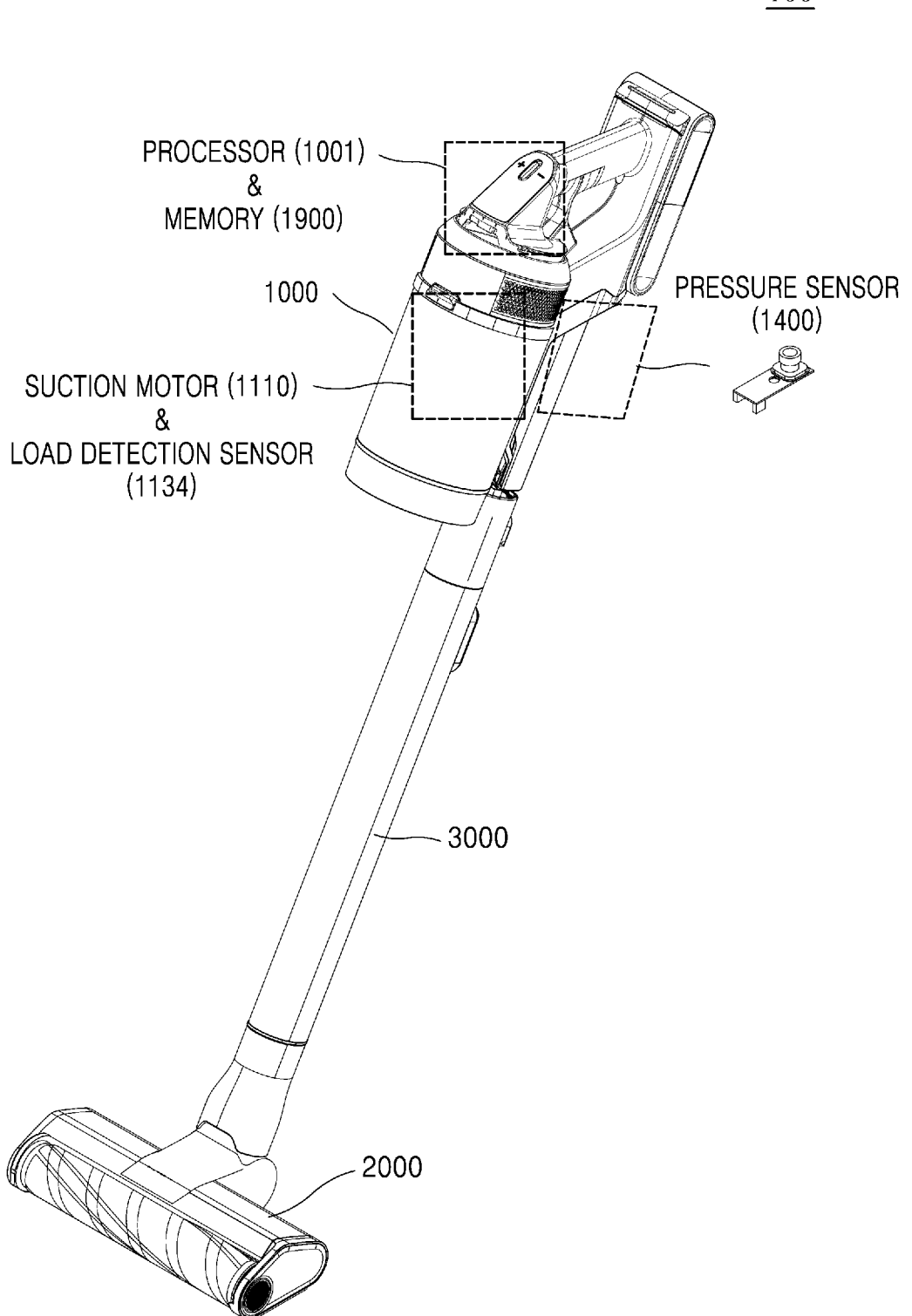
FIG. 2 is a diagram illustrating a cordless vacuum cleaner according to an embodiment of the disclosure.

FIG. 2 is a diagram illustrating the cordless vacuum cleaner 100 according to an embodiment of the disclosure.

Referring to FIG. 2, the cordless vacuum cleaner 100 according to an embodiment of the disclosure may be a stick-type vacuum cleaner including a vacuum cleaner body 1000, a brush apparatus 2000, and an extension tube 3000. However, not all of the components shown in FIG. 2 are indispensable components. The cordless vacuum cleaner 100 may be implemented with more components than those shown in FIG. 2, or the cordless vacuum cleaner 100 may be implemented with fewer components. For example, the cordless vacuum cleaner 100 may be implemented with the vacuum cleaner body 1000 and the brush apparatus 2000, except for the extension tube 3000. In addition, the cordless vacuum cleaner 100 may further include a cleaning station (not shown) discharging dust from the vacuum cleaner body 1000 and charging a battery. Each configuration is described below. Although a brush apparatus 2000 is described, it should be appreciated that other types of attachments can be used without departing from the scope of the present disclosure.

The vacuum cleaner body 1000 is a part that a user may hold and move when cleaning, and may include a suction motor 1110 that forms a vacuum inside the cordless vacuum cleaner 100. The suction motor 1110 may be located in a dust collection bin (a dust bin) in which foreign substances sucked up from a surface to be cleaned (e.g., a floor, bedding, sofa, etc.) is accommodated. The vacuum cleaner body 1000 may further include at least one processor 1001, a load detection sensor 1134, a pressure sensor 1400, and a memory 1900 in addition to the suction motor 1110, but is not limited thereto.

The load detection sensor 1134 may be a sensor that measures the load of the brush apparatus 2000 or may be a load detection (sensing) circuit, but is not limited thereto. The pressure sensor 1400 may be a sensor that measures a flow path pressure inside the cordless vacuum cleaner 100.

The memory 1900 may store an AI model trained to infer the usage environment state of the brush apparatus 2000. In addition, the at least one processor 1001 may obtain data about the flow path pressure measured by the pressure sensor 1400 from the pressure sensor 1400, and may obtain data related to the load of the brush apparatus 2000 through the load detection sensor 1134. In addition, the at least one processor 1001 may identify the current usage environment state of the brush apparatus 2000 by applying the data about the flow path pressure and the data related to the load of the brush apparatus 2000 to the AI model stored in the memory 1900. The at least one processor 1001 may adjust the strength of the suction power of the suction motor 1110 based on the current usage environment state of the brush apparatus 2000. The vacuum cleaner body 1000 is described in detail below with reference to FIG. 3.

The brush apparatus 2000 is a device that is in close contact with the surface to be cleaned and may suck up air and foreign substances from the surface to be cleaned. The brush apparatus 2000 may also be expressed as a vacuum cleaner head or vacuum attachment. The brush apparatus 2000 may be rotatably coupled to the extension tube 3000. The brush apparatus 2000 may include a motor, a drum to which a rotating brush is attached, etc., but is not limited thereto. According to an embodiment of the disclosure, the brush apparatus 2000 may further include at least one processor controlling communication with the vacuum cleaner body 1000. According to a non-limiting embodiment, the brush apparatus 2000 can be detachably coupled to the vacuum cleaner and can be replaced with different types of vacuum heads or vacuum attachments. The types of the brush apparatus 2000 may vary, and are described in detail below with reference to FIG. 5.

The extension tube 3000 may be formed as a pipe or hollow conduit having a certain rigidity, or can be formed as a flexible hose. The extension tube 3000 may transfer the suction power generated through the suction motor 1110 of the vacuum cleaner body 1000 to the brush apparatus 2000 and move air and foreign substances sucked up through the brush apparatus 2000 to the vacuum cleaner body 1000. The extension tube 3000 may be detachably connected to the brush apparatus 2000. The extension tube 3000 may be formed in multiple stages between the vacuum cleaner body 1000 and the brush apparatus 2000. The number of extension tubes 3000 may be two or more.

According to an embodiment of the disclosure, each of the vacuum cleaner body 1000, the brush apparatus 2000, and the extension tube 3000 included in the cordless vacuum cleaner 100 may include a power line (e.g., +power line and −power line) and a signal line.

The power line may be a line transferring power supplied from the battery 1500 to the vacuum cleaner body 1000 and the brush apparatus 2000 connected to the vacuum cleaner body 1000. The signal line is different from the power line and may be a line transmitting and receiving signals between the vacuum cleaner body 1000 and the brush apparatus 2000. The signal line may be implemented to be connected to the power line within the brush apparatus 2000.

According to an embodiment of the disclosure, each of the at least one processor 1001 of the vacuum cleaner body 1000 and the processor of the brush apparatus 2000 may control an operation of a switch device connected to the signal line, thereby performing two-way communication between the vacuum cleaner body 1000 and the brush apparatus 2000. Hereinafter, when the vacuum cleaner body 1000 and the brush apparatus 2000 communicate through the signal line, communication between the vacuum cleaner body 1000 and the brush apparatus 2000 may be defined as 'signal line communication'. Signal line communication is described in detail below with reference to FIGS. 20 to 24.

Meanwhile, the vacuum cleaner body 1000 and the brush apparatus 2000 may communicate using an inter integrated circuit (I2C) or a universal asynchronous receiver/transmitter (UART). An operation in which the vacuum cleaner body 1000 and the brush apparatus 2000 communicate using the I2C or the UART is described in detail below with reference to FIGS. 32 to 38.

According to an embodiment of the disclosure, the vacuum cleaner body 1000 may not only detect whether the brush apparatus 2000 is attached or detached, but also identify the type of the brush apparatus 2000 and adaptively control the operation (e.g., drum RPM) of the brush apparatus 2000 according to the usage environment state (e.g., a hard floor, a carpet, a mat, a corner, a state of being lifted from the surface to be cleaned, etc.) of the brush apparatus 2000. For example, the vacuum cleaner body 1000 may transmit a signal controlling the operation of the brush apparatus 2000 to the brush apparatus 2000 by periodically communicating with the brush apparatus 2000. A method performed by the vacuum cleaner body 1000 of adaptively controlling the operation (e.g., drum RPM) of the brush apparatus 2000 is described in detail below with reference to FIG. 23, and hereinafter, the configuration of the vacuum cleaner body 1000 is described in more detail below with reference to FIG. 3.

Figure 3:
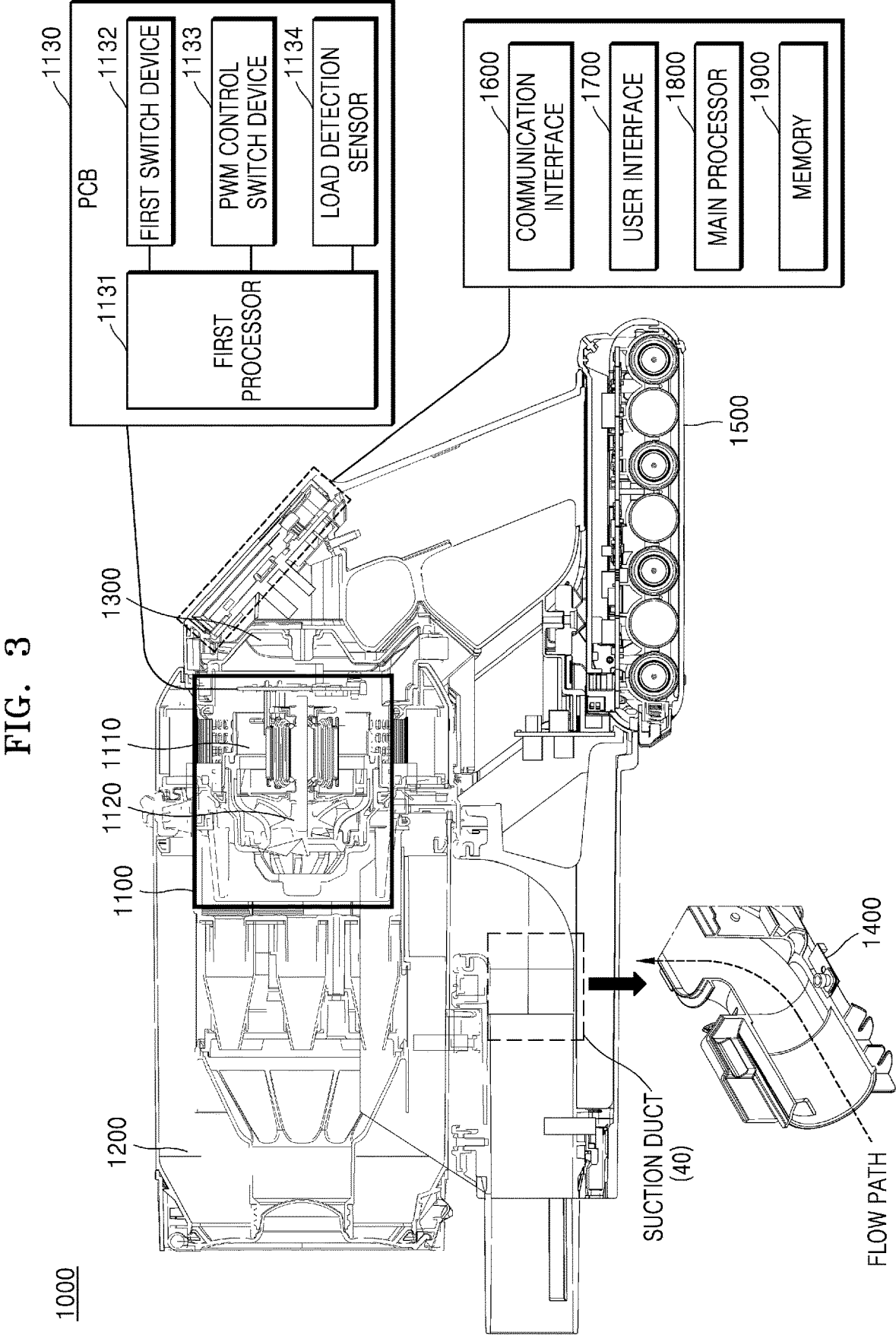
FIG. 3 is a diagram illustrating a vacuum cleaner body according to an embodiment of the disclosure.

FIG. 3 is a diagram illustrating the vacuum cleaner body 1000 according to an embodiment of the disclosure.

The vacuum cleaner body 1000 may include a handle provided to be gripped by a user. Accordingly, the vacuum cleaner body 1000 may be expressed as a handy body. The user may hold the handle and move the vacuum cleaner body 1000 and the brush apparatus 2000 forward and backward.

Referring to FIG. 3, the vacuum cleaner body 1000 may include a suction power generating device (hereinafter, referred to as a motor assembly 1100) generating a suction power required to suck up foreign substances on a surface to be cleaned, a dust collector 1200 in which foreign substances sucked up from the surface to be cleaned are accommodated (referred to as a dust canister), a filter unit 1300, a pressure sensor 1400, a battery 1500 capable of supplying power to the motor assembly 1100, a communication interface 1600, a user interface 1700, at least one processor 1001 (e.g., a main processor 1800), and a memory 1900. However, not all of the components shown in FIG. 3 are indispensable components. The vacuum cleaner body 1000 may be implemented with more or fewer components than those shown in FIG. 3.

Each of the components is described below.

The motor assembly 1100 may include a suction motor 1110 that converts electric power into mechanical rotational force, a fan 1120 that is connected to the suction motor 1110 and rotates, and a driving circuit 1130 (included in a printed circuit board connected to the suction motor 1110. The suction motor 1110 may generate a vacuum or "suction force" inside the cordless vacuum cleaner 100. Here, the "vacuum" means a state lower than atmospheric pressure. The suction motor 1110 may include a brushless motor (hereinafter referred to as a brushless direct current (BLDC) motor), but is not limited thereto.

The driving circuit 1130 may control the suction motor 1110, and include a processor (hereinafter referred to as a first processor 1131) that controls communication with the brush apparatus 2000, a first switch device 1132 connected to a signal line, a switch device (hereinafter, referred to as a pulse width modulation (PWM) control switch device 1133 (hereinafter referred to as a FET, a transistor, an insulated gate bipolar transistor (IGBT), etc.) that controls power supply to the brush apparatus 2000, a load detection sensor 1134 (e.g., a shunt resistor, a shunt resistor and amplification circuit (OP-AMP), a current detection sensor, a magnetic field detection sensor (non-contact method), etc.) that detects the load of the brush apparatus 2000, but is not limited thereto. Hereinafter, for convenience of description, the FET is described as an example of the PWM control switch device 1133, and the shunt resistor is described as an example of the load detection sensor 1134.

The first processor 1131 may obtain data (hereinafter referred to as state data) related to the state of the suction motor 1110 and transfer the state data of the suction motor 1110 to the main processor 1800. In addition, the first processor 1131 may control an operation (e.g., turn on or off) of the first switch device 1132 connected to the signal line to transmit a signal (hereinafter referred to as a first signal) to the brush apparatus 2000 through the signal line. The first switch device 1132 is a device capable of allowing the signal line to be in a low state. For example, the first switch device 1132 is a device that may allow the voltage of the signal line to be 0 V. The first signal may include data indicating at least one of a target RPM of a rotating brush of the brush apparatus 2000 (hereinafter also referred to as a target drum RPM), a target trip level of the brush apparatus 2000, or power consumption of the suction motor 1110, but is not limited thereto. For example, the first signal may include data for controlling a lighting device included in the brush apparatus 2000. The first signal may be implemented with a preset number of bits. For example, the first signal may be implemented with 5 bits or 8 bits, and may have a transmission period of 10 milliseconds (ms) per bit, but is not limited thereto.

The first processor 1131 may detect a signal (hereinafter referred to as a second signal) transmitted through the signal line by the brush apparatus 2000. The second signal may include data indicating the current state of the brush apparatus 2000, but is not limited thereto. For example, the second signal may include data (e.g., a current drum RPM, a current trip level, a current setting value of the lighting device, etc.) related to a current operating condition. Also, the second signal may further include data indicating the type of the brush apparatus 2000. The first processor 1131 may transmit data indicating the current state of the brush apparatus 2000 or data indicating the type of the brush apparatus 2000 included in the second signal to the main processor 1800. The driving circuit 1130 of the motor assembly 1100 is described in more detail below with reference to FIG. 20.

The motor assembly 1100 may be located within the dust collector 1200. The dust collector 1200 may be configured to filter out and collect dust or dirt in air introduced through the brush apparatus 2000. The dust collector 1200 may be provided to be separable from the vacuum cleaner body 1000.

The dust collector 1200 may collect foreign substances through a cyclone method of separating foreign substances using a centrifugal force. The air from which foreign substances are removed through the cyclone method may be discharged to the outside of the vacuum cleaner body 1000, and the foreign substances may be stored in the dust collector 1200. A multi-cyclone may be disposed inside the dust collector 1200. The dust collector 1200 may be provided to collect foreign substances on the lower side of the multi-cyclone. The dust collector 1200 may include a dust collector door provided to open the dust collector 1200 when connected to a cleaning station. The dust collector 1200 may include a first dust collector that primarily collects relatively large foreign substances and a second dust collector that collects relatively small foreign substances by the multi-cyclone. Both the first dust collector and the second dust collector may be provided to be opened to the outside when the dust collector door is opened.

The filter unit 1300 may filter ultra-fine dust that is not filtered out by the dust collector 1200. The filter unit 1300 may include a discharge port through which air passing through a filter is discharged to the outside of the cordless vacuum cleaner 100. The filter unit 1300 may include a motor filter, a HEPA filter, etc., but is not limited thereto.

The pressure sensor 1400 may measure the pressure inside a flow path (hereinafter, also referred to as flow path pressure). In at least one non-limiting embodiment, the pressure sensor 1400 is provided at the suction end (e.g., the suction duct 40) of the cordless vacuum cleaner 100, and is configured to measure the static pressure and measure a change in a flow rate at a corresponding location. Various types of pressure sensors 1400 can be used including, but not limited to, an absolute pressure sensor or a relative pressure sensor. When the pressure sensor 1400 is an absolute pressure sensor, the main processor 1800 may use the pressure sensor 1400 to sense a first pressure value before operating the suction motor 1110. Also, the main processor 1800 may sense a second pressure value after driving the suction motor 1110 at the target RPM, and may use a difference between the first pressure value and the second pressure value as a pressure value inside the flow path. In this regard, the first pressure value may be a pressure value due to internal/external influences such as weather, altitude, the state of the cordless vacuum cleaner 100, and an inflow amount of dust, and the second pressure value may be a pressure value due to internal/external influences such as altitude, the state of the cordless vacuum cleaner 100, and an inflow amount of dust, and the difference between the first pressure value and the second pressure value may be a pressure value caused by driving the suction motor 1110. Therefore, when the difference between the first pressure value and the second pressure value is used as the pressure value inside the flow path, internal/external influences other than the suction motor 1110 may be minimized.

The flow path pressure measured by the pressure sensor 1400 may be used to identify the current usage environment state of the brush apparatus 2000 (e.g., the state of a surface to be cleaned (a hard floor, a carpet, a mat, a corner, etc.), a state of being lifted from the surface to be cleaned, etc.), or may be used to measure the suction power that changes according to a degree of contamination or dust collection of the dust collector 1200.

According to a non-limiting embodiment, the pressure sensor 1400 may be located at the suction end (e.g., the suction duct 40). The suction duct 40 may be a structure that connects the dust collector 1200 and the extension tube 3000 or the dust collector 1200 and the brush apparatus 2000 so that a fluid including foreign substances may move to the dust collector 1200. According to a non-limiting embodiment, the pressure sensor 1400 may be located at the end of a straight part of the suction duct 40 (or at an inflection point between the straight and curved parts) of the suction duct 40 in consideration of foreign substances/dust contamination, but is not limited thereto. According to a non-limiting embodiment, the pressure sensor 1400 may be located in the middle of the straight part of the suction duct 40. Meanwhile, when the pressure sensor 1400 is located in the suction duct 40, because the pressure sensor 1400 is located at the front end of the suction motor 1110 generating the suction power, the pressure sensor 1400 may be implemented as a negative pressure sensor.

According to a non-limiting embodiment of the present disclosure, a case in which the pressure sensor 1400 is located in the suction duct 40 is described as an example, but is not limited thereto. The pressure sensor 1400 may be located at a discharge end (e.g., within the motor assembly 1100). When the pressure sensor 1400 is located at the discharge end, because the pressure sensor 1400 is located at the rear end of the suction motor 1110, the pressure sensor 1400 may be implemented as a positive pressure sensor. In addition, a plurality of pressure sensors 1400 may be provided in the cordless vacuum cleaner 100.

The battery 1500 may be separably mounted on the vacuum cleaner body 1000. The battery 1500 may be electrically connected to a charging terminal provided in the cleaning station (not shown). The battery 1500 may be charged by receiving power from the charging terminal. The cleaning station may be a device discharging dust from the cordless vacuum cleaner 100 and charging the battery 1500. The cordless vacuum cleaner 100 may be mounted (docked) in the cleaning station to discharge dust, charge the battery 1500, or be stored.

The vacuum cleaner body 1000 may include the communication interface 1600 for communicating with an external device. For example, the vacuum cleaner body 1000 may communicate with the cleaning station (or a server device) through the communication interface 1600. The communication interface 1600 may include a short-range wireless communication interface and a long-range wireless communication interface. The short-range wireless communication interface may include a Bluetooth communication interface, a Bluetooth Low Energy (BLE) communication interface, a near field communication (NFC) interface, a WLAN (Wi-Fi) communication interface, a Zigbee communication interface, an infrared (Ir), an Infrared Data Association (IrDA) communication interface, a Wi-Fi Direct (WFD) communication interface, an ultra wideband (UWB) communication interface, and an Ant+ communication interface, but is not limited thereto.

The user interface 1700 may be provided on a handle. The user interface 1700 may include an input interface and an output interface. The vacuum cleaner body 1000 may receive a user input related to the operation of the cordless vacuum cleaner 100 through the user interface 1700 and may output information related to the operation of the cordless vacuum cleaner 100. The input interface may include a power button, a suction power intensity control button, etc. The output interface may include an LED display, an LCD, a touch screen, etc., but is not limited thereto.

The vacuum cleaner body 1000 may include the at least one processor 1001. The vacuum cleaner body 1000 may include one processor or a plurality of processors. For example, the vacuum cleaner body 1000 may include the main processor 1800 connected to the user interface 1700 and the first processor 1131 connected to the suction motor 1110. The at least one processor 1001 may control overall operations of the cordless vacuum cleaner 100. For example, the at least one processor 1001 may determine the power consumption (strength of the suction power) of the suction motor 1110, the drum RPM of the brush apparatus 2000, the trip level of the brush apparatus 2000, etc.

The at least one processor 1001 according to the disclosure may include at least one a central processing unit (CPU), a graphics processing unit (GPU), an accelerated processing unit (APU), a many integrated core (MIC), a digital signal processor (DSP), or a neural processing unit (NPU). The at least one processor 1001 may be implemented in the form of an integrated system on chip (SoC) including one or more electronic components. Each of the at least one processor 1001 may be implemented as separate hardware (H/W). The at least one processor 1001 may be expressed as a microprocessor controller (MICOM), a microprocessor unit (MPU), or a microcontroller unit (MCU).

The at least one processor 1001 according to the disclosure may be implemented as a single core processor or as a multicore processor.

The memory 1900 may store programs for processing and control of the at least one processor 1001 or may store input/output data. For example, the memory 1900 may store a previously trained AI model (e.g., a support vector machine (SVM) algorithm, etc.), state data of the suction motor 1110, a measurement value of the pressure sensor 1400, state data of the battery 1500, state data of the brush apparatus 2000, error occurrence data, the power consumption of the suction motor 1110 corresponding to operating conditions, a RPM of the drum to which a rotating brush is attached, trip level, etc. The trip level is for preventing overload of the brush apparatus 2000 and may mean a reference load value (e.g., a reference current value) for stopping the operation of the brush apparatus 2000.

Hereinafter, operations of processors of the cordless vacuum cleaner 100 are described in detail with reference to FIG. 4.

Figure 4:
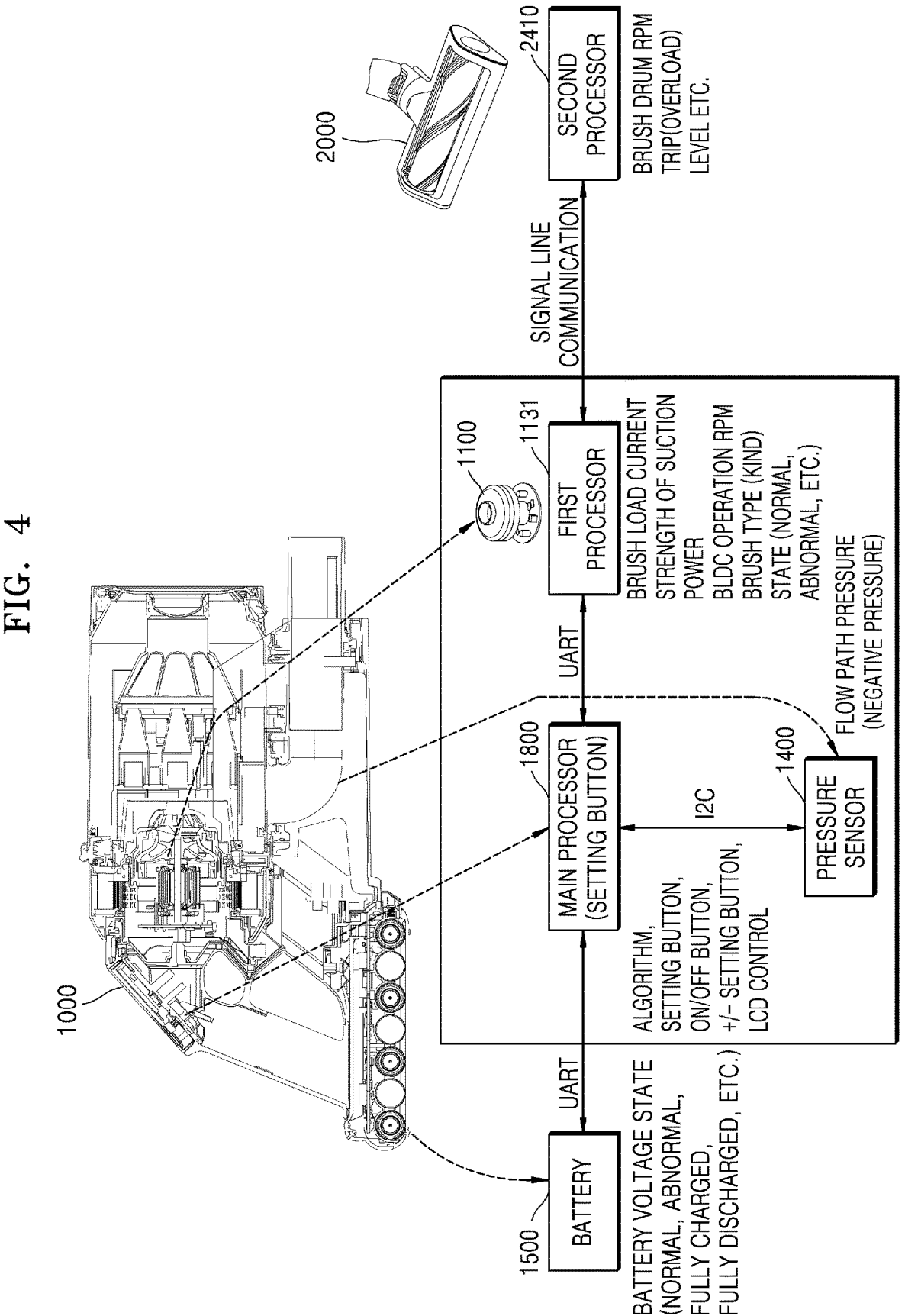
FIG. 4 is a diagram illustrating operations of processors of a cordless vacuum cleaner, according to an embodiment of the disclosure.

FIG. 4 is a diagram illustrating operations of processors of the cordless vacuum cleaner 100 according to an embodiment of the disclosure.

Referring to FIG. 4, the main processor 1800 may determine states of components in the cordless vacuum cleaner 100 by communicating with the battery 1500, the pressure sensor 1400, and the first processor 1131 in the motor assembly 1100. In this case, the main processor 1800 may communicate with each component using an UART or an I2C, but is not limited thereto. For example, the main processor 1800 may obtain data about a voltage state (e.g., normal, abnormal, fully charged, fully discharged, etc.) of the battery 1500 from the battery 1500 using the UART. The main processor 1800 may obtain data about a flow path pressure from the pressure sensor 1400 using the I2C.

In addition, the main processor 1800 may use the UART from the first processor 1131 connected to the suction motor 1110 to obtain data about the strength of the suction power, the RPM of the suction motor 1110, and the state of the suction motor 1110 (e.g., normal, abnormal, etc.) Suction power is electrical power consumed to operate the cordless vacuum cleaner 100, and may be expressed as power consumption. The main processor 1800 may obtain data related to the load of the brush apparatus 2000 and data related to the type of the brush apparatus 2000 from the first processor 1131.

Meanwhile, the first processor 1131 may obtain state data (e.g., a drum RPM, a trip level, normal, abnormal, etc.) of the brush apparatus 2000 from the brush apparatus 2000 through signal line communication with the second processor 2410 of the brush apparatus 2000. In this regard, the first processor 1131 may transfer the state data of the brush apparatus 2000 to the main processor 1800 through the UART. According to an embodiment of the disclosure, the first processor 1131 may transfer the state data of the suction motor 1110 and the state data of the brush apparatus 2000 to the main processor 1800 at different periods. For example, the first processor 1131 may transfer the state data of the suction motor 1110 to the main processor 1800 once every 0.02 seconds, and may transfer the state data of the brush apparatus 2000 once every 0.2 seconds to the main processor 1800, but is not limited thereto.

When the first processor 1131 of the vacuum cleaner body 1000 and the second processor 2410 of the brush apparatus 2000 are connected through the UART or the I2C, high impedance effects due to lines inside the extension tube 3000 and electrostatic discharge (ESD) and/or damaging (e.g., exceeding the maximum voltage of a micom AD port) of a circuit device due to overvoltage may be problematic. Accordingly, according to an embodiment of the disclosure, the first processor 1131 of the vacuum cleaner body 1000 and the second processor 2410 of the brush apparatus 2000 communicate through signal line communication instead of the UART or the I2C. At this time, the circuit for signal line communication may include a voltage division circuit (hereinafter referred to as voltage divider) to prevent damaging of the circuit device due to the overvoltage, power supply noise, surge, electrical overstress (ESD), electrical discharge (EOS), etc. However, communication between the first processor 1131 of the vacuum cleaner body 1000 and the second processor 2410 of the brush apparatus 2000 is not limited to signal line communication.

According to an embodiment of the disclosure, when a noise reduction circuit is applied to the vacuum cleaner body 1000 and the brush apparatus 2000, the first processor 1131 of the vacuum cleaner body 1000 and the second processor 2410 of the brush apparatus 2000 may communicate using the UART or the I2C. The noise reduction circuit may include at least one of a low pass filter, a high pass filter, a band pass filter, a damping resistor, or a distribution resistor, but is not limited to thereto. According to an embodiment of the disclosure, when a level shifter circuit is applied to the vacuum cleaner body 1000 or the brush apparatus 2000, the first processor 1131 of the vacuum cleaner body 1000 and the second processor 2410 of the brush apparatus 2000 may communicate using the UART or the I2C. Various communication methods between the vacuum cleaner body 1000 and the brush apparatus 2000 are described in detail below with reference to FIGS. 20 and 27 to 34. Hereinafter, for convenience of description, a case in which the vacuum cleaner body 1000 and the brush apparatus 2000 communicate through signal line communication is described as a main example.

Meanwhile, the main processor 1800 may receive a user input with respect to a setting button (e.g., an ON/OFF button, and a +/−setting button) included in the user interface 1700 and may control the output of an LCD. The main processor 1800 may use a previously strained AI model (e.g., an SVM algorithm) to identify the usage environment state (e.g., the state of the surface to be cleaned (a hard floor, a carpet, a mat, a corner, etc., and the state of being lifted from the surface to be cleaned, etc.) of the brush apparatus 2000 and determine operation information (e.g., power consumption of the suction motor 1110, the drum RPM, the trip level, etc.) of the cordless vacuum cleaner 100 suitable for the usage environment state of the brush apparatus 2000. In this regard, the main processor 1800 may transfer the operation information of the cordless vacuum cleaner 100 suitable for the usage environment state of the brush apparatus 2000 to the first processor 1131. The first processor 1131 may adjust the strength of the suction power (the power consumption and the RPM) of the suction motor 1110 according to the operation information of the cordless vacuum cleaner 100, and may transfer the operation information of the cordless vacuum cleaner 100 suitable for the usage environment state of the brush apparatus 2000 to the second processor 2410 through signal line communication. In this case, the second processor 2410 may adjust the drum RPM, the trip level, a lighting device (e.g., an LED display), etc. according to the operation information of the cordless vacuum cleaner 100. An operation in which the main processor 1800 uses the previously strained AI model (e.g., an SVM algorithm) to identify the usage environment state of the brush apparatus 2000 and determine the operation information of the cordless vacuum cleaner 100 suitable for the usage environment state of the brush apparatus 2000 is described below in detail with reference to FIG. 14, and hereinafter, the brush apparatus 2000 is described in more detail with reference to FIG. 5.

FIG. 5 is a diagram illustrating the brush apparatus 2000 according to an embodiment of the disclosure.

Referring to FIG. 5, the brush apparatus 2000 may include a motor 2100, a drum 2200 to which a rotating brush is attached, and a lighting device 2300, but is not limited thereto. The motor 2100 of the brush apparatus 2000 may be provided inside the drum 2200 or outside the drum 2200. When the motor 2100 is provided outside the drum 2200, the drum 2200 may receive power from the motor 2100 through a belt.

Referring to 510 of FIG. 5, the motor 2100 may be a planetary geared motor. The planetary geared motor may be a direct current (DC) motor coupled with a planetary gear 2101. The planetary gear 2101 is used to adjust the RPM of the drum 2200 according to a gear ratio. In the planetary geared motor, the RPM of the motor 2100 and the RPM of the drum 2200 may have a constant ratio. Referring to 520 of FIG. 5, the motor 2100 may be a brushless direct current (BLDC) motor, but is not limited thereto. When the motor 2100 is the BLDC motor, the RPM of the motor 2100 and the RPM of the drum 2200 may be the same.

The lighting device 2300 illuminates a dark surface to be cleaned, illuminates to easily identify dust or foreign substances on the surface to be cleaned, and/or indicates the state of the brush apparatus 2000, and may be provided on the front surface or the upper end of the brush apparatus 2300. The lighting device 2300 may include a light emitting diode (LED) display, but is not limited thereto. For example, the lighting device 2300 may be a laser. The lighting device 2300 may operate automatically as the motor 2100 is driven, or may operate under the control by the second processor 2410. According to an embodiment of the disclosure, the lighting device 2300 may change its color or brightness under the control by the second processor 2410.

Referring to 520 of FIG. 5, the brush apparatus 2000 may further include a driving circuit 2400 (included in a printed circuit board (PCB)). The driving circuit 2400 may include a circuit for signal line communication with the vacuum cleaner body 1000. For example, the driving circuit 2400 may include the second processor 2410, a switch device connected to a signal line (hereinafter referred to as a second switch device) (not shown), and an identification (ID) resistance (not shown) indicating the type of the brush apparatus 2000, etc., but is not limited thereto. The driving circuit 2400 is described in detail below with reference to FIG. 20.

As described here, the vacuum cleaner may use different types of the brush apparatus 2000. For example, the brush apparatus 2000 may include a multi brush 501, a floor brush 502, a wet mop brush 503, a turbo (carpet) brush 504, a bedding brush 505, a bristle brush (not shown), a crevice brush (not shown), a pet brush (not shown), etc., but is not limited thereto.

According to an embodiment of the disclosure, the type of attachment or brush apparatus 2000 can be distinguished by an ID resistance included in the attachment or the brush apparatus 2000. An operation in which the vacuum cleaner body 1000 identifies the type of attachment or the type of brush apparatus 2000 coupled to the cordless vacuum cleaner 100 is described with reference to FIG. 6.

Figure 6:
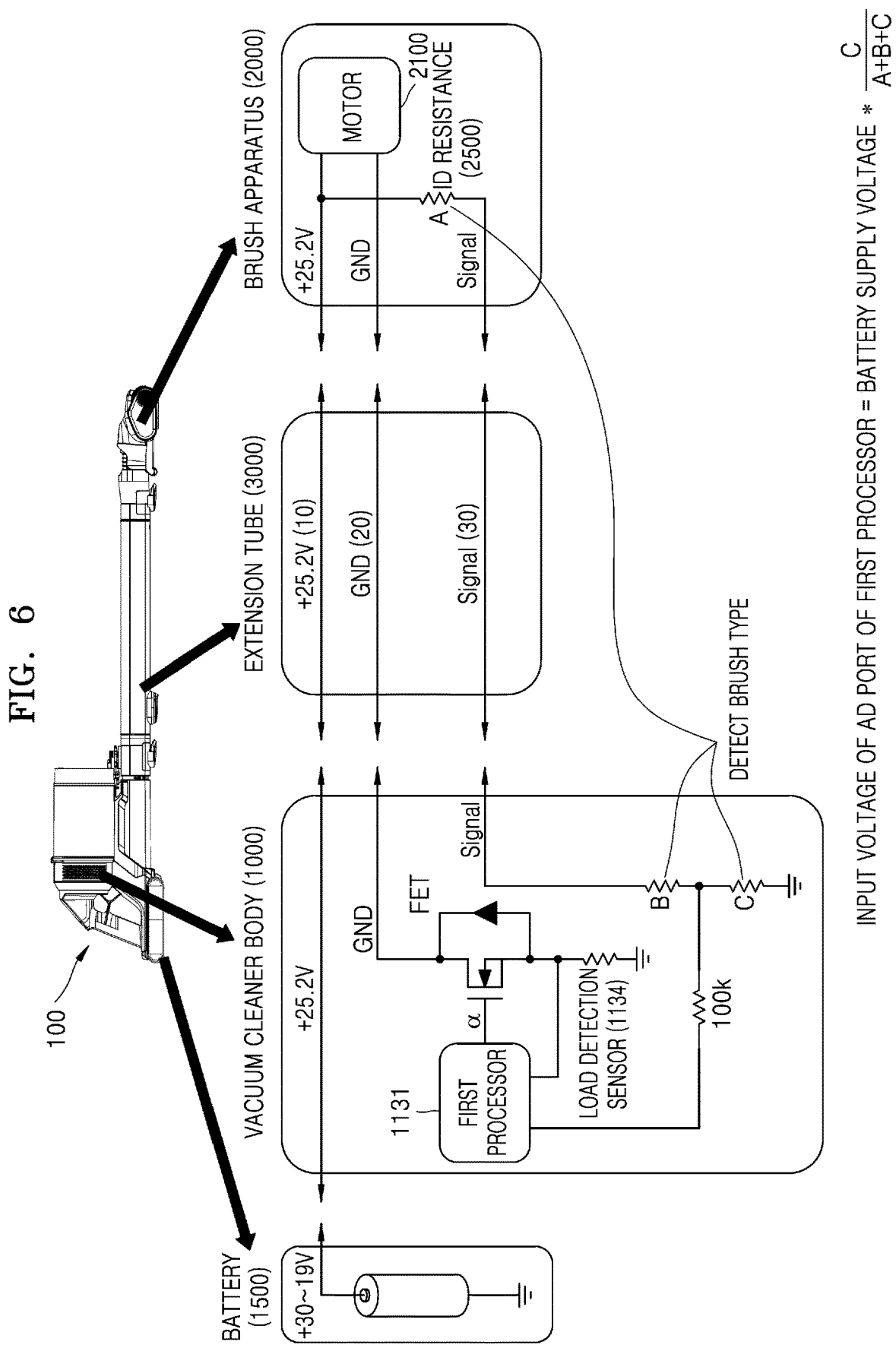
FIG. 6 is a diagram illustrating an operation in which a vacuum cleaner body identifies a type of a brush apparatus, according to an embodiment of the disclosure.

FIG. 6 is a diagram illustrating an operation the vacuum cleaner body 1000 identifies the type of the brush apparatus 2000 according to an embodiment of the disclosure.

Referring to FIG. 6, the motor assembly 1100 of the vacuum cleaner body 1000 may include the first processor 1131 and the load detection sensor 1134 (e.g., a shunt resistor), and the brush apparatus 2000 may include an ID resistance 2500. The ID resistance 2500 may be located between the power lines 10 and 20 and the signal line 30. The ID resistance 2500 indicates the type of attachment or the type of the brush apparatus 2000 and may be different for each type of attachment or type of the brush apparatus 2000. For example, the ID resistance 2500 of the multi brush 501 may be 330 KΩ, the ID resistance 2500 of the floor brush 502 may be 2.2 MΩ, and the ID resistance 2500 of the turbo (carpet) brush 504 may be 910 KΩ, but is not limited thereto.

The first processor 1131 may detect whether the brush apparatus 2000 is attached or detached using the load detection sensor 1134. For example, when the brush apparatus 2000 is not coupled to the cordless vacuum cleaner 100 (e.g., a handy mode), the operating current of the brush apparatus 2000 detected by the load detection sensor 1134 may be "0" (zero). On the other hand, when the brush apparatus 2000 is coupled to the cordless vacuum cleaner 100 (e.g., a brush mode), the operating current of the brush apparatus 2000 detected by the load detection sensor 1134 may be equal to or greater than 50 mA. Accordingly, the first processor 1131 may determine that the brush apparatus 2000 is detached from the cordless vacuum cleaner 100 when the operating current of the brush apparatus 2000 detected by the load sensor 1134 is 0, and the load sensor 1134 may determine that the brush apparatus 2000 is coupled to the cordless vacuum cleaner 100 when the operating current of the brush apparatus 2000 detected by the load detection sensor 1134 is equal to or greater than 50 mA. Meanwhile, a reference operating current value for determining that the brush apparatus 2000 is coupled is not limited to 50 mA and may be changed.

When it is determined that the brush apparatus 2000 is coupled to the cordless vacuum cleaner 100, the first processor 1131 may identify the type of the brush apparatus 2000 based on a voltage value input to an input port (AD port) of the first processor 1131. For example, when the brush apparatus 2000 includes an ID resistance A and the driving circuit 1130 of the vacuum cleaner body 1000 includes a voltage divider (resistance B and resistance C) connected to the signal line 30, the voltage input to the input port of the first processor 1131 may be as follows.

$$AD \text{ Port input voltage} = \text{battery supply voltage} * \frac{C}{A+B+C}$$

The voltage value input to the input port (i.e., the AD Port input voltage) of the first processor 1131 may decrease as the value of the ID resistance 2500 increases. When the resistances B and C are constant, because the voltage value input to the input port varies according to the value of the ID resistance A, the first processor 1131 may identify the type of the brush apparatus 2000 corresponding to the ID resistance 2500 based on the voltage value input to the input port. This is described with reference to FIG. 7.

FIG. 7 is a diagram illustrating ID resistance of the brush apparatus 2000 according to an embodiment of the disclosure.

Referring to a table 700 of FIG. 7, the ID resistance of the multi brush 501 may be 330 KΩ, the ID resistance of the floor brush 502 may be 2.2 MΩ, and the ID resistance of the turbo (carpet) brush 504 may be 910 KΩ. When the voltage of the battery 1500 is 25.2 V, a voltage value input to an input port of the first processor 1131 may be 2.785 V when the multi-brush 501 is coupled to the cordless vacuum cleaner 100, the voltage value input to the input port of the first processor 1131 may be 0.791 V when the floor brush 502 is coupled to the cordless vacuum cleaner 100, and the voltage value input to the input port of the first processor 1131 may be 1.563 V when the turbo (carpet) brush 504 is coupled to the cordless vacuum cleaner 100. Accordingly, when the first processor 1131 determines that the brush apparatus 2000 is coupled to the cordless vacuum cleaner 100, and the voltage of the battery 1500 is 25.2 V, the first processor 1131 may identify that the multi-brush 501 is coupled to the cordless vacuum cleaner 100 when the voltage value input to the input port is 2.785 V, that the floor brush 502 is coupled to the cordless vacuum cleaner 100 when the voltage value input to the input port is 0.791 V, and that the turbo (carpet) brush 504 is coupled to the cordless vacuum cleaner 100 when the voltage value input to the input port is 1.563 V.

Hereinafter, an operation in which the cordless vacuum cleaner 100 automatically adjusts the strength of the suction power of the suction motor 1110 according to the usage environment state of the brush apparatus 2000 is described in detail with reference to FIG. 8.

Figure 8:
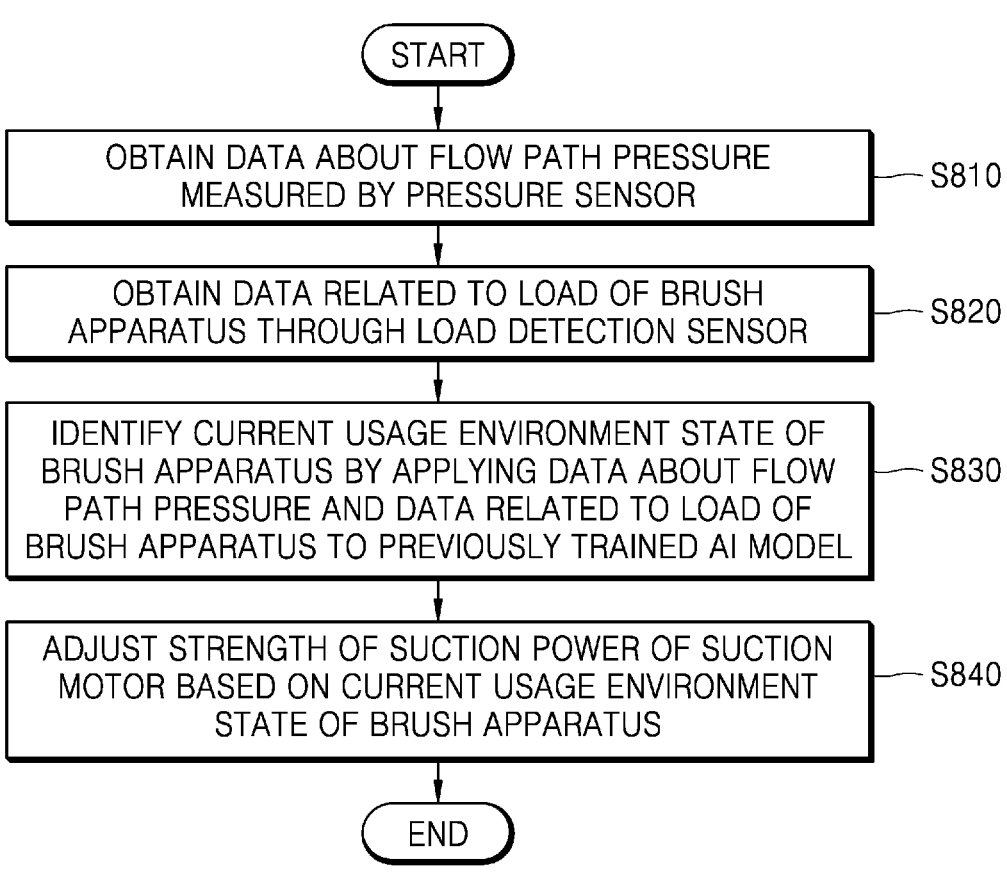
FIG. 8 is a flowchart illustrating a method performed by a cordless vacuum cleaner of controlling the strength of the suction power of a suction motor, according to an embodiment of the disclosure.

FIG. 8 is a flowchart illustrating a method performed by the cordless vacuum cleaner 100 of controlling the strength of the suction power of the suction motor 1110 according to an embodiment of the disclosure.

In operation S810, the cordless vacuum cleaner 100 may obtain data about the flow path pressure measured by the pressure sensor 1400.

According to an embodiment of the disclosure, the at least one processor 1001 of the vacuum cleaner body 1000 may obtain a pressure value measured by the pressure sensor 1400. For example, the main processor 1800 may receive the pressure value measured by the pressure sensor 1400 from the pressure sensor 1400 through I2C communication. The pressure sensor 1400 may be located in the flow path to measure the pressure inside the flow path (the flow path pressure). For example, the pressure sensor 1400 may be located in the suction duct 40 or the motor assembly 1100, but is not limited thereto.

The pressure sensor 1400 may be an absolute pressure sensor or a relative pressure sensor. When the pressure sensor 1400 is an absolute pressure sensor, the main processor 1800 may use the pressure sensor 1400 to sense a first pressure value before operating the suction motor 1110 and a second pressure value after driving the suction motor 1110 at a target RPM, and may use a difference between the first pressure value and the second pressure value as a pressure value inside the flow path. When the difference between the first pressure value and the second pressure value is used as the pressure value inside the flow path, internal/external influences other than the suction motor 1110 may be minimized.

In operation S820, the cordless vacuum cleaner 100 may obtain data related to the load of the brush apparatus 2000 through the load detection sensor 1134.

According to an embodiment of the disclosure, the load detection sensor 1134 may be located in the driving circuit 1130 of the motor assembly 1100 and may include a shunt resistor, a current detection circuit, a load detection circuit, etc., but is limited thereto. The main processor 1800 of the vacuum cleaner body 1000 may receive the data related to the load of the brush apparatus 2000 from the first processor 1131 in the motor assembly 1100.

According to an embodiment of the disclosure, the data related to the load of the brush apparatus 2000 may include at least one of an operating current of the brush apparatus 2000, a voltage applied to the brush apparatus 2000, or power consumption of the brush apparatus 2000, but is not limited thereto. The power consumption of the brush apparatus 2000 may be power consumption of the motor 2100 and may be calculated as a product of the operating current of the brush apparatus 2000 and the voltage applied to the brush apparatus 2000. When the brush apparatus 2000 includes the lighting device 2300 (e.g., an LED display), the load of the brush apparatus 2000 may be calculated as the sum of the load of the motor 2100 and the load of the lighting device 2300.

In operation S830, the vacuum cleaner body 1000 may identify the current usage environment state of the brush apparatus 2000 by applying the data about the flow path pressure and the data related to the load of the brush apparatus 2000 to one or more previously trained AI models.

According to an embodiment of the disclosure, the AI model may be a machine learning algorithm trained to infer the usage state of the brush apparatus 2000. The AI model may be trained or renewed by an external device (e.g., a server device or an external computing device) or may be trained or renewed by the vacuum cleaner body 1000. For example, the vacuum cleaner body 1000 may receive the AI model trained by the external device and store the AI model in the memory 1900, and the at least one processor 1001 of the vacuum cleaner body 1000 may create the AI model for inferring the usage environment state of the brush apparatus 2000 through training.

According to an embodiment of the disclosure, the AI model may include at least one of a SVM model, a neural network model, a random forest model, or a graphical model, but is not limited thereto.

The SVM model may be an algorithm that creates a hyperplane of a maximum margin capable of classifying data in a stereoscopic space using a kernel function. The random forest model may be an ensemble algorithm that trains a plurality of decision trees and synthesizes and predicts results of the plurality of decision trees. The neural network model may be an algorithm that derives an output by combining a weight and a conversion function for each input value. The graphical model may be an algorithm that expresses independence between random variables as a graph. In this case, the random variable may be expressed by a node, and the conditional independency between random variables may be expressed by an edge.

The SVM model having relatively high accuracy and fast response speed may quickly convert the operation of the cordless vacuum cleaner 100 to an optimal specification, and thus, hereinafter, the case where the AI model is the SVM model is described as a main example.

According to an embodiment of the disclosure, the usage environment state of the brush apparatus 2000 may relate to an environment in which the brush apparatus 2000 is being used during cleaning. For example, the usage environment state of the brush apparatus 2000 may include at least one of the state of a surface to be cleaned on which the brush apparatus 2000 is located, the relative location state of the brush apparatus 2000 within the surface to be cleaned, or the state of the brush apparatus 2000 lifted from the surface to be cleaned, but is not limited thereto. Here, the surface to be cleaned may mean a surface that comes into contact with the brush apparatus 2000 during cleaning, such as a floor, bedding, or a sofa. The state of the surface to be cleaned may mean a material of the surface to be cleaned, etc., and may include, for example, a hard floor, a normal carpet (a normal load), a high-density carpet (an overload), and a mat. The relative location state may include a floor center, a floor side surface (a wall surface), a corner, etc., but is not limited thereto. Hereinafter, for convenience of description, a mat state, a hard floor state, a carpet state, and a lift state among various usage environment states are described as examples.

According to an embodiment of the disclosure, the main processor 1800 of the vacuum cleaner body 1000 may input the data about the flow path pressure obtained from the pressure sensor 1400 and the data related to the load of the brush apparatus 2000 obtained from the first processor 1131 to the previously trained AI model, and obtain the current usage environment state of the brush apparatus 2000 as an inference result of the AI model.

According to an embodiment of the disclosure, a load value of the brush apparatus 2000 used as an input value of the AI model may vary according to the type of the brush apparatus 2000. For example, when the brush apparatus 2000 is the floor brush 502, the main processor 1800 may input operating current data of the floor brush 502 to a first AI model corresponding to the floor brush 502. On the other hand, when the brush apparatus 2000 is the multi-brush 501, the main processor 1800 may input power consumption (or operating current and applied voltage) of the multi-brush 501 to a second AI model corresponding to the multi-brush 501.

When cleaning a hard floor, the flow path pressure and the load of the brush apparatus 2000 are normal, but when cleaning a mat, the flow path pressure and the load of the brush apparatus 2000 may greatly increase, and when cleaning a carpet, the flow path pressure is normal, but the load of the brush apparatus 2000 may greatly increase, and when the brush apparatus 2000 is in the lift state, the flow path pressure and the load of the brush apparatus 2000 may greatly decrease. Accordingly, the vacuum cleaner body 1000 may identify the current usage environment state of the brush apparatus 2000 by applying the data about the flow path pressure and the data related to the load of the brush apparatus 2000 to one or more previously trained AI models. For example, when a normal first flow path pressure value and a normal first load value are applied to an AI model corresponding to the brush apparatus 2000 currently used by the cordless vacuum cleaner 100, the AI model may output the 'hard floor' as the usage environment state of the brush apparatus 2000, and when a high second flow path pressure value and a high second load value are applied to the AI model, the AI model may output the 'mat' as the usage environment state of the brush apparatus 2000.

Meanwhile, because the usage environment state of the brush apparatus 2000 may change at any time, the vacuum cleaner body 1000 may continuously monitor the usage environment state of the brush apparatus 2000 by applying the current usage environment state of the brush apparatus 2000 by applying the data about the flow path pressure and the data related to the load of the brush apparatus 2000 to the previously trained AI model at a certain period.

In operation S840, the vacuum cleaner body 1000 may adjust the strength of the suction power of the suction motor 1110 based on the current usage environment state of the brush apparatus 2000.

The suction power is electrical input power consumed to operate the cordless vacuum cleaner 100, and the strength of the suction power of the suction motor 1110 may be expressed as power consumption of the suction motor 1110.

According to an embodiment of the disclosure, the vacuum cleaner body 1000 may determine the strength of the suction power of the suction motor 1110 as a medium strength when the current usage environment state of the brush apparatus 2000 is a state of cleaning the hard floor. For example, the vacuum cleaner body 1000 may determine the power consumption of the suction motor 1110 as 70 W.

The vacuum cleaner body 1000 may determine the strength of the suction power of the suction motor 1110 as a second strength lower than the first strength when the current usage environment state of the brush apparatus 2000 is a state of cleaning the mat (the high-density mat). When the user cleans the mat or the high-density carpet, the brush apparatus 2000 comes into close contact with the surface to be cleaned, making it difficult for the user to move the cordless vacuum cleaner 100. Accordingly, the vacuum cleaner body 1000 may determine a lower strength of the suction power when cleaning the mat or the high-density carpet than when cleaning the hard floor. For example, the vacuum cleaner body 1000 may determine the power consumption of the suction motor 1110 as 58 W when cleaning the mat and determine the power consumption of the suction motor 1110 as 40 W when cleaning the high-density carpet. According to an embodiment of the disclosure, the vacuum cleaner body 1000 may automatically reduce the strength of the suction power of the suction motor 1110 when the user moves the brush apparatus 2000 onto the mat or the high-density carpet, thereby improving user convenience.

The vacuum cleaner body 1000 may determine the strength of the suction power of the suction motor 1110 as a third strength higher than the first strength when the current usage environment state of the brush apparatus 2000 is a state of cleaning a normal carpet. A greater suction power may be required to suck up dust or foreign substances from the normal carpet than from the hard floor. Accordingly, the vacuum cleaner body 1000 may determine a higher strength of the suction power when cleaning the normal carpet than the hard floor. For example, the vacuum cleaner body 1000 may determine the power consumption of the suction motor 1110 as 115 W. According to an embodiment of the disclosure, the vacuum cleaner body 1000 may improve cleaning performance on the carpet by automatically increasing the strength of the suction power of the suction motor 1110 when the user moves the brush apparatus 2000 onto the carpet.

According to an embodiment of the disclosure, when the current usage environment state of the brush apparatus 2000 is a state of being lifted at a certain distance or more from the surface to be cleaned (hereafter, the lift state), the vacuum cleaner body 1000 may determine the strength of the suction motor 1110 as the minimum intensity. For example, the vacuum cleaner body 1000 may determine the power consumption of the suction motor 1110 as 40 W. When the brush apparatus 2000 is in the lift state (or an idle state), the vacuum cleaner body 1000 may extend the usage time of the battery 1500 by minimizing power consumption of the suction motor 1110.

On the other hand, according to an embodiment of the disclosure, when the current usage environment state of the brush apparatus 2000 is a state of cleaning a wall corner, the vacuum cleaner body 1000 may determine the strength of the suction motor 1110 as the maximum intensity. For example, the vacuum cleaner body 1000 may determine the power consumption of the suction motor 1110 as 200 W. Accordingly, the vacuum cleaner body 1000 may increase the cleaning performance on the corner of the wall by automatically increasing the strength of the suction power of the suction motor 1110 when the user cleans the wall corner.

The cordless vacuum cleaner 100 according to an embodiment of the disclosure may identify the current usage environment state of the brush apparatus 2000 by using the AI model corresponding to the brush apparatus 2000, and automatically adjust the strength of the suction power of the suction motor 1110 according to the usage environment state of the brush apparatus 2000. Accordingly, the user does not need to replace a brush suitable for a state of the hard floor during cleaning, the usage time of the battery 1500 may be extended, and cleaning performance and efficiency may be improved. Also, the cordless vacuum cleaner 100 may finely adjust the strength of the suction power. For example, in the normal mode, the cordless vacuum cleaner 100 may select only one power consumption of the suction motor 1110 from among 40 W, 75 W, and 115 W according to the intensity (e.g., weak, medium, and strong) selected by the user, but in the AI mode, the cordless vacuum cleaner 100 may also select medium values (e.g., 50 W, 60 W, 80 W, 95 W, 130 W, and 200 W), in addition to 40 W, 75 W, and 115 W, and thus, finely adjust the strength of the suction power.

Hereinafter, referring to FIG. 9, an SVM model is described as an example of an AI model inferring the usage environment state of the brush apparatus 2000.

Figure 9:
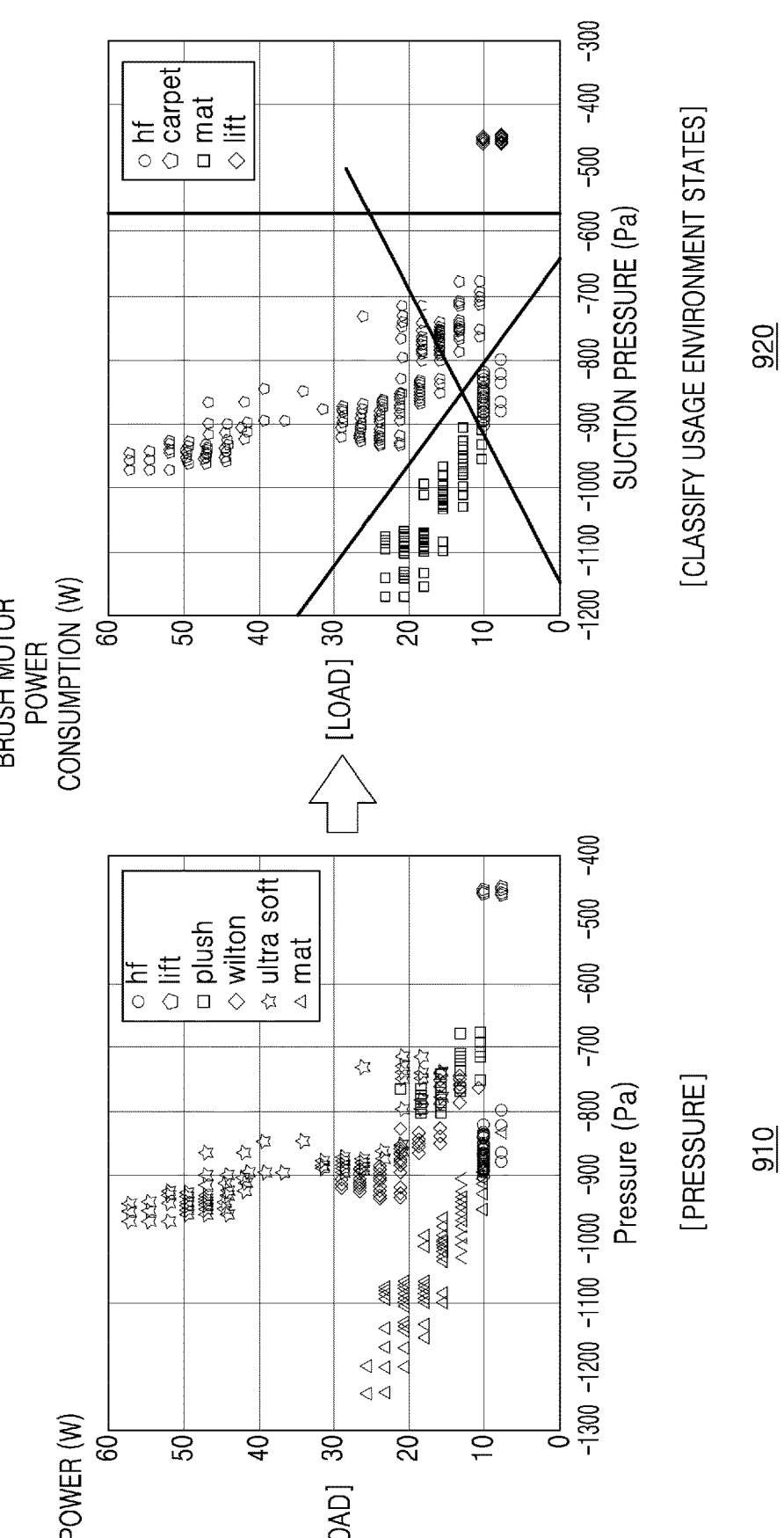
FIG. 9 is a diagram illustrating an artificial intelligence (AI) model inferring a usage environment state of a brush apparatus, according to an embodiment of the disclosure.

FIG. 9 is a diagram illustrating an SVM model inferring a usage environment state of the brush apparatus 2000 according to an embodiment of the disclosure.

Referring to 910 of FIG. 9, the SVM model may be generated through supervised learning. The SVM model is a model that finds out which group newly input data belongs to among trained groups after learning with labeled training data. According to an embodiment of the disclosure, the SVM model may be trained using, as training data, a load value of the brush apparatus 2000 and a pressure value of the suction motor 1110 in a specific usage environment state.

For example, a first flow path pressure value and a first load value of the brush apparatus 2000 obtained when cleaning a hard floor, a second flow path pressure value and a second load value of the brush apparatus 2000 obtained when cleaning a carpet, a third flow path pressure value and a third load value of the brush apparatus 2000 obtained when cleaning a mat, a fourth flow path pressure value and a fourth load value of the brush apparatus 2000 obtained when the brush apparatus 2000 is lifted from the ground may be used as training data. In addition, the SVM model may be trained by using the usage environment state (e.g., the hard floor, the carpet, the mat, the lift, etc.) when the flow path pressure value and the load value of the brush apparatus 2000 are obtained as a label (e.g., a ground-truth).

According to an embodiment of the disclosure, the SVM model may be trained by an external device (e.g., a server device or an external computing device) and by the vacuum cleaner body 1000.

Referring to 920 of FIG. 9, the trained SVM model may include at least one hyperplane classifying a usage environment state. For example, the SVM model predicting the user environment state may include a hyperplane distinguishing between the hard floor and the carpet, a hyperplane distinguishing between the hard floor and the mat, and a hyperplane distinguishing between the carpet and the lift. Each hyperplane may be expressed by a linear equation (y=ax+b). In the linear equation, a and b may be parameters, which may be modified according to the strength of the suction power of the suction motor 1110, the type of the brush apparatus 2000, the state of the vacuum cleaner 100 (e.g., an amount of dust, etc.) An equation of the hyperplane may also be a higher-order equation (e.g., $y=ax^2+b$, $y=ax^3+b$, etc.)

Figure 10:
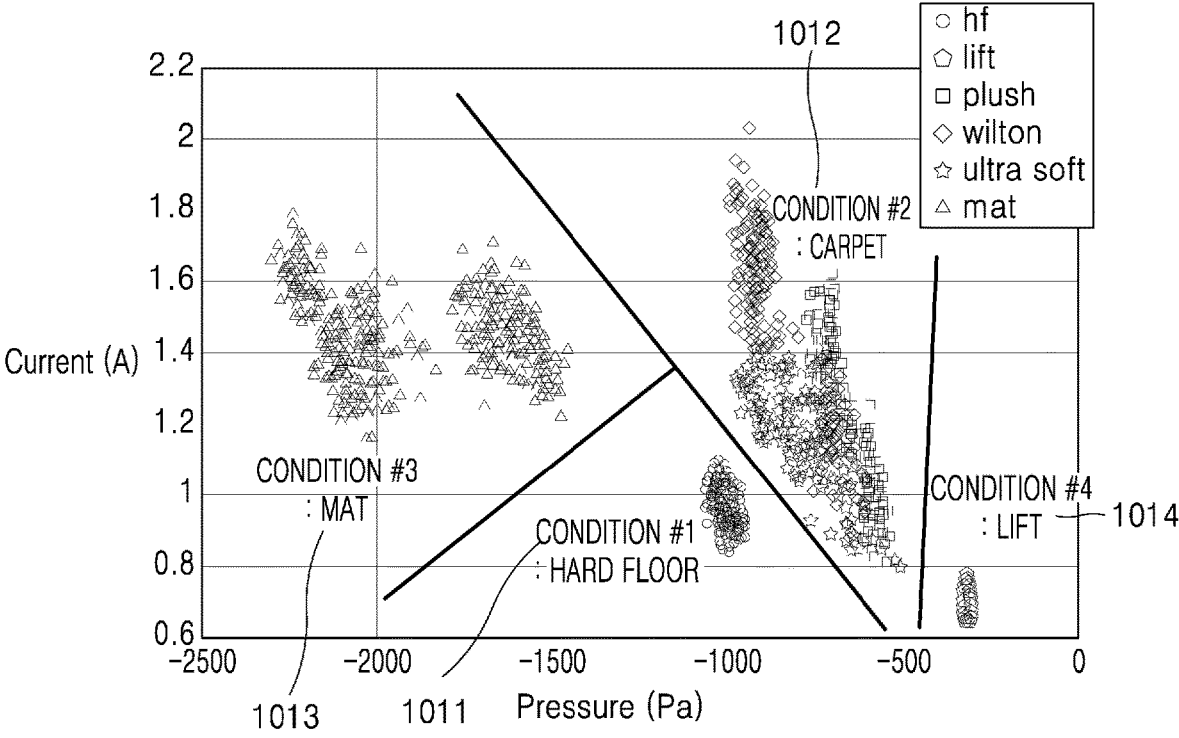
FIG. 10 is a diagram illustrating an operation in which a vacuum cleaner body identifies a usage environment state of a brush apparatus using a support vector machine (SVM) model, according to an embodiment of the disclosure.

FIG. 10 is a diagram illustrating an operation in which the vacuum cleaner body 1000 identifies a usage environment state of the brush apparatus 2000 using an SVM model according to an embodiment of the disclosure.

In FIG. 10, a case in which usage environment states of the brush apparatus 2000 are classified into four states such as a hard floor hf 1011, a carpet 1012, a mat 1013, and a lift 1014 is described as an example.

When cleaning the hard floor 1011, the flow path pressure and the load of the brush apparatus 2000 are normal, when cleaning the mat 1013, the flow path pressure and the load of the brush apparatus 2000 may greatly increase, when cleaning the carpet 1012, the flow path pressure is normal, whereas the load of the brush apparatus 2000 may greatly increase, and when the brush apparatus 2000 is in the lift state, the flow path pressure and the load of the brush apparatus 2000 may greatly decrease. Accordingly, when a normal flow path pressure value and a normal load value are input to the SVM model, the SVM model may output the 'hard floor 1011' as a usage environment state of the brush apparatus 2000. When a high flow path pressure value and a high load value are input to the SVM model, the SVM model may output the 'mat 1013' as a usage environment state of the brush apparatus 2000. When a normal flow path pressure value and a high load value are input to the SVM model, the SVM model may output the 'carpet 1012' as a usage environment state of the brush apparatus 2000. When a low flow path pressure value and a low load value are input to the SVM model, the SVM model may output the 'lift' 1014 as a usage environment state of the brush apparatus 2000. At this time, the floor 1011 may be mapped to a first operating condition, the carpet 1012 may be mapped to a second operating condition, the mat 1013 may be mapped to a third operating condition, and the lift 1014 may be mapped to a fourth operating condition.

According to an embodiment of the disclosure, the main processor 1800 of the vacuum cleaner body 1000 may control the operation of the suction motor 1110 or the brush apparatus 2000 according to the usage environment state of the brush apparatus 2000 identified through the SVM model. For example, when the usage environment state of the brush apparatus 2000 is identified as the 'hard floor 1011', the main processor 1800 of the vacuum cleaner body 1000 may control the suction motor 1110 and the brush apparatus 2000 to operate based on first operation information corresponding to the first operating condition (e.g., the hard floor 1011).

In FIG. 10, the SVM model has been described as an example of an AI model inferring the usage environment state of the brush apparatus 2000, but the embodiment of the disclosure is not limited thereto. The vacuum cleaner body 1000 may receive or train various types of AI models externally from the cordless vacuum cleaner 100. Hereinafter, a neural network model is described as an example of an AI model inferring the usage environment state of the brush apparatus 2000 with reference to FIG. 11.

Figure 11:
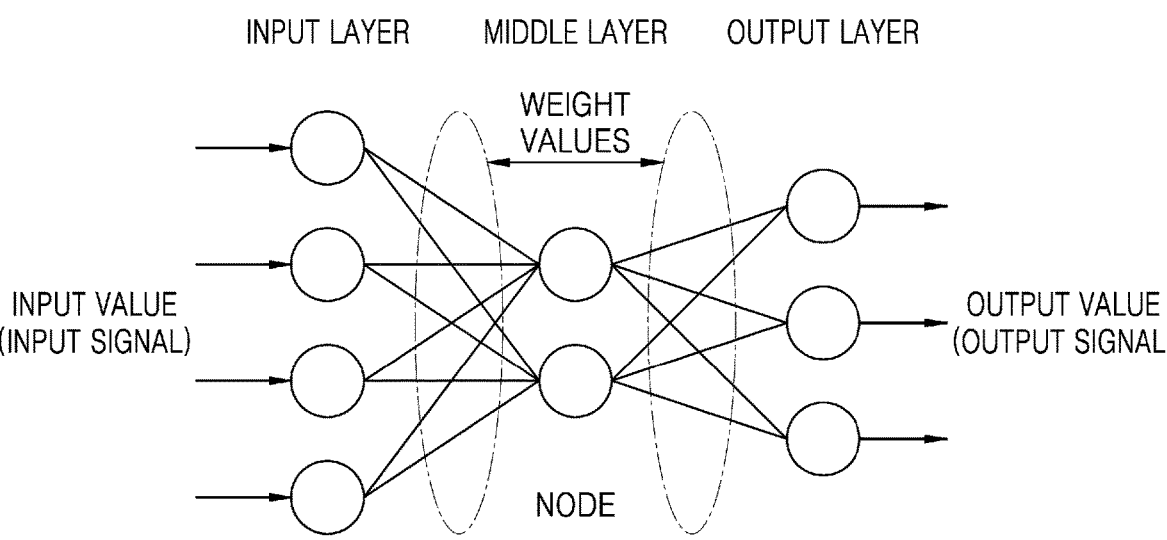
FIG. 11 is a diagram illustrating an operation in which a vacuum cleaner body identifies a usage environment state of a brush apparatus using a neural network model, according to an embodiment of the disclosure.

FIG. 11 is a diagram illustrating an operation in which the vacuum cleaner body 1000 identifies a usage environment state of the brush apparatus 2000 using a neural network model according to an embodiment of the disclosure.

The neural network model may include a plurality of neural network layers (e.g., an input layer, a middle layer (hidden layer), and an output layer). Each of the plurality of neural network layers may have a plurality of weight values, and perform a neural network operation through an operation between an operation result of a previous layer and the plurality of weight values. The plurality of weight values of the plurality of neural network layers may be optimized by a training result of the AI model. For example, the plurality of weight values may be updated to reduce or minimize a loss value or a cost value obtained in the AI model during a training process. Examples of the neural network may include, but not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), and a deep Q-network.

The neural network model according to an embodiment of the disclosure may be a model inferring the usage environment state of the brush apparatus 2000. Inference prediction is a technology that judges information and logically infers and predicts information and includes knowledge based reasoning, optimization prediction, preference-based planning, and recommendation.

A function related to artificial intelligence (AI) according to the disclosure may be performed by the at least one processor 1001 and the memory 1900. The at least one processor 1001 may include one processor or a plurality of processors. In this case, the at least one processor 1001 may include a general-purpose processor, such as a CPU, an application processor (AP), a digital signal processor (DSP), etc., a graphic-dedicated processor, such as a GPU, a vision processing unit (VPU), etc., or an AI-dedicated processor, such as a neural processing unit (NPU). The at least one processor 1001 may process input data according to a predefined operation rule or an AI model (e.g., a neural network model) stored in the memory 1900. When the at least one processor 1001 includes an AI-dedicated processor, the AI-dedicated processor may be designed to have a hardware structure specialized for processing a specific AI model.

The predefined operation rule or the AI model (e.g., the neural network model) may be made through training. As described herein, when the AI model is made through training, it may mean that a basic AI model (or a deep learning model) is trained based on a learning algorithm by using multiple training datasets, such that the predefined operation rule or AI model set to execute desired characteristics (or purpose) is made. Such learning may be performed by a device (e.g., the vacuum cleaner body 1000) on which AI according to the disclosure is implemented, or by a separate server and/or system. Examples of a learning algorithm may include, but not limited to, supervised learning, unsupervised learning, semi-supervised learning, or reinforcement learning.

For example, the neural network model according to an embodiment of the disclosure may be trained by using a flow path pressure value, a load value of the brush apparatus 2000, and a usage environment state of the brush apparatus 2000 when the flow path pressure value and the load value of the brush apparatus 2000 are obtained as training data. For example, a first flow path pressure value and a first load value of the brush apparatus 2000 obtained when cleaning a hard floor, a second flow path pressure value and a second load value of the brush apparatus 2000 obtained when cleaning a carpet, a third flow path pressure value and a third load value of the brush apparatus 2000 obtained when cleaning a mat, and a fourth flow path pressure value and a fourth load value of the brush apparatus 2000 obtained when the brush apparatus 2000 is lifted from the floor may be used as training data. In addition, the neural network model may be trained by using the usage environment state (e.g., a hard floor, a carpet, a mat, a lift, etc.) when the flow path pressure value and the load value of the brush apparatus 2000 are obtained as a label (a ground-truth).

According to an embodiment of the disclosure, when the at least one processor 1001 inputs the flow path pressure value and the load value of the brush apparatus 2000 to the neural network model, the neural network model may output the current usage environment state of the brush apparatus 2000.

Hereinafter, referring to FIG. 12, a random forest model is described as an example of an AI model inferring the usage environment state of the brush apparatus 2000.

Figure 12:
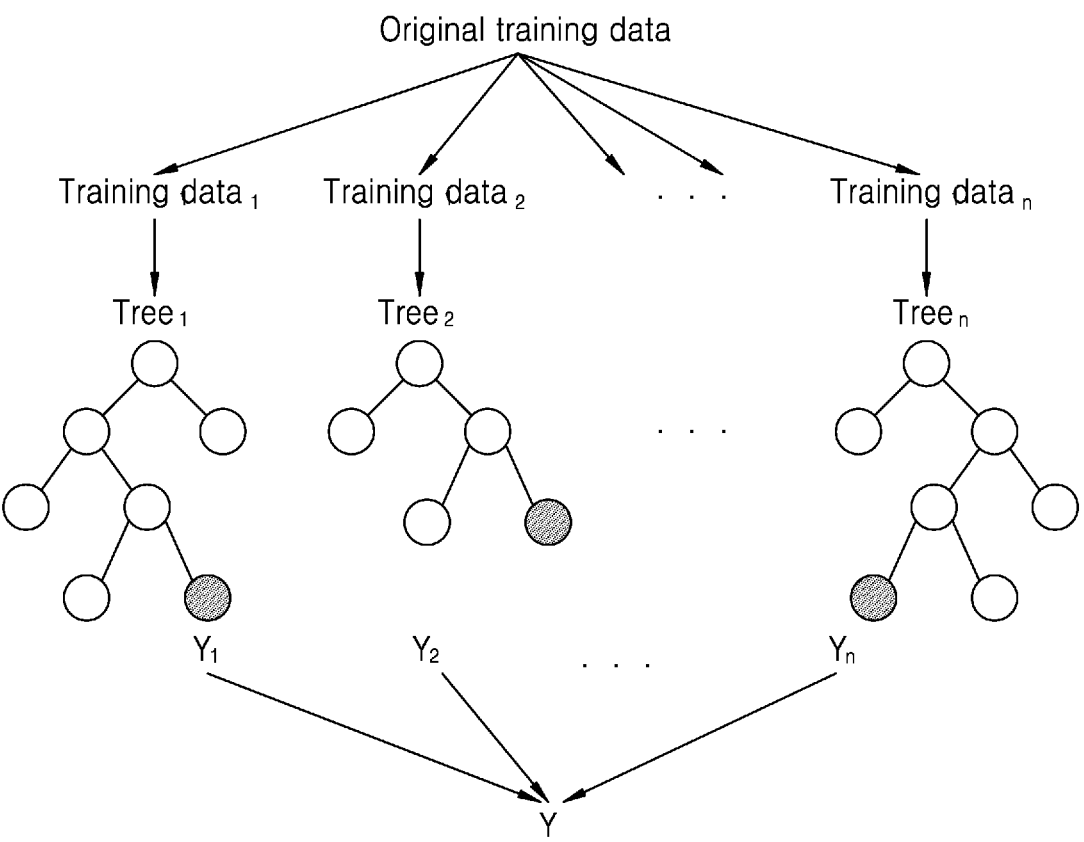
FIG. 12 is a diagram illustrating an operation in which a vacuum cleaner body identifies a usage environment state of a brush apparatus using a random forest model, according to an embodiment of the disclosure.

FIG. 12 is a diagram illustrating an operation in which the vacuum cleaner body 1000 identifies a usage environment state of the brush apparatus 2000 using a random forest model according to an embodiment of the disclosure.

The random forest model may be an ensemble algorithm that trains a plurality of decision trees and synthesizes and predicts results of the plurality of decision trees. The biggest feature of the random forest model is that decision trees have slightly different characteristics from each other due to randomness. Randomization is performed during a training process of each tree, and bagging and randomized node optimization, which are ensemble learning methods using random training data extraction methods, are often used. Bagging is an abbreviation of bootstrap aggregating, and is a method of aggregating base learners trained on slightly different training data through bootstrap. Bootstrap refers to a process of creating a data set of the same size as the original data set by allowing repetition in the given training data.

The random forest model according to an embodiment of the disclosure may be trained by using a flow path pressure value, a load value of the brush apparatus 2000, and the usage environment state of the brush apparatus 2000 when the flow path pressure value and the load value of the brush apparatus 2000 are obtained as training data. According to an embodiment of the disclosure, when the at least one processor 1001 inputs the current flow path pressure value and the current load value of the brush apparatus 2000 to the random forest model, the random forest model may output the current usage environment state of the brush apparatus 2000.

Hereinafter, when the cordless vacuum cleaner 100 operates in an AI mode, an operation in which the cordless vacuum cleaner 100 controls the suction motor 1110 and the brush apparatus 2000 according to the usage environment state of the brush apparatus 2000 inferred by the AI model is described with reference to FIG. 13.

FIG. 13 is a diagram illustrating an AI mode 1302 according to an embodiment of the disclosure.

Referring to FIG. 13, in a normal mode 1301, a power consumption of the suction motor 1110 and a drum RPM of the brush apparatus 2000 are not automatically adjusted according to a usage environment state of the brush apparatus 2000. For example, when the cordless vacuum cleaner 100 operates in the normal mode 1301 and a currently set intensity is 'strong', irrespective of whether the usage environment state of the brush apparatus 2000 is a hard floor (a first state), a normal carpet (a second state), a high-density carpet (a third state), a mat (a fourth state), a lift (a fifth state), or a corner (a sixth state), the power consumption of the suction motor 1110 may be maintained at 115 W, and the drum RPM may be maintained at 3800 rpm. However, the power consumption of the suction motor 1110 and the drum RPM of the brush apparatus 2000 may slightly change depending on the load (a frictional load of the drum 2200 of the brush apparatus 2000, a flow path resistance load due to foreign substances/dust, etc.)

Referring to FIG. 13, in the AI mode 1302, the power consumption of the suction motor 1110 and the drum RPM of the brush apparatus 2000 may be automatically adjusted according to the usage environment state of the brush apparatus 2000. For example, when the cordless vacuum cleaner 100 operates in the AI mode 1302, the cordless vacuum cleaner 100 may identify the current usage environment state of the brush apparatus 2000 by applying a current flow path pressure value and a current load value of the brush apparatus 2000 to an AI model (e.g., a SVM model, a neural network model, a random forest model, etc.) Further, the cordless vacuum cleaner 100 may determine the drum RPM of the brush apparatus 2000 as well as the strength of the suction power of the suction motor 1110 according to the current usage environment state of the brush apparatus 2000.

According to an embodiment of the disclosure, when the usage environment state of the brush apparatus 2000 is determined to be the hard floor (the first state), the cordless vacuum cleaner 100 may determine the power consumption of the suction motor 1110 as 70 W and determine the drum RPM of the brush apparatus 2000 as 2000 rpm. When the usage environment state of the brush apparatus 2000 is determined to be the normal carpet (the second state), the cordless vacuum cleaner 100 may determine the power consumption of the suction motor 1110 as 115 W and determine the drum RPM of the brush apparatus 2000 as 3800 rpm. When the usage environment state of the brush apparatus 2000 is determined to be the high-density carpet (the third state), the cordless vacuum cleaner 100 may determine the power consumption of the suction motor 1110 as 40 W and determine the drum RPM of the brush apparatus 2000 as 2000 rpm. When the usage environment state of the brush apparatus 2000 is determined to be the mat (the fourth state), the cordless vacuum cleaner 100 may determine the power consumption of the suction motor 1110 as 58 W and determine the drum RPM of the brush apparatus 2000 as 1500 rpm. When the usage environment state of the brush apparatus 2000 is determined to be the lift (the fifth state), the cordless vacuum cleaner 100 may determine the power consumption of the suction motor 1110 as 40 W and determine the drum RPM of the brush apparatus 2000 as 1500 rpm. When the usage environment state of the brush apparatus 2000 is determined to be the corner (the sixth state), the cordless vacuum cleaner 100 may determine the power consumption of the suction motor 1110 as 115 W and determine the drum RPM of the brush apparatus 2000 as 3800 rpm.

According to an embodiment of the disclosure, when the cordless vacuum cleaner 100 operates in the AI mode 1302, cleaning efficiency, usability (operability and noise), damage to the surface to be cleaned (e.g., scrape, scratch, scuff, abrasion, etc. due to the friction load of the drum 2200 of the brush apparatus 2000) and the usage time of battery 1500 may be improved. For example, the cordless vacuum cleaner 100 may increase battery usage time by reducing the strength of the suction power and the drum RPM in a cleaning environment that requires no strong suction power (e.g., the hard floor or the lift). In a cleaning environment in which the brush apparatus 2000 is in close contact with the surface to be cleaned and a user has difficulty in operating the cordless vacuum cleaner 100 (e.g., the mat and the high-density carpet), the cordless vacuum cleaner 100 may improve usability (operability) by reducing the strength of the suction power and the drum RPM. The cordless vacuum cleaner 100 may increase cleaning efficiency (cleaning performance) by increasing the strength of the suction power in a cleaning environment that requires strong suction power (e.g., the normal carpet and the corner).

FIG. 14 is a diagram illustrating a method performed by the cordless vacuum cleaner 100 of selecting an AI model according to the type of the brush apparatus 2000 according to an embodiment of the disclosure.

In operation S1410, the cordless vacuum cleaner 100 may identify a first type of the brush apparatus 2000 connected to the vacuum cleaner body 1000.

According to an embodiment of the disclosure, when the brush apparatus 2000 includes the ID resistance 2500 (see FIG. 6), the cordless vacuum cleaner 100 may use the ID resistance 2500 of the brush apparatus 2000 to identify the first type of the brush apparatus 2000.

For example, when it is determined that the brush apparatus 2000 is coupled to the cordless vacuum cleaner 100, the first processor 1131 of the vacuum cleaner body 1000 may identify the type of the brush apparatus 2000 based on a voltage value input to an input port of the first processor 1131. The operation in which the cordless vacuum cleaner 100 identifies the type of the brush apparatus 2000 using the ID resistance 2500 of the brush apparatus 2000 has been described above with reference to FIG. 6, and thus, a redundant description thereof is omitted.

According to an embodiment of the disclosure, the first processor 1131 or the main processor 1800 of the vacuum cleaner body 1000 may identify the first type of the brush apparatus 2000 based on a signal received from the brush apparatus 2000 through signal line communication. For example, the brush apparatus 2000 may insert a bit representing the first type of the brush apparatus 2000 into a data signal transmitted during signal line communication. An operation in which the vacuum cleaner body 1000 identifies the type of the brush apparatus 2000 based on the signal received from the brush apparatus 2000 is described in more detail below with reference to FIG. 29.

According to an embodiment of the disclosure, when the first processor 1131 of the vacuum cleaner body 1000 identifies the first type of the brush apparatus 2000, the first processor 1131 may transfer information about the first type of the brush apparatus 2000 to the main processor 1800.

In operation S1420, the cordless vacuum cleaner 100 may select a first AI model corresponding to the first type of the brush apparatus 2000 from among a plurality of AI models.

According to an embodiment of the disclosure, an AI model inferring a usage environment state of the brush apparatus 2000 may vary according to the type of the brush apparatus 2000. Accordingly, the vacuum cleaner body 1000 may store the plurality of AI models for each type of brush apparatus 2000 in the memory 1900, and, as the type of the brush apparatus 2000 is identified as the first type, may select the first AI model corresponding to the first type of the brush apparatus 2000.

Figure 15A:
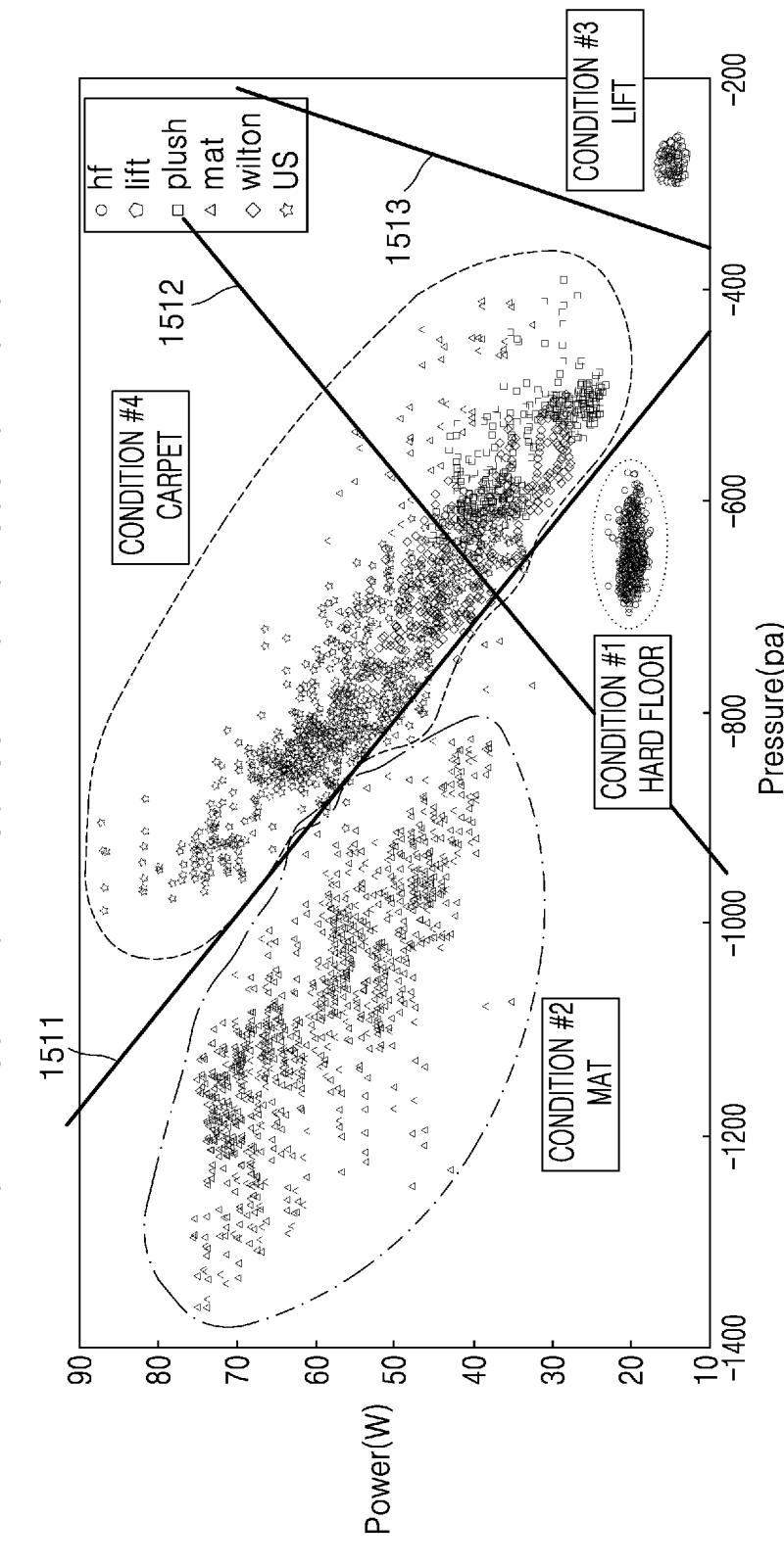
FIG. 15A is a diagram illustrating a first SVM model corresponding to a multi-brush, according to an embodiment of the disclosure.
Figure 16A:
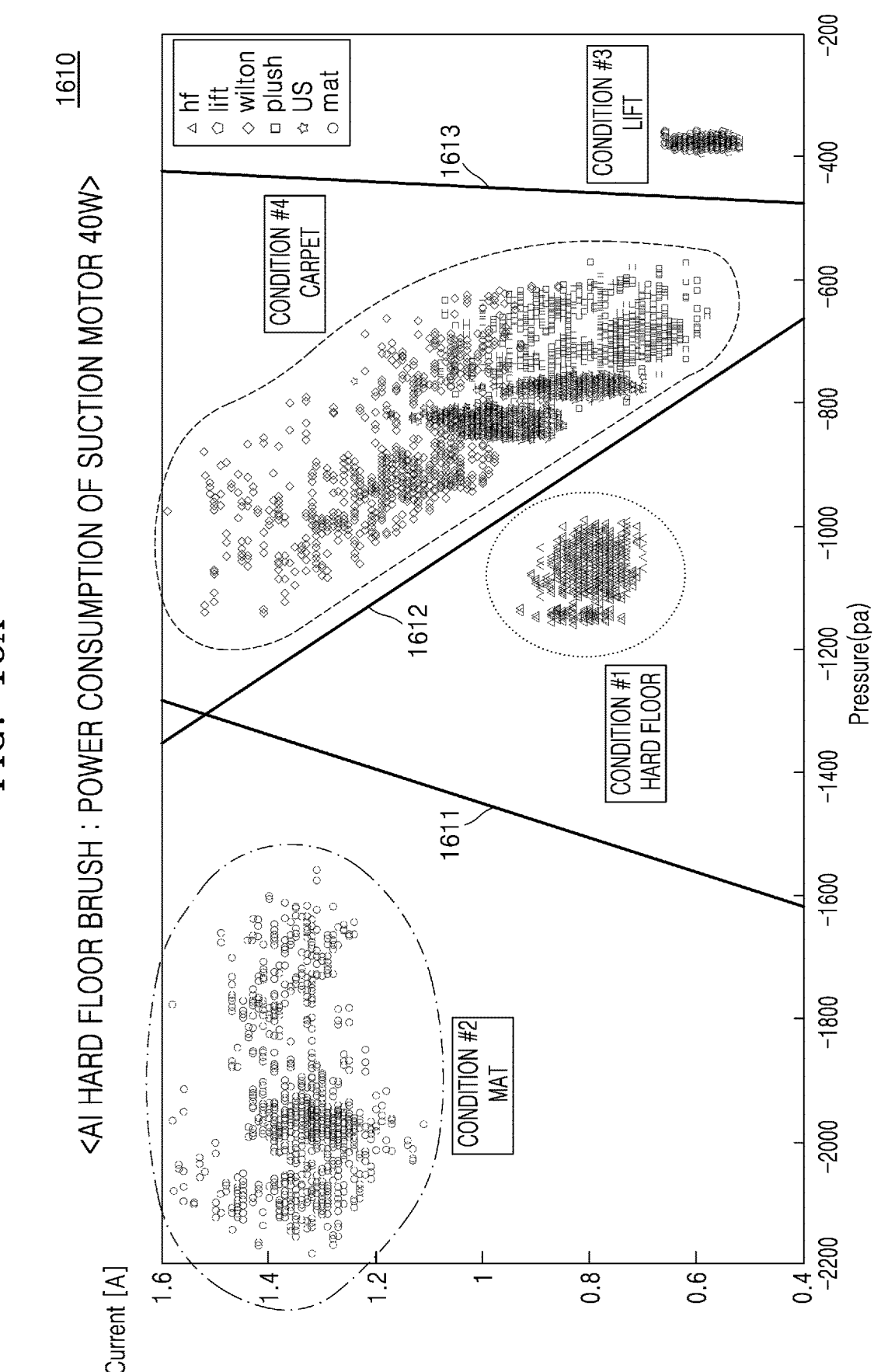
FIG. 16A is a diagram illustrating a second SVM model corresponding to a hard floor brush, according to an embodiment of the disclosure.

For example, referring to FIG. 15A, when the brush apparatus 2000 is the multi-brush 501, the at least one processor 1001 of the cordless vacuum cleaner 100 may select a first SVM model 1510 corresponding to the multi-brush 501. Referring to FIG. 16A, when the brush apparatus 2000 is the hard floor brush 502, the at least one processor 1001 of the cordless vacuum cleaner 100 may select a second SVM model 1610 corresponding to the hard floor brush 502. The shape of each of hyperplanes 1511, 1512, and 1513 of the first SVM model 1510 corresponding to the multi brush 501 and the shape of each of hyperplanes 1611, 1612, and 1613 of the second SVM model 1610 corresponding to the hard floor brush 502 may be different from each other.

In operation S1430, the cordless vacuum cleaner 100 may modify a parameter value of the first AI model by applying the strength of the suction power of the suction motor 1110 to the selected first AI model.

According to an embodiment of the disclosure, the parameter value of the first AI model may vary according to the strength of the suction power (power consumption) of the suction motor 1110. Therefore, before inputting data about the flow path pressure and data related to the load of the brush apparatus 2000 to the first AI model, the main processor 1800 of the vacuum cleaner body 1000 may modify the parameter value of the first AI model by applying the strength of the suction power of the suction motor 1110.

According to an embodiment of the disclosure, when the strength of the suction power (power consumption) of the suction motor 1110 changes as the usage environment state of the brush apparatus 2000 changes, the main processor 1800 of the vacuum cleaner body 1000 may modify again the parameter value of the first AI model again by applying the changed strength of the suction power to the first AI model.

In operation S1440, the cordless vacuum cleaner 100 may identify the current usage environment state of the brush apparatus 2000 by applying the data about the flow path pressure and the data related to the load of the brush apparatus 2000 to the first AI model having the modified parameter value.

According to an embodiment of the disclosure, the main processor 1800 of the vacuum cleaner body 1000 may obtain data about the flow path pressure measured by the pressure sensor 1400. The main processor 1800 of the vacuum cleaner body 1000 may obtain the data related to the load of the brush apparatus 2000 through the load detection sensor 1134. In addition, the main processor 1800 of the vacuum cleaner body 1000 may identify the current usage environment state of the brush apparatus 2000 by applying the data about the flow path pressure and the data related to the load of the brush apparatus 2000 to the first AI model having the parameter value modified according to the strength of the suction power (power consumption) of the suction motor 1100.

For example, when the first flow path pressure value and the first load value are applied to the first AI model having the modified parameter value, the first AI model having the modified parameter value may output the 'hard floor' as the usage environment state of the brush apparatus 2000, and when the second flow path pressure value and the second load value are applied to the first AI model having the modified parameter value, the first AI model having the modified parameter value may output the 'mat' as the usage environment state of the brush apparatus 2000.

Operation S1440 corresponds to operation S830 of FIG. 8, and thus, a detailed description thereof is omitted.

In operation S1450, the cordless vacuum cleaner 100 may determine the strength of the suction power of the suction motor 1110 or the RPM (hereinafter, also referred to as a target RPM) of a rotating brush of the brush apparatus 2000 based on the current usage environment state of the brush apparatus 2000.

According to an embodiment of the disclosure, when the current usage environment state of the brush apparatus 2000 is a state of cleaning the hard floor, the vacuum cleaner body 1000 may determine the strength of the suction power of the suction motor 1110 as a first strength that is a medium intensity and determine the target RPM of the brush apparatus 2000 as a medium level. For example, the vacuum cleaner body 1000 may determine the power consumption of the suction motor 1110 as 70 W and determine the target RPM of the brush apparatus 2000 as 2000 rpm.

The vacuum cleaner body 1000 may determine the strength of the suction power of the suction motor 1110 as a second strength lower than the first strength when the current usage environment state of the brush apparatus 2000 is a state of cleaning the mat (a high-density mat). When the user cleans the mat or the high-density carpet, the brush apparatus 2000 comes into close contact with the surface to be cleaned, making it difficult for the user to move the cordless vacuum cleaner 100. Accordingly, the vacuum cleaner body 1000 may determine a lower strength of the suction power when cleaning the mat or the high-density carpet than when cleaning the hard floor. For example, the vacuum cleaner body 1000 may determine the power consumption of the suction motor 1110 as 58 W. Also, when the current usage environment state of the brush apparatus 2000 is the state of cleaning the mat, the vacuum cleaner body 1000 may determine the target RPM of the brush apparatus 2000 as the lowest stage (e.g., 1000 rpm). According to an embodiment of the disclosure, the vacuum cleaner body 1000 may automatically reduce the strength of the suction power of the suction motor 1110 and the rotational speed of the brush apparatus 2000 when the user moves the brush apparatus 2000 onto the mat, thereby improving user convenience.

The vacuum cleaner body 1000 may determine the strength of the suction power of the suction motor 1110 as a third strength higher than the first strength when the current usage environment state of the brush apparatus 2000 is a state of cleaning a normal carpet. A greater suction power may be required to suck up dust or foreign substances from the normal carpet than from the hard floor. Accordingly, the vacuum cleaner body 1000 may determine a higher strength of the suction power when cleaning the normal carpet than the hard floor and may determine a higher target RPM of the brush apparatus 2000. For example, the vacuum cleaner body 1000 may determine the power consumption of the suction motor 1110 as 115 W and determine the target RPM of the brush apparatus 2000 as 3800 rpm. According to an embodiment of the disclosure, the vacuum cleaner body 1000 may improve cleaning performance on the carpet by automatically increasing the strength of the suction power of the suction motor 1110 and the rotational speed of the brush apparatus 2000 when the user moves the brush apparatus 2000 onto the carpet.

According to an embodiment of the disclosure, when the current usage environment state of the brush apparatus 2000 is a state of being lifted at a certain distance or more from the surface to be cleaned (hereafter, the lift state), the vacuum cleaner body 1000 may determine the strength of the suction motor 1110 as the minimum intensity, and determine the target RPM of the brush apparatus 2000 as the lowest stage. For example, the vacuum cleaner body 1000 may determine the power consumption of the suction motor 1110 as 40 W and the target RPM of the brush apparatus 2000 as 1500 rpm. When the brush apparatus 2000 is in the lift state (or an idle state), the vacuum cleaner body 1000 may reduce unnecessary power consumption by reducing the power consumption of the suction motor 1110 and the rotational speed of the brush apparatus 2000, and thus, the usage time of the battery 1500 may also be extended.

On the other hand, according to an embodiment of the disclosure, when the current usage environment state of the brush apparatus 2000 is a state of cleaning a wall corner, the vacuum cleaner body 1000 may determine the strength of the suction motor 1110 as the maximum intensity. For example, the vacuum cleaner body 1000 may determine the power consumption of the suction motor 1110 as 200 W. Accordingly, the vacuum cleaner body 1000 may increase the cleaning performance on the corner of the wall by automatically increasing the strength of the suction power of the suction motor 1110 when the user cleans the wall corner.

In operation S1460, the cordless vacuum cleaner 100 may adjust the strength of the suction power of the suction motor 1110 and the RPM of the rotating brush of the brush apparatus 2000.

According to an embodiment of the disclosure, the main processor 1800 may transfer the determined strength of the suction power strength and target RPM of the brush apparatus 2000 to the first processor 1131. In this regard, the first processor 1131 may adjust the strength of the suction power of the suction motor 1110 to the determined strength of the suction power. The first processor 1131 may transmit the target RPM of the brush apparatus 2000 to the second processor 2410 by controlling the operation of the first switch device 1132 connected to the signal line 30. According to an embodiment of the disclosure, the first processor 1131 may transmit the target RPM of the brush apparatus 2000 to the second processor 2410 using a UART or an I2C. An operation in which the first processor 1131 transmits a signal to the second processor 2410 is described in detail below with reference to FIGS. 20 to 24 and 27 to 34. When the target RPM of the brush apparatus 2000 is received from the vacuum cleaner body 1000, the second processor 2410 may adjust the drum RPM of the brush apparatus 2000 to the target RPM.

Hereinafter, referring to FIGS. 15A to 16C, an operation in which the cordless vacuum cleaner 100 modifies the parameter value of the first AI model by applying the strength of the suction power of the suction motor 1110 to the first AI model corresponding to the first type of the brush apparatus 2000 is described in detail.

Figure 15B:
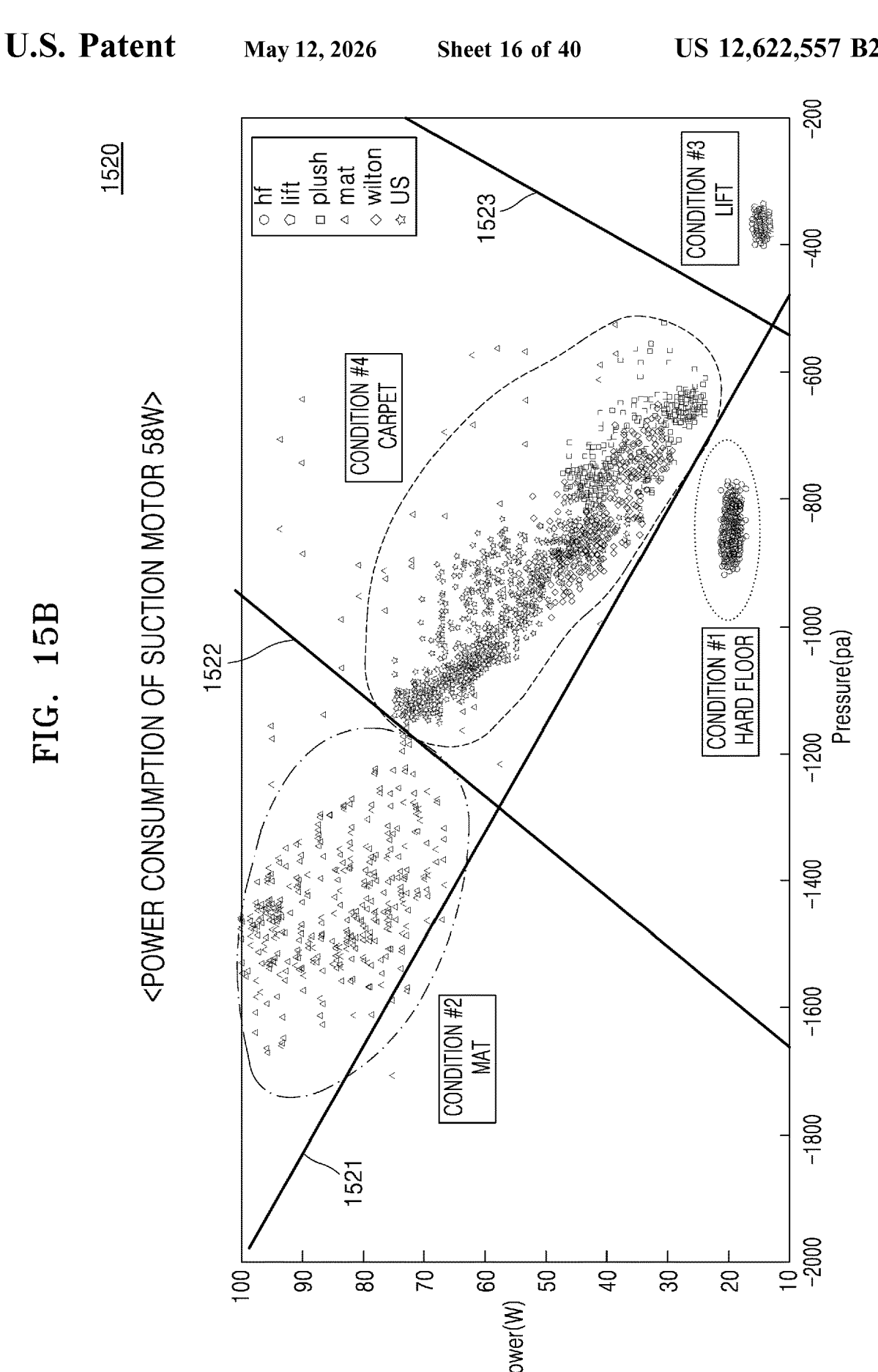
FIG. 15B is a diagram illustrating an operation of modifying a parameter value of the first SVM model corresponding to the multi-brush according to a change in power consumption of a suction motor.
Figure 15C:
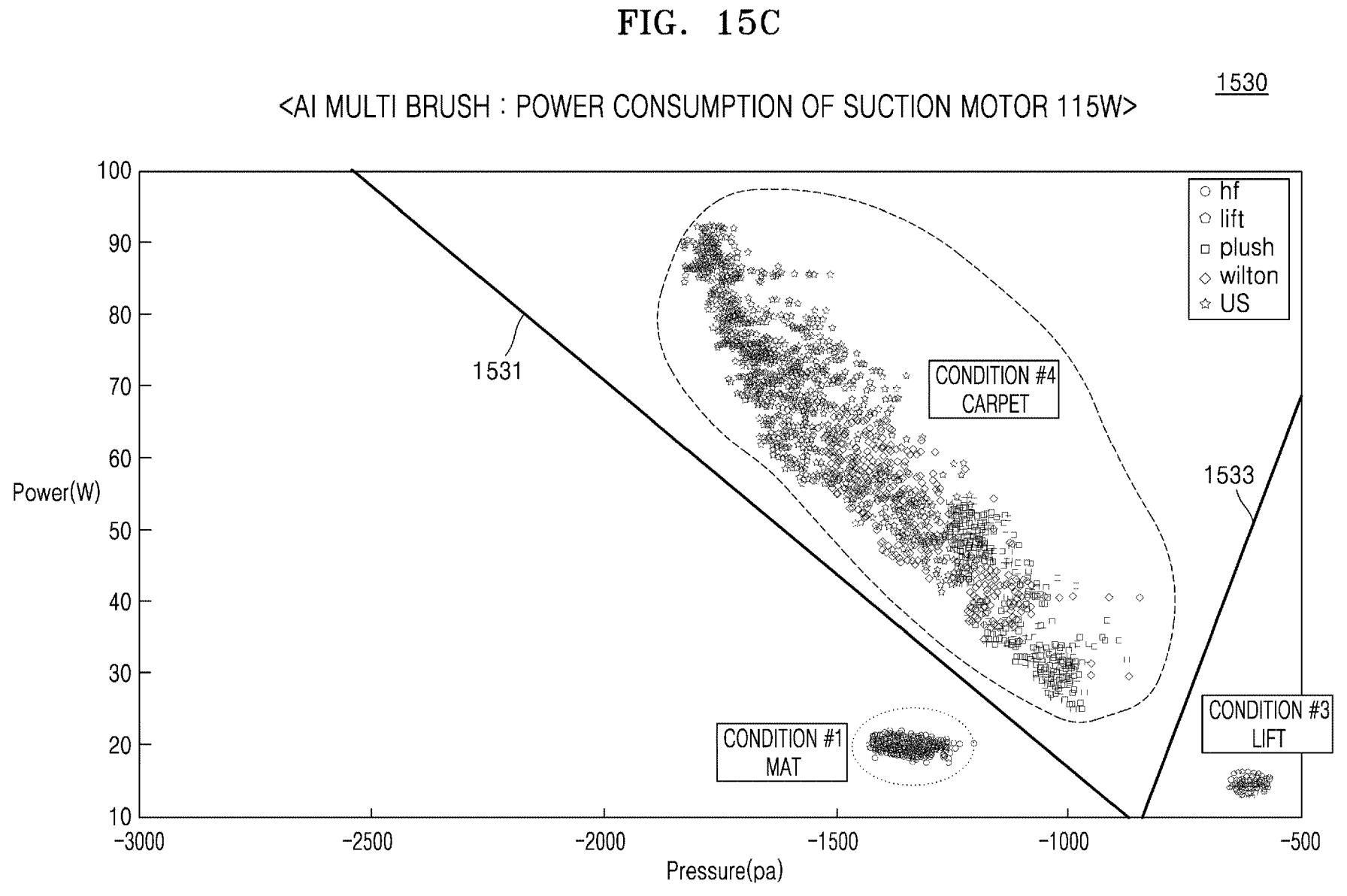

FIG. 15A is a diagram illustrating a first SVM model 1510 corresponding to the multi-brush 501 according to an embodiment of the disclosure. FIG. 15B is a diagram illustrating an operation of modifying a parameter value of the first SVM model 1510 corresponding to the multi-brush 501 according to a change in the power consumption of the suction motor 1110. FIG. 15C is a diagram illustrating an operation of modifying a parameter value of the first SVM model 1510 corresponding to the multi-brush 501 according to a change in the power consumption of the suction motor 1110.

In FIGS. 15A to 15C, an example in which usage environment states of the brush apparatus 2000 are classified into four types such as a hard floor hf, a carpet, the mat, and a lift is described.

The first SVM model 1510 corresponding to the multi-brush 501 shown in FIG. 15A may include the first hyperplane 1511 distinguishing the carpet from the mat or the hard floor, the second hyperplane 1512 distinguishing between the hard floor and the mat, and the third hyperplane 1513 distinguishing between the carpet from the lift. Each hyperplane may be expressed by a linear equation ($y=ax+b$), and a and b in the linear equation may be parameters. A parameter value of each of the first hyperplane 1511, the second hyperplane 1512, and the third hyperplane 1513 may correspond to a case where the power consumption of the suction motor 1110 is 40 W.

Referring to FIG. 15B, when the power consumption of the suction motor 1110 changes from 40 W to 58 W, the parameter value of the first SVM model 1510 may be modified. A 1-1th SVM model 1520 having a modified parameter value may include a 1-1th hyperplane 1521 distinguishing between the hard floor and the carpet, a 2-1th hyperplane 1522 distinguishing between the mat and the carpet, and a 3-1th hyperplane 1523 distinguishing between the carpet and the lift. The 1-1th hyperplane 1521 may have a smaller inclination a than that of the first hyperplane 1511, and the 2-1 the hyperplane 1522 may have a greater inclination a than that of the second hyperplane 1512.

Referring to FIG. 15C, when the power consumption of the suction motor 1110 changes from 40 W to 115 W, the parameter value of the first SVM model 1510 may be modified. A 1-2th SVM model 1530 having a modified parameter value may include a 1-2th hyperplane 1531 distinguishing between the hard floor and the carpet and a 3-2th hyperplane 1533 distinguishing between the carpet and the lift. Compared to the first SVM model 1510, the 1-2th SVM model 1530 may not include the second hyperplane 1512 distinguishing between the hard floor from the mat. For example, when the power consumption of the suction motor 1110 changes from 40 W to 115 W, the inclination a of the second hyperplane 1512 may be modified to zero.

Figure 16B:
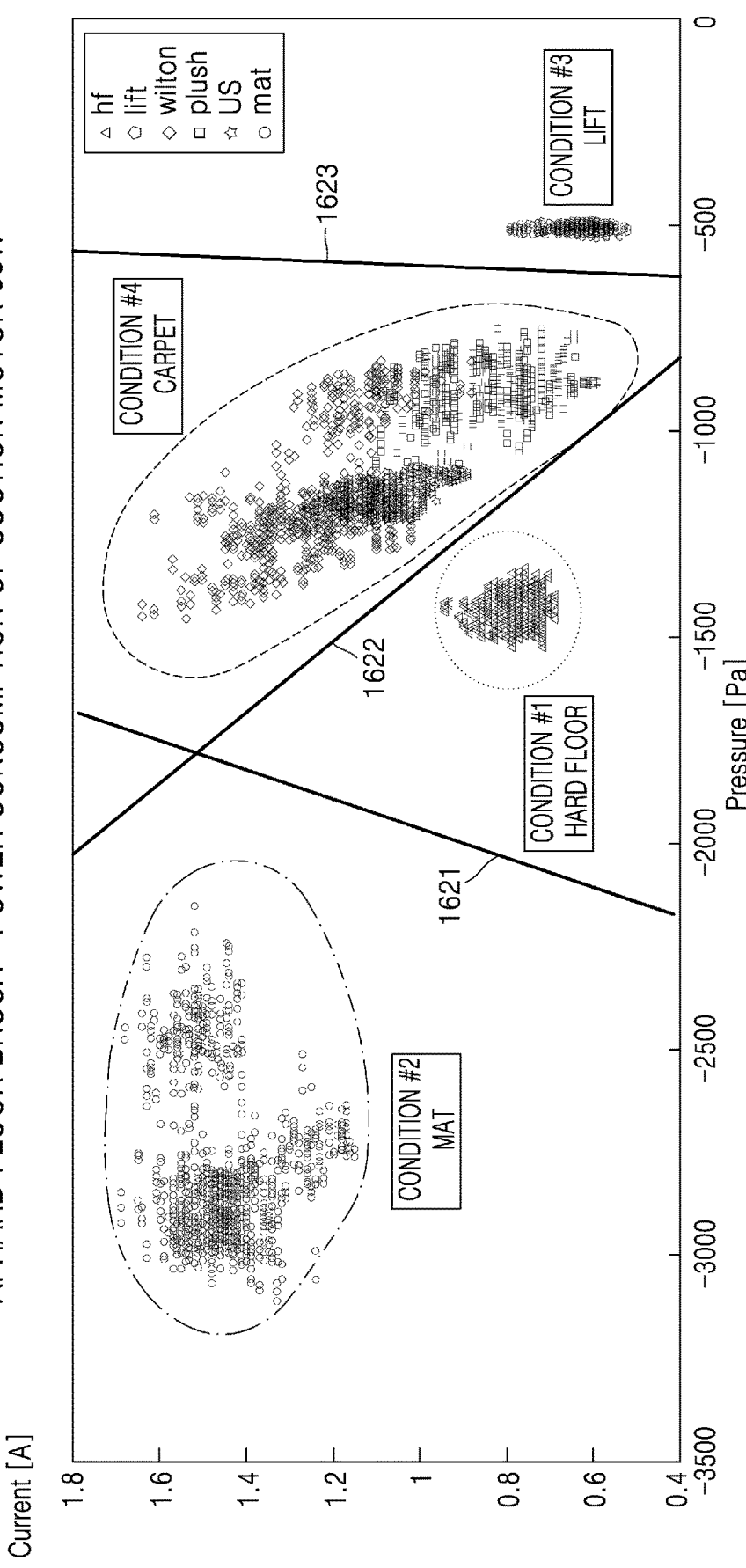
FIG. 16B is a diagram illustrating an operation of modifying the parameter value of the second SVM model corresponding to the hard floor brush according to a change in power consumption of a suction motor.

FIG. 16A is a diagram illustrating a second SVM model 1610 corresponding to the hard floor brush 502 according to an embodiment of the disclosure. FIG. 16B is a diagram illustrating an operation of modifying a parameter value of the second SVM model 1610 corresponding to the hard floor brush 502 according to a change in power consumption of the suction motor 1110. 16C is a diagram illustrating an operation of modifying the parameter value of the second SVM model 1610 corresponding to the hard floor brush 502 according to the change in the power consumption of the suction motor 1110.

Figure 16C:
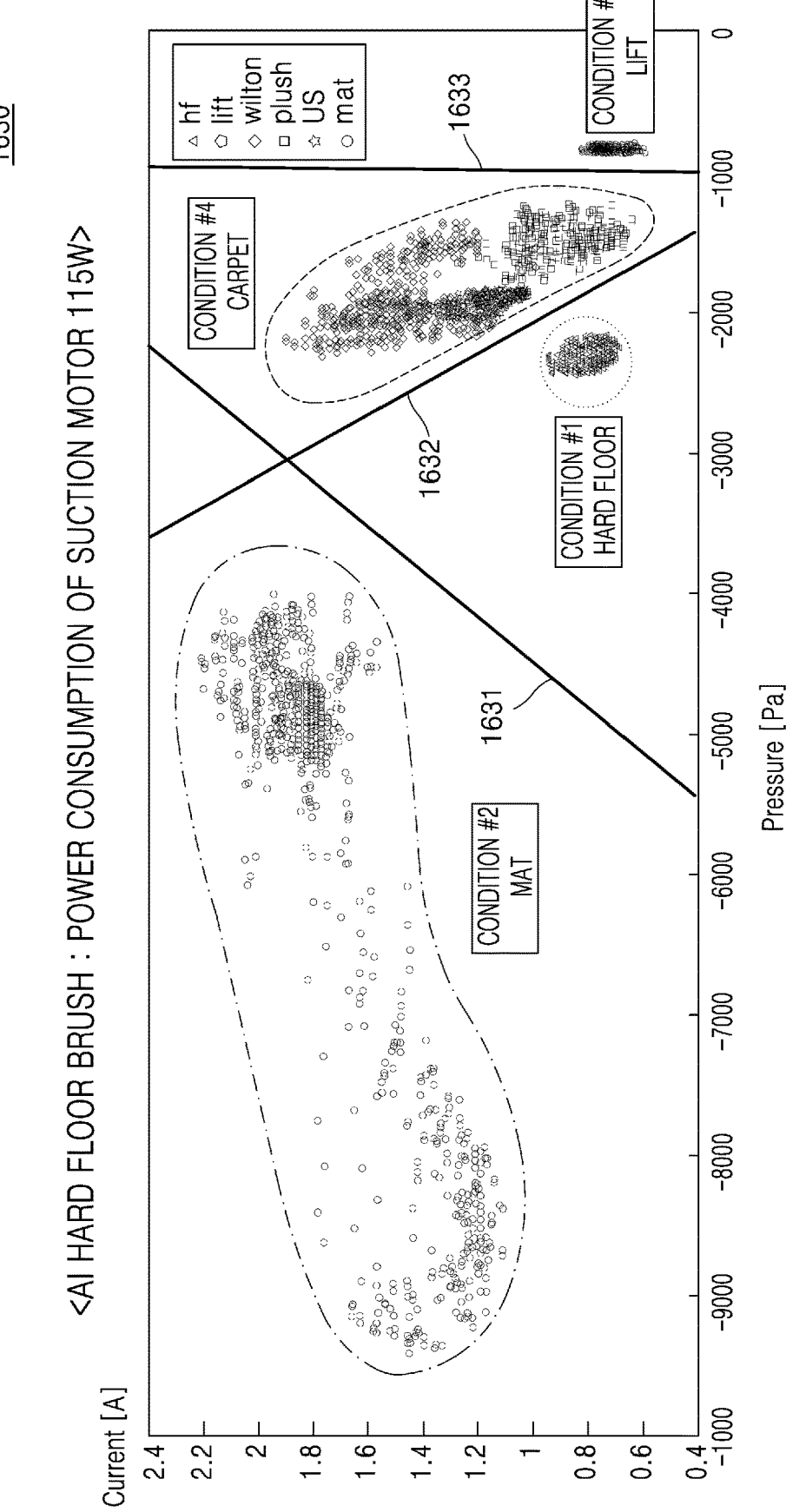
FIG. 16C is a diagram illustrating an operation of modifying the parameter value of the second SVM model corresponding to the hard floor brush according to a change in power consumption of the suction motor.

In FIGS. 16A to 16C, an example in which usage environment states of the brush apparatus 2000 are classified into four types such as a hard floor hf, a carpet, the mat, and a lift is described.

The second SVM model 1610 corresponding to the floor brush 502 shown in FIG. 16A includes a first hyperplane 1611 distinguishing between the hard floor and the mat, a second hyperplane 1612 distinguishing between the hard floor and the carpet, and a third hyperplane 1613 distinguishing between the carpet from the lift. Each hyperplane may be expressed by a linear equation ($y=ax+b$), and a and b in the linear equation may be parameters. A parameter value of each of the first hyperplane 1611, the second hyperplane 1612, and the third hyperplane 1613 may correspond to a case where the power consumption of the suction motor 1110 is 40 W.

Referring to FIG. 16B, when the power consumption of the suction motor 1110 changes from 40 W to 58 W, the parameter value of the second SVM model 1610 may be modified. A 2-1th SVM model 1620 having a modified parameter value may include a 1-1th hyperplane 1621 distinguishing between the hard floor and the mat, a 2-1th hyperplane 1622 distinguishing between the hard floor and the carpet, and a 3-1th hyperplane 1623 distinguishing between the carpet and the lift.

Referring to FIG. 16C, when the power consumption of the suction motor 1110 changes from 40 W to 115 W, the parameter value of the second SVM model 1610 may be modified. A 2-2th SVM model 1630 having a modified parameter value may include a 1-2th hyperplane 1631 distinguishing between the hard floor and the mat, a 2-2th hyperplane 1632 distinguishing between the hard floor and the carpet, and a 3-2th hyperplane 1633 distinguishing between the carpet and the lift.

Figure 17:
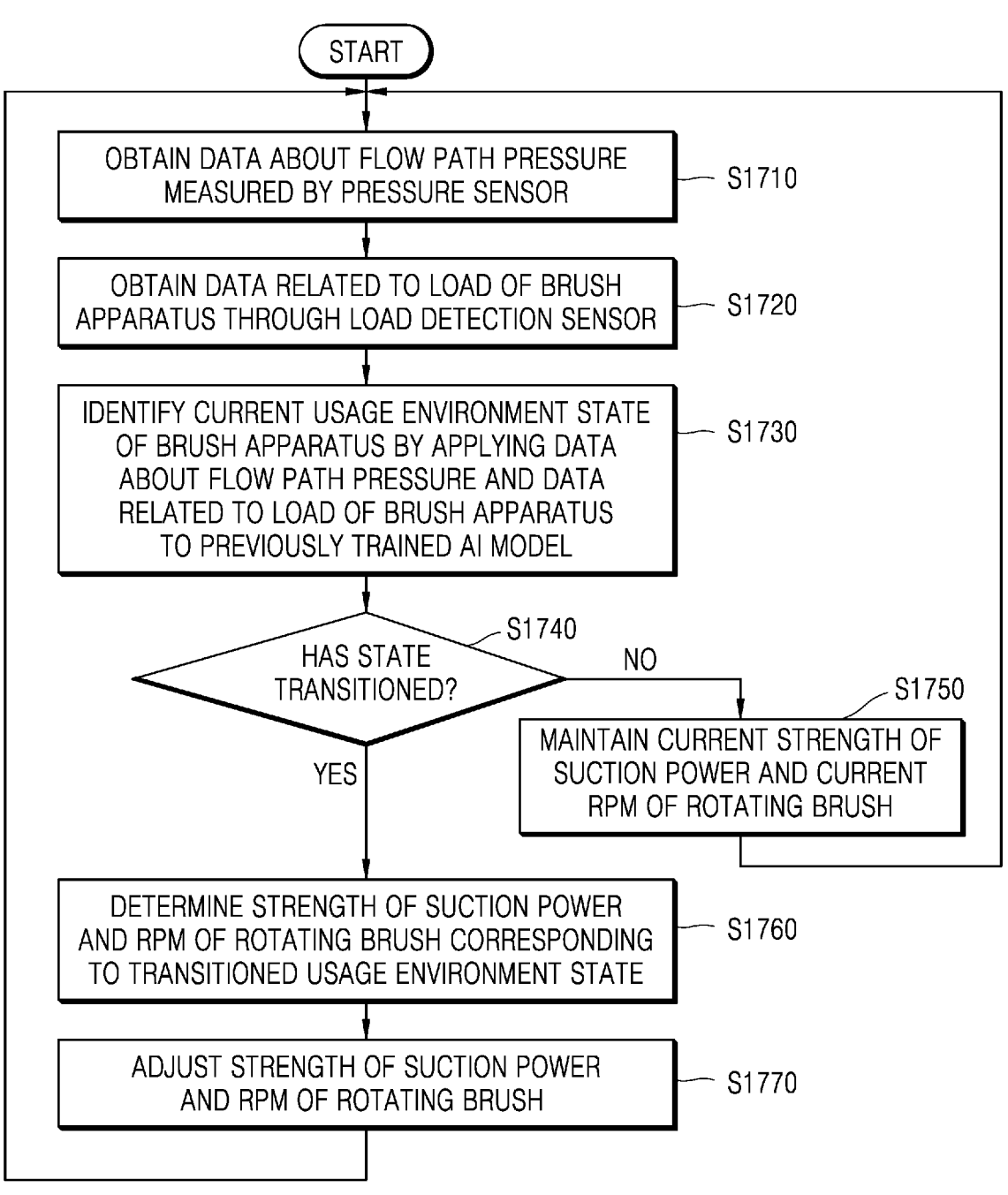
FIG. 17 is a flowchart illustrating a method performed by a cordless vacuum cleaner of identifying a transition of a usage environment state of a brush apparatus, according to an embodiment of the disclosure.

FIG. 17 is a flowchart illustrating a method performed by the cordless vacuum cleaner 100 of identifying a transition of a usage environment state of the brush apparatus 2000 according to an embodiment of the disclosure.

In operation S1710, the cordless vacuum cleaner 100 may obtain data about the flow path pressure measured by the pressure sensor 1400.

According to an embodiment of the disclosure, the at least one processor 1001 of the vacuum cleaner body 1000 may obtain a pressure value measured by the pressure sensor 1400. For example, the main processor 1800 may receive the pressure value measured by the pressure sensor 1400 from the pressure sensor 1400 through I2C communication. The pressure sensor 1400 may be located in the flow path to measure the pressure inside the flow path (flow path pressure). For example, the pressure sensor 1400 may be located in the suction duct 40 or the motor assembly 1100, but is not limited thereto.

In operation S1720, the vacuum cleaner body 1000 may obtain data related to the load of the brush apparatus 2000 through the load detection sensor 1134.

According to an embodiment of the disclosure, the load detection sensor 1134 may be located in the driving circuit 1130 of the motor assembly 1100 and may include a shunt resistor, a current detection circuit, a load detection circuit, etc., but is limited thereto. The main processor 1800 of the vacuum cleaner body 1000 may receive the data related to the load of the brush apparatus 2000 from the first processor 1131 in the motor assembly 1100.

In operation S1730, the vacuum cleaner body 1000 may identify the current usage environment state of the brush apparatus 2000 by applying the data about the flow path pressure and the data related to the load of the brush apparatus 2000 to a previously trained AI model.

For example, the main processor 1800 of the vacuum cleaner body 1000 may input the data about the flow path pressure obtained from the pressure sensor 1400 and the data related to the load of the brush apparatus 2000 obtained from the first processor 1131 to the previously trained AI model, and obtain the current usage environment state (e.g., a hard floor, a mat, a carpet, a lift, and a corner) of the brush apparatus 2000 as an inference result of the AI model.

Operations S1710 to S1730 respectively correspond to operations S810 to S830 of FIG. 8, and thus, detailed descriptions thereof are omitted.

In operation S1740, the cordless vacuum cleaner 100 may determine whether the current usage environment state of the brush apparatus 2000 has transitioned. For example, the main processor 1800 of the vacuum cleaner body 1000 may identify the transition of the usage environment state (hereinafter referred to as a state transition) of the brush apparatus 2000 by applying the data about the flow path pressure and the data related to the load of the brush apparatus 2000 to the AI model.

Figure 18:
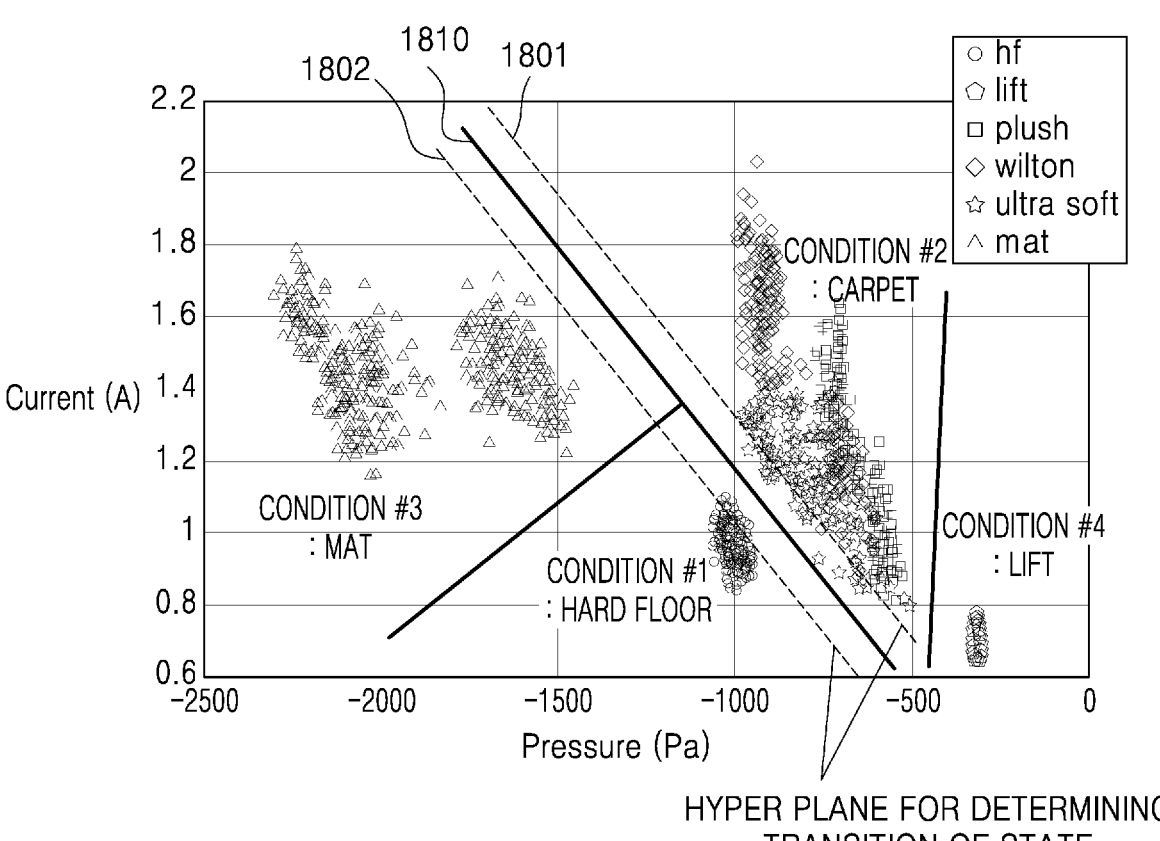
FIG. 18 is a flowchart illustrating a method performed by a cordless vacuum cleaner of identifying a transition of a usage environment state of a brush apparatus using an SVM model, according to an embodiment of the disclosure.

According to an embodiment of the disclosure, when the AI model is an SVM model, a hyperplane inferring the current usage environment state and a hyperplane inferring the state transition may be different from each other. For example, referring to FIG. 18, a first hyperplane 1810 classifying the hard floor and the carpet may be different from a 1-1th hyperplane 1801 identifying a state transition from the hard floor to the carpet and a 1-2th hyperplane 1802 identifying a state transition from the carpet to the hard floor. That is, when the load of the brush apparatus 2000 slightly increases while the cordless vacuum cleaner 100 is cleaning the hard floor, the current usage environment state may be inferred as the carpet with respect to the first hyperplane 1810. However, the current usage environment state may be inferred as the hard floor with respect to the 1-1th hyperplane 1801. In this case, the cordless vacuum cleaner 100 may determine that the usage environment state has not transitioned from the hard floor to the carpet.

On the other hand, when the current usage environment state is inferred as the carpet even with respect to the first hyperplane 1810, and the current usage environment state is inferred as the carpet even with respect to the 1-1th hyperplane 1801, the cordless vacuum cleaner 100 may determine that the usage environment state has transitioned from the hard floor to the carpet.

In operation S1750, when the state transition is not identified, the cordless vacuum cleaner 100 may maintain the current strength of suction power and the current RPM of a rotating brush.

In operation S1760, when the state transition is identified, the cordless vacuum cleaner 100 may determine the strength of the suction power and the RPM of the rotating brush (also referred to as a target RPM) corresponding to the transitioned usage environment state.

For example, when the state transition from the hard floor to the carpet is identified, the main processor 1800 of the vacuum cleaner body 1000 may determine the strength of the suction power and the RPM of the rotating brush to be higher than the current strength and the RPM. On the other hand, when the state transition from the carpet to the hard floor is identified, the main processor 1800 of the vacuum cleaner body 1000 may determine the strength of the suction power and the RPM of the rotating brush to be lower than the current strength and the RPM.

In operation S1770, the cordless vacuum cleaner 100 may adjust the strength of the suction power of the suction motor 1110 and the RPM of the rotating brush.

According to an embodiment of the disclosure, the main processor 1800 of the vacuum cleaner body 1000 may transfer the determined strength of the suction power and the target RPM of the brush apparatus 2000 to the first processor 1131. In this regard, the first processor 1131 may adjust the strength of the suction power of the suction motor 1110 to the determined strength of the suction power. The first processor 1131 may transmit the target RPM of the brush apparatus 2000 to the second processor 2410 by controlling the operation of the first switch device 1132 connected to the signal line 30. According to an embodiment of the disclosure, the first processor 1131 may transmit the target RPM of the brush apparatus 2000 to the second processor 2410 using a UART or an I2C.

Hereinafter, an operation in which the main processor 1800 transfers the target RPM to the second processor 2410 through the first processor 1131 is described in more detail with reference to FIG. 19.

Figure 19:
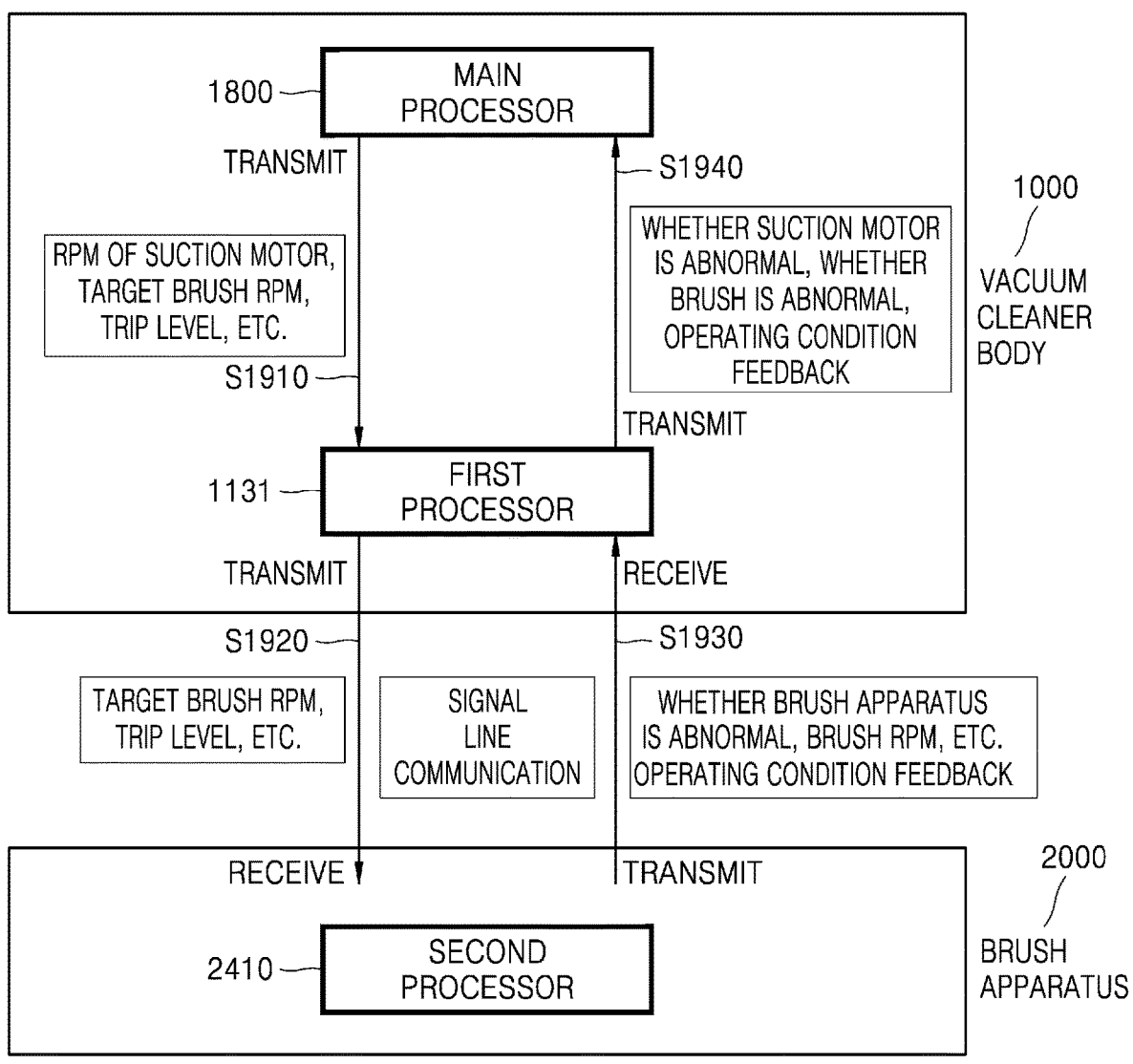
FIG. 19 is a diagram illustrating an operation in which a main processor communicates with a second processor through a first processor, according to an embodiment of the disclosure.

FIG. 19 is a diagram illustrating an operation in which the main processor 1800 communicates with the second processor 2410 through the first processor 1131 according to an embodiment of the disclosure.

Referring to FIG. 19, the main processor 1800 may use a previously stored AI model (e.g., an SVM model) to determine a RPM (power consumption or strength of suction power) of the suction motor 1110, a target RPM of the drum 2200 of the brush apparatus 2000, a trip level, etc. The main processor 1800 may determine the RPM of the suction motor 1110 based on a suction strength control input of a user through the user interface 1700.

In operation S1910, the main processor 1800 may transfer data including the RPM (power consumption or strength of suction power) of the suction motor 1110, the target RPM of the drum 2200 of the brush apparatus 2000, the trip level, etc. to the first processor 1131. For example, the main processor 1800 may transfer the data to the first processor 1131 using a UART, but is not limited thereto.

In operation S1920, the first processor 1131 may transfer data related to control of the brush apparatus 2000 among data received from the main processor 1800 to the second processor 2410 through signal line communication. For example, the first processor 1131 may transfer the data including the target RPM of the drum 2200 and a target trip level to the second processor 2410. In this regard, the first processor 1131 may transfer data representing operating conditions corresponding to the target RPM and the target trip level to the second processor 2410. An operation in which the first processor 1131 and the second processor 2410 transmit and receive data representing operating conditions is described in detail below with reference to FIG. 21.

When receiving the data related to control of the brush apparatus 2000 from the first processor 1131, the second processor 2410 of the brush apparatus 2000 may control the operation of the brush apparatus 2000. For example, the second processor 2410 may change the RPM of the drum 2200 to the target RPM or change the trip level to the target trip level.

In operation S1930, when receiving the data related to control of the brush apparatus 2000 from the first processor 1131, the second processor 2410 of the brush apparatus 2000 may transmit operating condition feedback data to the first processor 1131 through signal line communication. The operating condition feedback data may include whether the brush apparatus 2000 is abnormal, the current RPM of the drum 2200, etc., but is not limited thereto.

In operation S1940, when receiving the operating condition feedback data from the second processor 2410 of the brush apparatus 2000, the first processor 1131 of the vacuum cleaner body 1000 may transmit the operating condition feedback data of the second processor 2410 to the main processor 1800. The first processor 1131 may transmit the operating condition feedback data of the second processor 2410 to the main processor 1800 through the UART. In addition to the operating condition feedback data of the second processor 2410, the first processor 1131 may further transfer data including whether the suction motor 1110 is abnormal, the strength of the suction power of the suction motor 1110, the load of the brush apparatus 2000, the type of the brush apparatus 2000, etc. to the main processor 1800.

The main processor 1800 may determine the operating condition of the suction motor 1110 and the operating condition of the brush apparatus 2000 based on the data received from the first processor 1131. Also, the main processor 1800 may monitor the usage environment state of the brush apparatus 2000 and continuously control the operation of the brush apparatus 2000 according to the usage environment state of the brush apparatus 2000. For example, as operations S1910 to S1940 are repeatedly performed, the first processor 1131 may transmit a control command of the main processor 1800 to the second processor 2410.

Hereinafter, an example of a circuit for signal line communication between the first processor 1131 and the second processor 2410 is described in detail with reference to FIG. 20.

Figure 20:
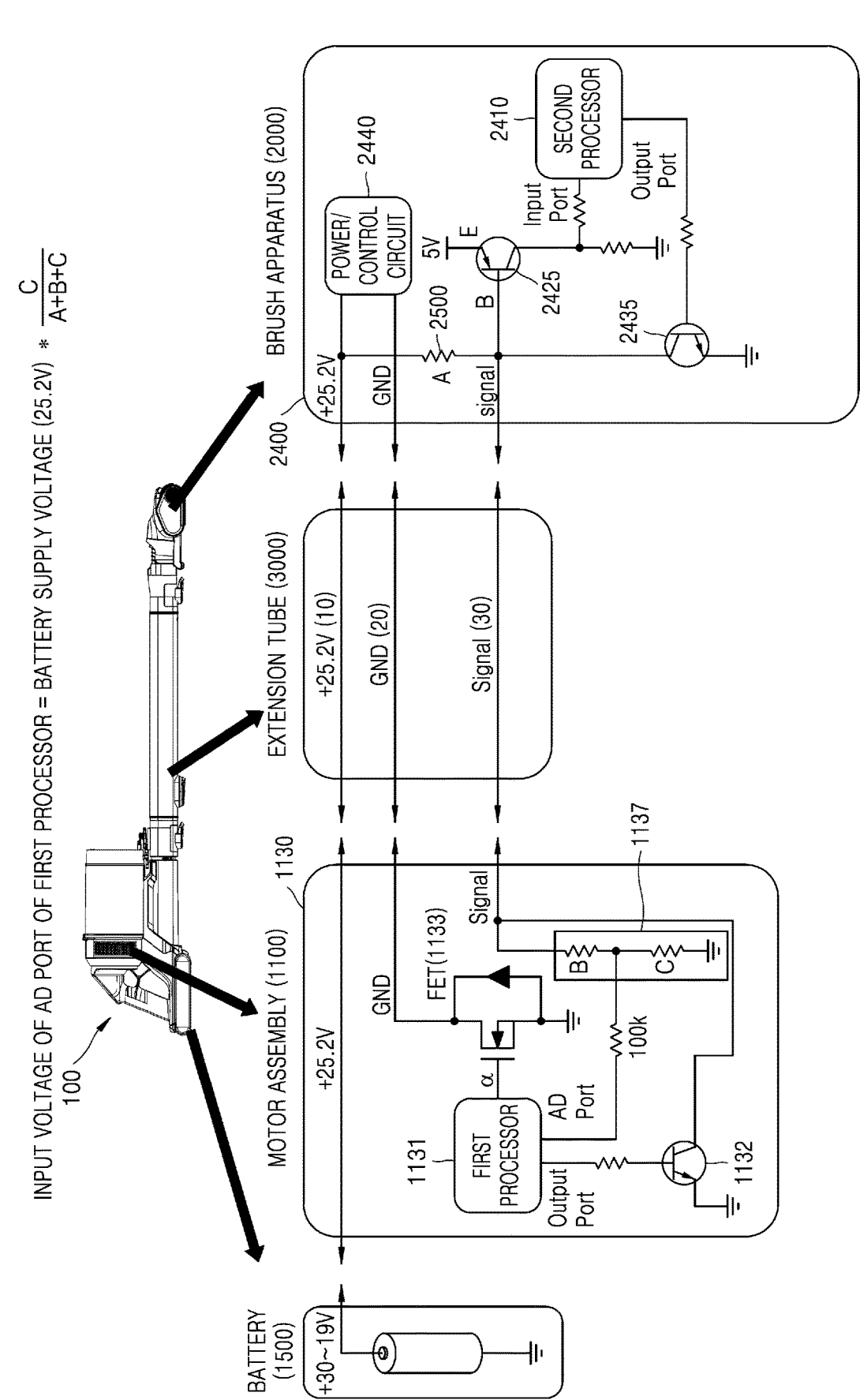
FIG. 20 is a diagram illustrating a circuit for signal line communication of a cordless vacuum cleaner, according to an embodiment of the disclosure.

FIG. 20 is a diagram illustrating a circuit for signal line communication of the cordless vacuum cleaner 100 according to an embodiment of the disclosure. In FIG. 20, for convenience of description, a case where A is 330 KΩ, B is 330 KΩ, and C is 82 KΩ is described as an example.

The first processor 1131 may identify the type of the brush apparatus 2000 based on the voltage input to an input port (an AD port). For example, because an AD port input voltage of the first processor 1131 is $$2.785 \text{ V} \left( = \text{battery supply voltage} * \frac{C}{A+B+C} \right),$$

the first processor 1131 may identify that the multi-brush 501 having the ID resistance 2500 of 330 KΩ corresponding to 2.785 V that is the AD port input voltage is connected to the cleaner body 1000 (see table 700 in FIG. 7).

When the brush apparatus 2000 coupled to the cordless vacuum cleaner 100 is identified as the multi-brush 501 including the driving circuit 2400, the vacuum cleaner body 1000 may perform signal line communication with the brush apparatus 2000.

The first processor 1131 of the vacuum cleaner body 1000 may receive a signal using an input port and transmit a signal using an output port. For example, when the first processor 1131 outputs a low signal through the output port, the first switch device 1132 may be turned off. As the first switch device 1132 is turned off, the voltage of the signal line 30 may be about $$14 \text{ V} \left( = \text{battery supply voltage} * \frac{B+C}{A+B+C} \right)$$

in a high state. When the voltage of the signal line 30 is about 14 V greater than 5 V, the PNP transistor 2425 may be turned off, and a low signal (0 V) may be input to the input port of the second processor 2410. To the contrary, when the first processor 1131 outputs a high signal through the output port, the first switch device 1132 may be turned on. As the first switch device 1132 is turned on, the voltage of the signal line 30 may change to 0 V GND in a low state. When the voltage of the signal line 30 is 0 V, the PNP transistor 2425 may be turned on, and a high signal (about 4.8 V) may be input to the input port of the second processor 2410. That is, when the first processor 1131 outputs a low signal through the output port, the low signal may be input to the input port of the second processor 2410, and when the first processor 1131 outputs a high signal through the output port, the high signal may also be input to the input port of the second processor 2410.

The second processor 2410 of the brush apparatus 2000 may receive a signal using the input port and transmit a signal using the output port. For example, when the second processor 2410 outputs a high signal through the output port, the second switch device 2435 may be turned on. As the second switch device 2435 is turned on, the voltage of the signal line 30 may change to 0 V GND in the low state. When the voltage of the signal line 30 is 0 V, the low signal (0 V) may be input to the input port of the first processor 1131. To the contrary, when the second processor 2410 outputs a low signal through the output port, the second switch device 2435 may be turned off. As the second switch device 2435 is turned off, the voltage of the signal line 30 may be about $$14 \text{ V} \left( = \text{battery supply voltage} * \frac{B+C}{A+B+C} \right)$$

in a high state. When the voltage of the signal line 30 is about 14 V, 2.785 V may be input to the input port of the first processor 1131. At this time, because the driving circuit 1130 of the vacuum cleaner body 1000 includes a voltage divider 1137, the voltage divider 1137 may divide the high voltage of 14 V of the signal line 30 so that 2.785 V may be input to the input port of the first processor 1131. That is, when the second processor 2410 outputs the high signal through the output port, the low signal 0 B may be input to the input port of the first processor 1131, and when the second processor 2410 outputs the low signal through the output port, 2.785 V (approximately 2.8 V) may be input to the input port of the first processor 1131.

In FIG. 20, the example in which the PNP transistor 2425 is included in the driving circuit 2400 of the brush apparatus 2000 as a switch device has been described, but the embodiment of the disclosure is not limited thereto. For example, a P-channel FET may be used as the switch device instead of the PNP transistor 2425.

According to an embodiment of the disclosure, when the first processor 1131 receives a signal from the second processor 2410, the driving circuit 1130 for signal line communication of the vacuum cleaner body 1000 includes the voltage divider 1137, stable signal transmission is possible by minimizing the influence of noise on the signal line 30. That is, because the driving circuit 1130 of the vacuum cleaner body 1000 includes the voltage divider 1137, even when a noise voltage is applied to the signal line 30, the noise voltage may also be divided and input to the input port (the AD port) of the first processor 1131. A case in which noise of ±1.5 V is generated is described as an example.

In the general circuit, the AD port voltage may be 3.3 V in a situation where no noise occurs (normal), and the AD port voltage may be 1.8 V to 4.8 V in a situation where noise of ±1.5 V occurs. That is, when noise occurs in the general circuit, the AD port voltage may exceed the maximum AD port voltage (e.g., 3.3 V) of a microcomputer, and thus, the first processor 1131 may be easily damaged. Also, in the general circuit, a high signal may be misrecognized as a low signal (or the low signal as the high signal) due to the noise (±1.5 V).

However, according to the driving circuit 1130 according to an embodiment of the disclosure, the input port voltage of the first processor 1131 may be 2.78V, for example, in a situation where no noise occurs (normal), or even when noise of ±1.5 V is generated, the input port voltage of the first processor 1131 may be, for example, 2.49 V to 3.08 V. That is, according to the driving circuit 1130 including the voltage divider 1137, even when noise occurs, the input port voltage of the first processor 1131 does not exceed the maximum voltage of the AD port of the microcomputer (e.g., 3.3 V), and thus, a robust signal transmission is possible. In addition, even when noise of ±1.5V is generated on the signal line 30, the noise affects only about ±0.3 V to the input port of the first processor 1131, and thus, a signal distortion phenomenon (e.g., a high signal is misrecognized as a low signal, or a low signal is misrecognized as a high signal) may be minimized.

Hereinafter, signal transmission between the vacuum cleaner body 1000 and the brush apparatus 2000 is described in more detail with reference to FIGS. 21 to 24.

FIG. 21 is a diagram illustrating a data format included in a signal transmitted between the vacuum cleaner body 1000 and the brush apparatus 2000 according to an embodiment of the disclosure.

Referring to FIG. 21, a lookup table 2110 including operation information 2102 of the vacuum cleaner body 1000 corresponding to operating conditions 2101 and data 2103 indicating the operating conditions 2101 may be stored in each of the memory 1900 of the vacuum cleaner body 1000 and a memory of the brush apparatus 2000. At this time, the operation information 2102 of the cordless vacuum cleaner 100 corresponding to the operating conditions 2101 may include a power consumption of the suction motor 1110, a drum RPM of the brush apparatus 2000, and a trip level of the brush apparatus 2000, etc., but is not limited thereto. In addition, the data 2103 indicating the operating conditions 2101 may be 8-bit data, but is not limited thereto. For example, the data 2103 indicating the operating conditions 2101 may be 5-bit data.

According to an embodiment of the disclosure, when the data 2103 indicating the operating conditions 2101 includes 8 bits, the data 2103 indicating the operating conditions 2101 may include one start bit, three command bits, three parity bits, and one stop bit. In FIG. 21, because the data 2103 include three command bits, operating conditions 2101 are classified into eight conditions, but when the number of command bits increases, the number of operating conditions may increase.

The operating conditions 2101 may be classified according to the type of the brush apparatus 2000, the usage environment state (e.g., a hard floor, a carpet, a mat, a corner, a state of being lifted from a surface to be cleaned, etc.) of the brush apparatus 2000, abnormality of the suction motor 1110, etc.

Referring to the lookup table 2110 of FIG. 21, a first operating condition indicates a case in which the surface to be cleaned is the hard floor, and first operation information under the first operating condition may be "power consumption of the suction motor 1110: 70 W, drum RPM: 2000, and trip level: 4.0 A". That is, when the main processor 1800 identifies that the current state of the surface to be cleaned is the hard floor, the cordless vacuum cleaner 100 may determine to operate based on the first operation information corresponding to the first operating condition. Accordingly, the main processor 1800 may transfer information about the first operating condition to the first processor 1131, and the first processor 1131 may determine the first operation information corresponding to the first operating condition and adjust the power consumption of the suction motor 1110 to 70 W. In addition, the first processor 1131 may transmit data 00011101 indicating the first operating condition to the second processor 2410. When receiving the data 00011101 indicating the first operating condition, the second processor 2410 may determine the first operation information corresponding to the first operating condition, adjust the drum RPM to 2000 rpm, and set the trip level to 4.0 A.

The second operating condition indicates when the surface to be cleaned is the carpet (a normal load), and second operation information under a second operating condition may be "power consumption of the suction motor 1110: 115 W, drum RPM: 3800, and trip level: 4.9 A". That is, when the main processor 1800 identifies that the current state of the surface to be cleaned is the carpet (the normal load), the cordless vacuum cleaner 100 may determine to operate based on the second operation information corresponding to the second operating condition. Accordingly, the main processor 1800 may transmit information about the second operating condition to the first processor 1131, and the first processor 1131 may determine the second operation information corresponding to the second operating condition and adjust the power consumption of the suction motor 1110 to 115 W. In addition, the first processor 1131 may transmit data 00101011 indicating the second operating condition to the second processor 2410. When receiving the data 00101011 indicating the second operating condition, the second processor 2410 may determine the second operation information corresponding to the second operating condition, adjust the drum RPM to 3800 rpm, and set the trip level to 4.9 A. The power consumption (the strength of the suction power) of the suction motor 1110 is greater when the state of the surface to be cleaned is the carpet (the normal load) than when the surface is the hard floor, and thus, the trip level may also increase from 4.0 A to 4.9 A. The trip level is for preventing the overload of the brush apparatus 2000, and the motor 2100 may stop when the load of the brush apparatus 2000 reaches 4.9 A.

A third operating condition indicates when the surface to be cleaned is the carpet (an overload, and a high-density carpet), and third operation information under the third operating condition may be "power consumption of the suction motor 1110: 40 W, drum RPM: 2000, and Trip level: 4.9 A". The brush apparatus 2000 may come into closer contact with the surface to be cleaned when the state of the surface to be cleaned is the carpet (the overload) than when the state is the carpet (the normal load), and thus, the vacuum cleaner body 1000 may reduce the power consumption of the suction motor 1110 and may also reduce the drum RPM of the brush apparatus 2000. When the main processor 1800 identifies that the current state of the surface to be cleaned is the carpet (the overload), the cordless vacuum cleaner 100 may determine to operate based on the third operation information corresponding to the third operating condition. Accordingly, the main processor 1800 may transmit information about the third operating condition to the first processor 1131, and the first processor 1131 may determine the third operation information corresponding to the third operating condition and adjust the power consumption of the motor 1110 to 40 W. In addition, the first processor 1131 may transmit data 00111001 indicating the third operating condition to the second processor 2410. When receiving the data 00111001 indicating the third operating condition, the second processor 2410 may determine the third operation information corresponding to the third operating condition, adjust the drum RPM to 2000 rpm, and set the trip level to 4.9 A.

A fourth operating condition indicates a state of the brush apparatus 2000 lifted from the surface to be cleaned (hereinafter, also referred to as a lift state), and fourth operation information under the fourth operating condition may be "power consumption of the suction motor 1110: 40 W, drum RPM: 1000, and trip level: 4.0 A". Because the strength of the suction power does not need to be high in the lift state, the vacuum cleaner body 1000 may reduce the power consumption of the suction motor 1110 to the lowest power consumption (e.g., 40 W), and may also reduce the drum RPM of the brush apparatus 2000 to the lowest RPM (1000 rpm). When the main processor 1800 identifies that the current state of the surface to be cleaned is the lift state, the cordless vacuum cleaner 100 may determine to operate based on the fourth operation information corresponding to the fourth operating condition. Accordingly, the main processor 1800 may transmit information about the fourth operating condition to the first processor 1131, and the first processor 1131 may determine the fourth operation information corresponding to the fourth operating condition and adjust the power consumption of the motor 1110 to 40 W. In addition, the first processor 1131 may transmit data 01000111 indicating the fourth operating condition to the second processor 2410. When receiving the data 01000111 indicating the fourth operating condition, the second processor 2410 may determine the fourth operation information corresponding to the fourth operating condition, adjust the drum RPM to 1000 rpm, and set the trip level to 4.0 A.

A fifth operating condition indicates when the surface to be cleaned is a mat, and fifth operation information under the fifth operating condition may be "power consumption of the suction motor 1110: 58 W, drum RPM: 1000, and trip level: 4.9 A". That is, when the main processor 1800 identifies that the state of the current surface to be cleaned is the mat, the cordless vacuum cleaner 100 may determine to operate based on the fifth operation information corresponding to the fifth operating condition. Accordingly, the main processor 1800 may transfer information about the fifth operating condition to the first processor 1131, and the first processor 1131 may determine the fifth operation information corresponding to the fifth operating condition and adjust the power consumption of the motor 1110 to 58 W. In addition, the first processor 1131 may transmit data 01010101 indicating the fifth operating condition to the second processor 2410. When receiving data 01010101 indicating the fifth operating condition, the second processor 2410 may determine the fifth operation information corresponding to the fifth operating condition, adjust the drum RPM to 1000 rpm, and set the trip level to 4.9 A.

A sixth operating condition indicates when the operation of the cordless vacuum cleaner 100 needs to be stopped, and sixth operation information under the sixth operating condition may be "power consumption of the suction motor 1110: 58 W, drum RPM: 0, and trip level: 0 A". For example, the vacuum cleaner body 1000 may determine to stop the operation of the brush motor 2100 by identifying the abnormality of the motor 2100 (hereinafter, referred to as a brush motor 2100) included in the brush apparatus 2000. The main processor 1800 may identify the abnormality of the brush motor 2100 to stop the operation of the brush motor 2100, and the first processor 1131 may identify the abnormality of the brush motor 2100 to stop the operation of the brush motor 2100. When the first processor 1131 determines to stop the operation of the brush motor 2100, the first processor 1131 may control on/off operation of the first switch device 1132 to transmit a signal for stopping the operation of the brush apparatus 2000 (e.g.: data 01100011 indicating a sixth operating condition) to the second processor 2410 of the brush apparatus 2000 through the signal line 30. When receiving the data 01100011 indicating the sixth operating condition, the second processor 2410 may determine sixth operation information (drum RPM: 0, and trip level: 0 A) corresponding to the sixth operating condition, and stop the operation of the brush motor 2100.

Hereinafter, an example in which the first processor 1131 of the vacuum cleaner body 1000 transmits the 8-bit data 01010101 indicating the fifth operating condition to the second processor 2410 of the brush apparatus 2000 is described in detail with reference to FIG. 22.

Figure 22:
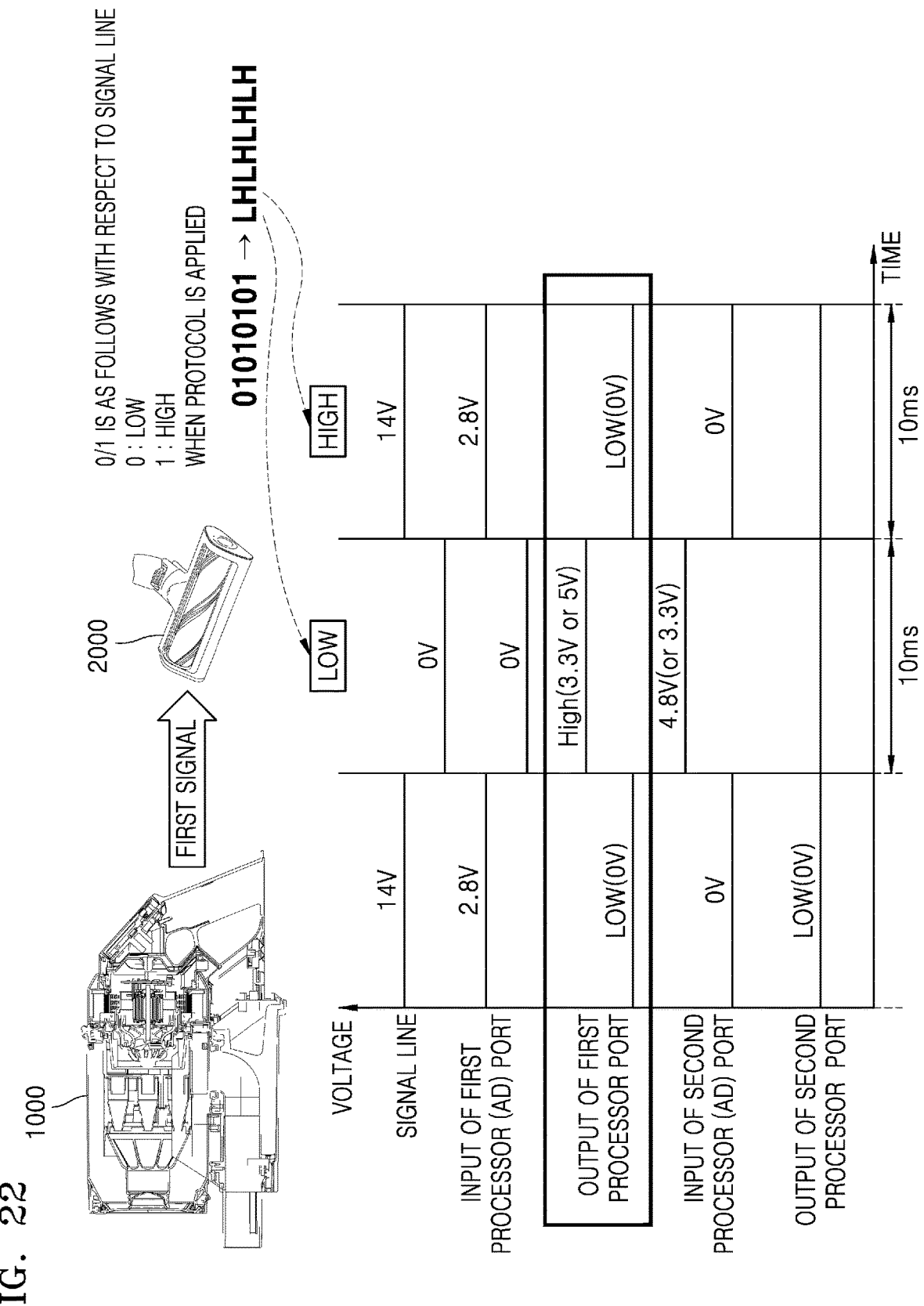
FIG. 22 is a diagram illustrating an operation in which vacuum cleaner body transmits a signal to a brush apparatus, according to an embodiment of the disclosure.

FIG. 22 is a diagram illustrating an operation in which the vacuum cleaner body 1000 transmits a signal to the brush apparatus 2000 according to an embodiment of the disclosure.

In FIG. 22, a case in which the vacuum cleaner body 1000 transmits an 8-bit signal 01010101 indicating a fifth operating condition to the brush apparatus 2000 and has a transmission time of 10 milliseconds (ms) per bit is described as an example.

According to a communication protocol according to an embodiment of the disclosure, 0 and 1 may be classified with respect to a state of the signal line 30. For example, a "0" bit may be transmitted when the signal line 30 is in a low state (L), and a "1" bit may be transmitted when the signal line 30 is in a high state (H). Accordingly, the first processor 1131 may turn on the first switch device 1132 to transmit code 0 so that a voltage of a first level lower than a threshold value is applied to the signal line 30, and may turn off the first switch device 1132 to transmit code 1 so that a voltage of a second level greater than the threshold value is applied to the signal line 30.

The first processor 1131 may set the state of the signal line 30 to LHLHLHLH in order to transmit 01010101 indicating the fifth operating condition to the second processor 2410. For example, the first processor 1131 may repeat, four times, an operation of outputting a high signal (5 V or 3.3 V) through an output port for the first 10 ms to turn on the first switch device 1132 and set the state of the signal line 30 to be low (0 V), and then outputting a low signal (0 V) through the output port for the next 10 ms to turn off the first switch device 1132 and set the state of the signal line 30 to be high (14 V). In this case, the first processor 1131 may transfer 01010101 to the second processor 2410 for 80 ms. While the first processor 1131 transmits a signal, the output port of the second processor 2410 may maintain a low (0 V) state.

When receiving the first signal 01010101 indicating the fifth operating condition from the vacuum cleaner body 1000, the second processor 2410 may determine fifth operation information (power consumption of the suction motor 1110: 58 watts (W), drum RPM: 1000, and trip level: 4.9 A) corresponding to the fifth operating condition from the lookup table 2110 stored in the memory of the brush apparatus 2000. Also, the second processor 2410 may adjust the drum RPM to 1000 rpm and set the trip level to 4.9 A. Thereafter, the second processor 2410 may transmit a second signal indicating the current state to the first processor 1131 in response to the first signal. For example, because the second processor 2410 has changed the setting based on the fifth operation information corresponding to the fifth operating condition, the second processor 2410 may transmit the second signal indicating that the current state corresponds to the fifth operating condition (e.g., 01010101) to the first processor 1131. An operation in which the second processor 2410 transmits the second signal (e.g., 01010101) indicating the current state to the first processor 1131 is described with reference to FIG. 23.

Figure 23:
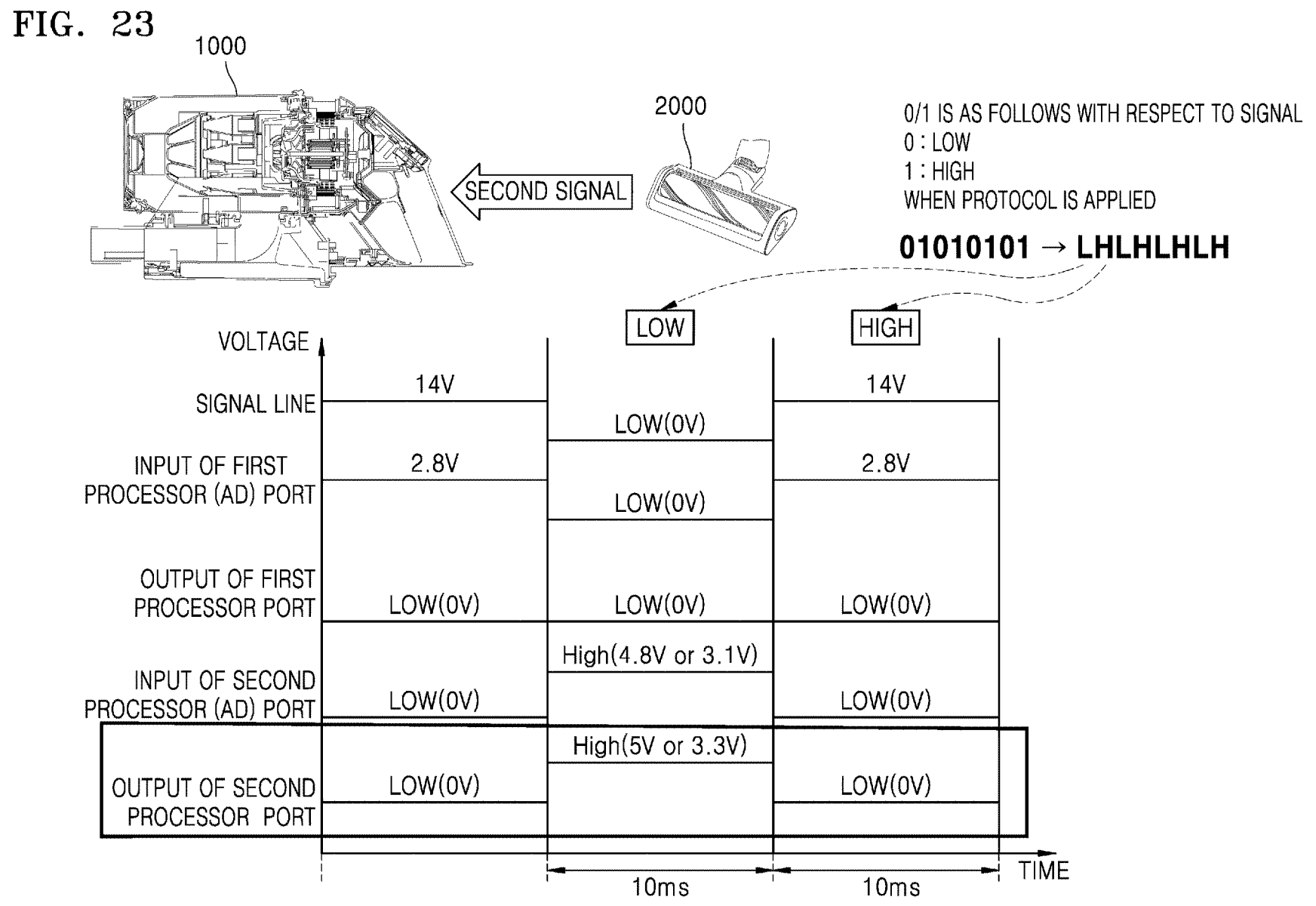

FIG. 23 is a diagram illustrating an operation in which brush apparatus 2000 transmits a signal to the vacuum cleaner body 1000 according to an embodiment of the disclosure.

In FIG. 23, a case in which the brush apparatus 2000 transmits a second signal (e.g., 01010101) indicating that the current state corresponds to a fifth operating condition to the vacuum cleaner body 1000 and has a transmission time of 10 ms per bit is described as an example.

According to a communication protocol according to an embodiment of the disclosure, 0 and 1 may be classified with respect to a state of the signal line 30. For example, 0 may be transmitted when the signal line 30 is in a low state L, and 1 may be transmitted when the signal line 30 is in a high state H. Accordingly, the second processor 2410 may turn on the second switch device 2435 to transmit code 0 so that a voltage of a first level lower than a threshold value is applied to the signal line 30, and may turn off the second switch device 2435 to transmit code 1 so that a voltage of a second level greater than the threshold value is applied to the signal line 30.

The second processor 2410 may set the state of the signal line 30 to LHLHLHLH in order to transmit the second signal (e.g., 01010101) indicating that the second processor 2410 is currently operating in a state corresponding to the fifth operating condition to the first processor 1131. For example, the second processor 2410 may repeat, four times, an operation of outputting a high signal (5 V or 3.3 V) through an output port for the first 10 ms to turn on the second switch device 2435 and set the state of the signal line 30 to be low (0 V), and then outputting a low signal (0 V) through the output port for the next 10 ms to turn off the second switch device 2435 and set the state of the signal line 30 to be high (14 V). In this case, the second processor 2410 may transfer 01010101 to the second processor 2410 for 80 ms. While the second processor 2410 transmits a signal, the output port of the first processor 1131 may maintain a low (0 V) state.

When receiving the second signal (e.g., 01010101) indicating the fifth operating condition from the second processor 2410 of the brush apparatus 2000, the first processor 1131 may determine fifth operation information (power consumption of the suction motor 1110: 58 W, drum RPM: 1000, and trip level: 4.9 A) corresponding to the fifth operating condition from the lookup table 2110 stored in the memory 1900 of the vacuum cleaner body 1000. Also, the first processor 1131 may identify that the current drum RPM of the brush apparatus 2000 is 1000 rpm and the current trip level is 4.9 A.

An operation of transmitting and receiving signals between the vacuum cleaner body 1000 and the brush apparatus 2000 is described in more detail with reference to FIG. 24.

Figure 24:
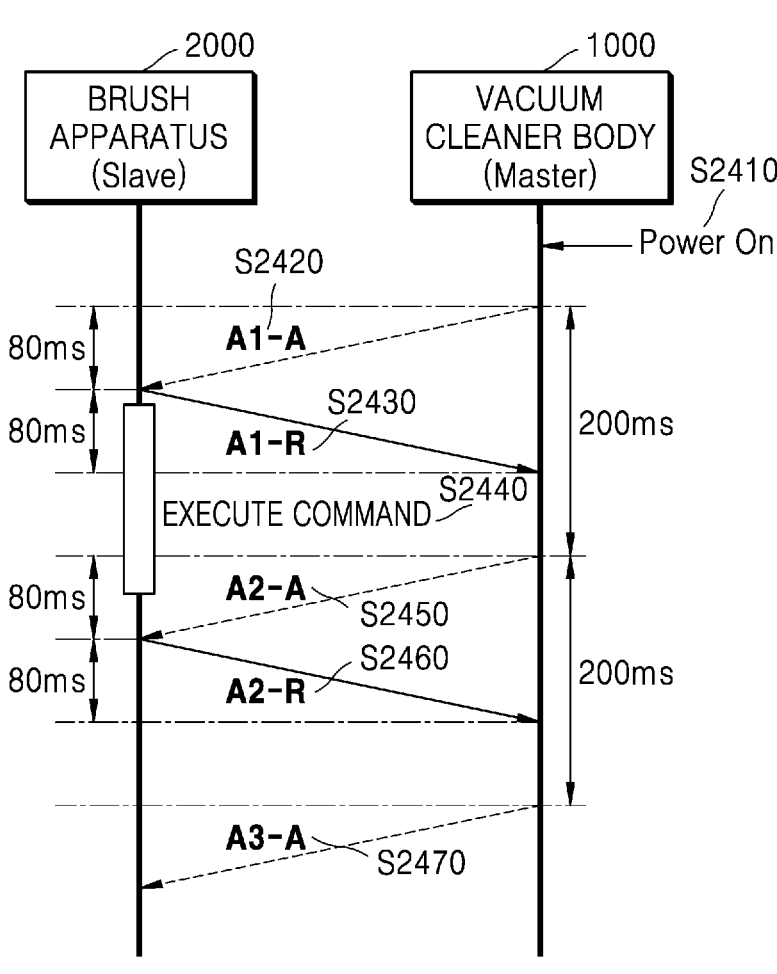
FIG. 24 is a flowchart illustrating an operation of mutually transmitting signals between a vacuum cleaner body and a brush apparatus, according to an embodiment of the disclosure.

FIG. 24 is a flowchart illustrating an operation of mutually transmitting signals between the vacuum cleaner body 1000 and the brush apparatus 2000 according to an embodiment of the disclosure. In FIG. 24, a case in which the vacuum cleaner body 1000 operates as a master or primary device and the brush apparatus 2000 operates as a slave device is described as an example.

The vacuum cleaner body 1000 may receive a user input to power on (S2410). When the vacuum cleaner body 1000 is powered on, the vacuum cleaner body 1000 may communicate with the brush apparatus 2000 coupled to the cordless vacuum cleaner 100 through the signal line 30. For example, the vacuum cleaner body 1000 may transmit an A1 signal A1-A indicating a first operating condition to the brush apparatus 2000 (S2420). The A1 signal A1-A may be transmitted for 80 ms. When the brush apparatus 2000 receives the A1 signal A1-A, the brush apparatus 2000 may transmit an A1 response signal A1-R indicating a current state to the vacuum cleaner body 1000 (S2430). The A1 response signal A1-R may also be transmitted for 80 ms.

The brush apparatus 2000 may execute a command according to the A1 signal A1-A (S2440). For example, the brush apparatus 2000 may adjust a drum RPM, a trip level, etc. based on first operation information corresponding to a first operating condition.

The vacuum cleaner body 1000 may transmit an A2 signal A2-A to the brush apparatus 2000 when a certain time elapses after transmitting the A1 signal A1-A (S2450). In FIG. 24, a case in which the certain time is 200 ms is described as an example, but the embodiment of the disclosure is not limited thereto. When the usage environment state (e.g., a hard floor, a carpet, a mat, a corner, a lift, etc.) of the brush apparatus 2000 does not change until the A1 signal A1-A and the A2 signal A2-A are sequentially transmitted, the A2 signal A2-A may continue to indicate the first operating condition. On the other hand, when the usage environment state of the brush apparatus 2000 changes between the sequential transmission of the A1 signal A1-A and the A2 signal A2-A, the A2 signal A2-A may indicate a second operating condition other than the first operating condition.

When the brush apparatus 2000 receives the A2 signal A2-A, the brush apparatus 2000 may transmit an A2 response signal A2-R indicating the current state to the vacuum cleaner body 1000 (S2460). The A2 response signal A2-R may also be transmitted for 80 ms. In this regard, a command execution result of the brush apparatus 2000 may be included in the A2 response signal A2-R. For example, when the brush apparatus 2000 adjusts a drum RPM, a trip level, etc. based on first operation information corresponding to the first operating condition, the A2 response signal A2-R may include data indicating the first operating condition (or data indicating the drum RPM and the trip level).

The vacuum cleaner body 1000 may transmit an A3 signal A3-A to the brush apparatus 2000 when a certain time (200 ms) elapses after transmitting the A2 signal A2-A (S2470). When receiving the A3 signal A3-A, the brush apparatus 2000 may transmit an A3 response signal A3-A indicating the current state to the vacuum cleaner body 1000.

Therefore, the vacuum cleaner body 1000 continuously communicates with the brush apparatus 2000 at an interval of the certain time (200 ms), thereby adaptively controlling the operation of the brush apparatus 2000 according to the usage environment state of the brush apparatus 2000 (e.g., the hard floor, the carpet, the mat, the corner, the lift, etc.)

For example, when a user is cleaning the hard floor with the cordless vacuum cleaner 100, the vacuum cleaner body 1000 may transmit the data indicating the first operating condition corresponding to the hard floor to the brush apparatus 2000, and the brush apparatus 2000 may change the drum RPM to 2000 rpm based on the first operating condition corresponding to the hard floor. While the user is cleaning the hard floor, the vacuum cleaner body 1000 may transmit the data indicating the first operating condition corresponding to the hard floor to the brush apparatus 2000 every 200 ms, and the brush apparatus 2000 may respond to the vacuum cleaner body 1000 with the current state (operate based on the first operating condition corresponding to the hard floor). When the user cleans the carpet (a normal load) instead of the hard floor, the vacuum cleaner body 1000 may transmit data indicating the second operating condition corresponding to the carpet (the normal load) to the brush apparatus 2000, and the brush apparatus 2000 may change the drum RPM to 3800 rpm based on the second operating condition corresponding to the carpet (the normal load). Also, the brush apparatus 2000 may respond to the vacuum cleaner body 1000 with the current state (operate based on the second operating condition corresponding to the carpet).

According to an embodiment of the disclosure, when the vacuum cleaner body 1000 does not receive the second signal from the brush apparatus 2000 for a certain time after transmitting the first signal through the signal line 30, the vacuum cleaner body 1000 may determine that communication with the brush apparatus 2000 is not possible. For example, when a response signal (the second signal) is not received from the brush apparatus 2000 while the vacuum cleaner body 1000 transmits the first signal to the brush apparatus 2000 three times, the vacuum cleaner body 1000 may determine that communication with the brush apparatus 2000 is not possible.

When the vacuum cleaner body 1000 determines that communication with the brush apparatus 2000 is impossible, the vacuum cleaner body 1000 may switch an operation mode from an AI mode to a normal mode. The AI mode may be a mode in which strength of the suction power of the suction motor 1110 or the drum RPM of the brush apparatus 2000 is automatically adjusted according to the usage environment state of the brush apparatus 2000, and the normal mode may be a mode in which a user needs to manually adjust the strength of the suction power of the suction motor 1110. When communication with the brush apparatus 2000 is impossible, the vacuum cleaner body 1000 may not transmit data to adjust the drum RPM of the brush apparatus 2000 to the brush apparatus 2000, and thus, the vacuum cleaner body 1000 may not operate in the AI mode any longer.

When the vacuum cleaner body 1000 determines that communication with the brush apparatus 2000 is impossible, the vacuum cleaner body 1000 may output a notification indicating that an operation in the AI mode is impossible through an output interface. An operation in which the vacuum cleaner body 1000 outputs a notification is described below in detail with reference to FIG. 36.

Meanwhile, according to an embodiment of the disclosure, when the vacuum cleaner body 1000 determines that communication with the brush apparatus 2000 is not possible, the vacuum cleaner body 1000 may not adjust the drum RPM of the brush apparatus 2000 but adjust only the strength of the suction power of the suction motor 1110 according to the usage environment state of the brush apparatus 2000.

FIG. 25 is a diagram illustrating an operation in which the vacuum cleaner body 1000 identifies the type of the brush apparatus 2000 based on a signal received from the brush apparatus 2000 according to an embodiment of the disclosure.

Referring to FIG. 25, the brush apparatus 2000 may indicate the type of the brush apparatus 2000 using a start bit of a data signal transmitted during signal line communication. For example, the brush apparatus 2000 may define the start bit as 11 when the brush apparatus 2000 is an A-type brush, define the start bit as 10 when the brush apparatus 2000 is a B-type brush, define the start bit as 01 when the brush apparatus 2000 is a C-type brush, and define the start bit as 00 when the brush apparatus 2000 is a D-type brush, but is not limited thereto.

According to an embodiment of the disclosure, the vacuum cleaner body 1000 may identify the type of the brush apparatus 2000 by analyzing a start bit of a data signal transmitted from the brush apparatus 2000. For example, when the start bit includes 11, the vacuum cleaner body 1000 may identify the brush apparatus 2000 as the A-type brush, and when the start bit includes 10, the vacuum cleaner body 1000 may identify the brush apparatus 2000 as the B-type brush.

According to an embodiment of the disclosure, when the number of types of the brush apparatus 2000 exceeds 4, the number of start bits may increase. Meanwhile, according to an embodiment of the disclosure, a separate bit indicating the type of the brush apparatus 2000 may be added to the data signal instead of the start bit.

FIG. 26 is a diagram illustrating an operation of controlling the lighting device 2300 according to a usage environment state of the brush apparatus 2000 according to an embodiment of the disclosure.

According to an embodiment of the disclosure, the vacuum cleaner body 1000 may determine a lighting brightness and a lighting color of the brush apparatus 2000, according to a usage environment state of the brush apparatus 2000 (e.g., a hard floor, a mat, a normal carpet, a high-density carpet, a lift, a wall corner, etc.), in addition to a power consumption of the suction motor 1110 and a drum RPM of the brush apparatus 2000. The vacuum cleaner body 1000 may transmit data about the determined lighting brightness or the determined lighting color to the second processor 2410 of the brush apparatus 2000 through signal line communication. In this regard, the second processor 2410 of the brush apparatus 2000 may control the lighting device 2300 based on the lighting brightness or lighting color determined by the vacuum cleaner body 1000.

For example, when the usage environment state of the brush apparatus 2000 is a lift 2601, the vacuum cleaner body 1000 may determine the color of the lighting device 2300 as white, and the lighting device 2300 may output a white light under the control by the vacuum cleaner body 1000. In addition, when the usage environment state of the brush apparatus 2000 is a hard floor 2602, the vacuum cleaner body 1000 may determine the color of the lighting device 2300 as green, when the usage environment state of the brush apparatus 2000 is a mat 2603, the vacuum cleaner body 1000 may determine the color of the lighting device 2300 as yellow, when the usage environment state of the brush apparatus 2000 is a carpet 2604 or 2605, the vacuum cleaner body 1000 may determine the color of the lighting device 2300 as blue, and when the usage environment state of the brush apparatus 2000 is a wall (corner) 2606, the vacuum cleaner body 1000 may determine the color of the lighting device 2300 as orange.

According to an embodiment of the disclosure, a user may recognize a change in the usage environment state of the brush apparatus 2000 through a change in the color of the lighting device 2300.

Hereinafter, various circuits enabling communication between the vacuum cleaner body 1000 and the brush apparatus 2000 are described with reference to FIGS. 27 to 34.

Figure 27:
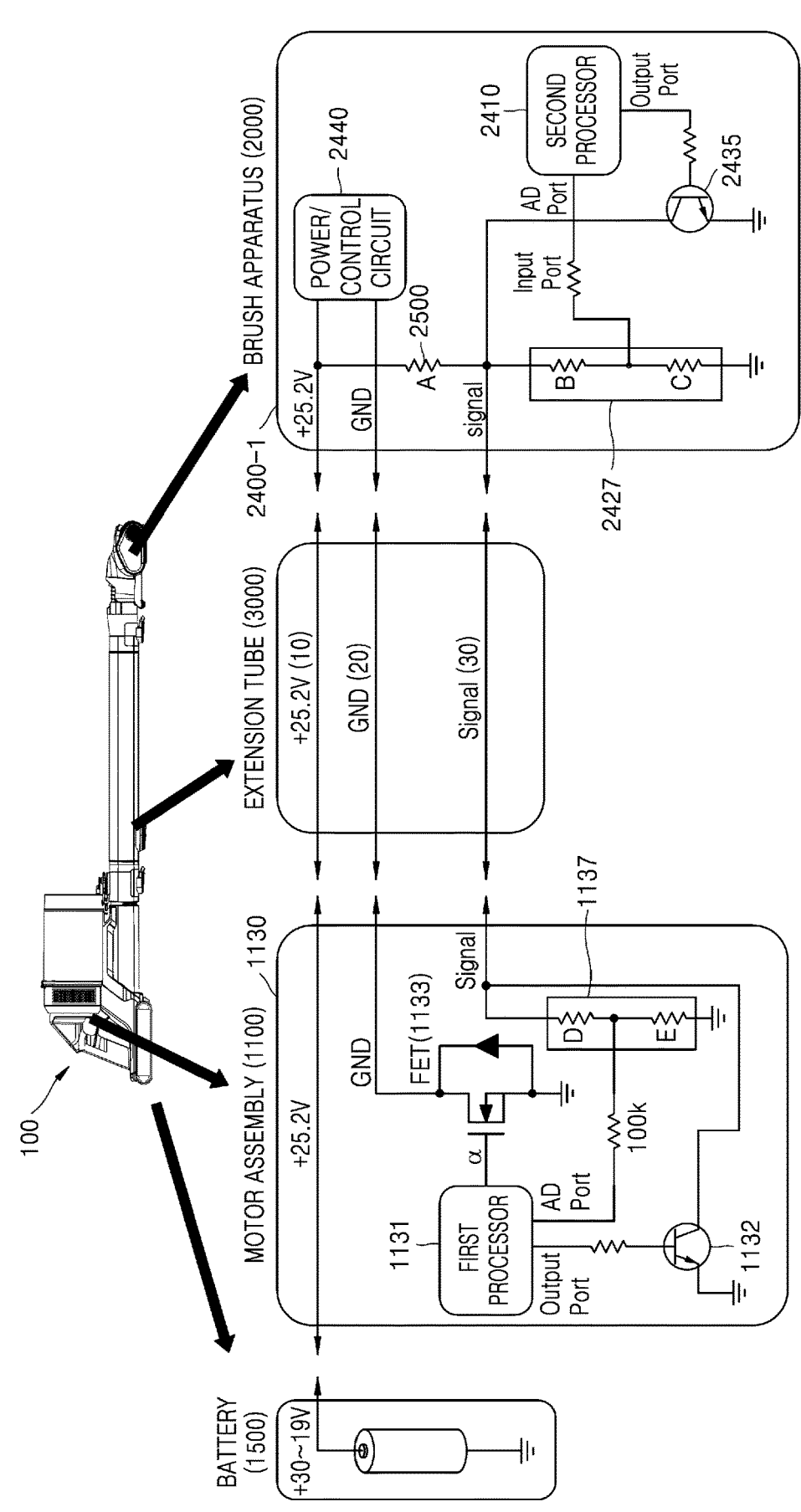
FIG. 27 is a diagram illustrating a circuit for signal line communication of a cordless vacuum cleaner, according to an embodiment of the disclosure.

FIG. 27 is a diagram illustrating a circuit for signal line communication of the cordless vacuum cleaner 100 according to an embodiment of the disclosure.

The driving circuit 1130 of the vacuum cleaner body 1000 shown in FIG. 27 may correspond to the driving circuit 1130 of the vacuum cleaner body 1000 shown in FIG. 20, and a driving circuit 2400-1 of the brush apparatus 2000 shown in FIG. 27 may correspond to the driving circuit 2400 shown in FIG. 20, and thus, redundant descriptions thereof are omitted.

Referring to FIG. 27, the driving circuit 2400-1 of the brush apparatus 2000 may include a voltage divider like the driving circuit 1130 of the vacuum cleaner body 1000. Therefore, for convenience of description, the voltage divider of the vacuum cleaner body 1000 is expressed as the first voltage divider 1137, and the voltage divider of the brush apparatus 2000 is expressed as a second voltage divider 2427.

The second voltage divider 2427 divides a voltage input from the signal line 30 to an input port of the second processor 2410. When the driving circuit 2400-1 of the brush apparatus 2000 includes the second voltage divider 2427, even when a noise voltage is applied to the signal line 30, the noise voltage may also be divided and input to the input port (AD port) of the second processor 2410.

Therefore, according to an embodiment of the disclosure, when the second processor 2410 receives a signal from the first processor 1131, the driving circuit 2400-1 for signal line communication of the brush apparatus 2000 2 includes the voltage divider 2427, which minimizes the noise influence of the signal line 30, and thus, stable signal reception is possible.

In FIG. 27, for convenience of description, a case in which A is 180 KΩ, B is 330 KΩ, C is 82 KΩ, D is 330 KΩ, and E is 82 KΩ is described as an example. At this time, a signal line voltage is $$13.4487 \text{ V}$$
$$\left( = \text{battery supply voltage} * \frac{(D+E)\|(B+C)}{A+(D+E)\|(B+C)} = 25.2 \text{ V} * \frac{206}{386} \right).$$

The first processor 1131 may identify the type of the brush apparatus 2000 based on the voltage input to the input port (AD port). For example, when the AD port input voltage of the first processor 1131 is 2.677

$$\text{V}\left( = \text{signal line voltage} * \frac{E}{D+E} = 13.4487 \text{ V} * \frac{82K}{(82K+330K)} \right),$$

the first processor 1131 may identify that the multi-brush 501 having the ID resistance 2500 of 180 KΩ corresponding to 2.677 V that is the AD port input voltage is connected to the cleaner body 1000.

When the brush apparatus 2000 coupled to the cordless vacuum cleaner 100 is identified as the multi-brush 501 including the driving circuit 2400-1, the vacuum cleaner body 1000 may perform signal line communication with the brush apparatus 2000.

The first processor 1131 of the vacuum cleaner body 1000 may receive a signal using an input port and transmit a signal using an output port. For example, when the first processor 1131 outputs a low signal through the output port, the first switch device 1132 may be turned off. As the first switch device 1132 is turned off, the voltage of the signal line 30 is 13.4487 V in a high state. When the voltage of the signal line 30 is 13.4487 V, $$2.677 \text{ V} \left( = \text{signal line voltage} * \frac{C}{B+C} = 13.4487 \text{ V} * \frac{82K}{(82K+330K)} \right)$$

may be input to the input port of the second processor 2410. At this time, because the driving circuit 2400-1 of the brush apparatus 2000 includes the second voltage divider 2427, a high voltage (13.4487 V) of the signal line 30 may be divided so that only 2.677 V may be input to the input port of the second processor 2410. To the contrary, when the first processor 1131 outputs a high signal through the output port, the first switch device 1132 may be turned on. As the first switch device 1132 is turned on, the voltage of the signal line 30 may change to 0 V GND in a low state. When the voltage of the signal line 30 is 0 V, a low signal (0 V) may be input to the input port of the second processor 2410. That is, when the first processor 1131 outputs a low signal through the output port, the high signal (2.677 V) may be input to the input port of the second processor 2410, and when the first processor 1131 outputs a high signal through the output port, the low signal may also be input to the input port of the second processor 2410.

The second processor 2410 of the brush apparatus 2000 may receive a signal using the input port and transmit a signal using the output port. For example, when the second processor 2410 outputs a high signal through the output port, the second switch device 2435 may be turned on. As the second switch device 2435 is turned on, the voltage of the signal line 30 may change to 0 V GND in the low state. When the voltage of the signal line 30 is 0 V, the low signal (0 V) may be input to the input port of the first processor 1131. To the contrary, when the second processor 2410 outputs a low signal through the output port, the second switch device 2435 may be turned off. As the second switch device 2435 is turned off, the voltage of the signal line 30 may be 13.4487 V in a high state. When the voltage of the signal line 30 is 13.4487 V, 2.677V may be input to the input port of the first processor 1131. At this time, because the driving circuit 1130 of the vacuum cleaner body 1000 includes the first voltage divider 1137, the high voltage (13.4487 V) of the signal line 30 may be divided so that only 2.677 V may be input to the input port of the first processor 1131. That is, when the second processor 2410 outputs the high signal through the output port, the low signal 0 B may be input to the input port of the first processor 1131, and when the second processor 2410 outputs the low signal through the output port, a high signal (2.677 V) may be input to the input port of the second processor 2410.

Figure 28:
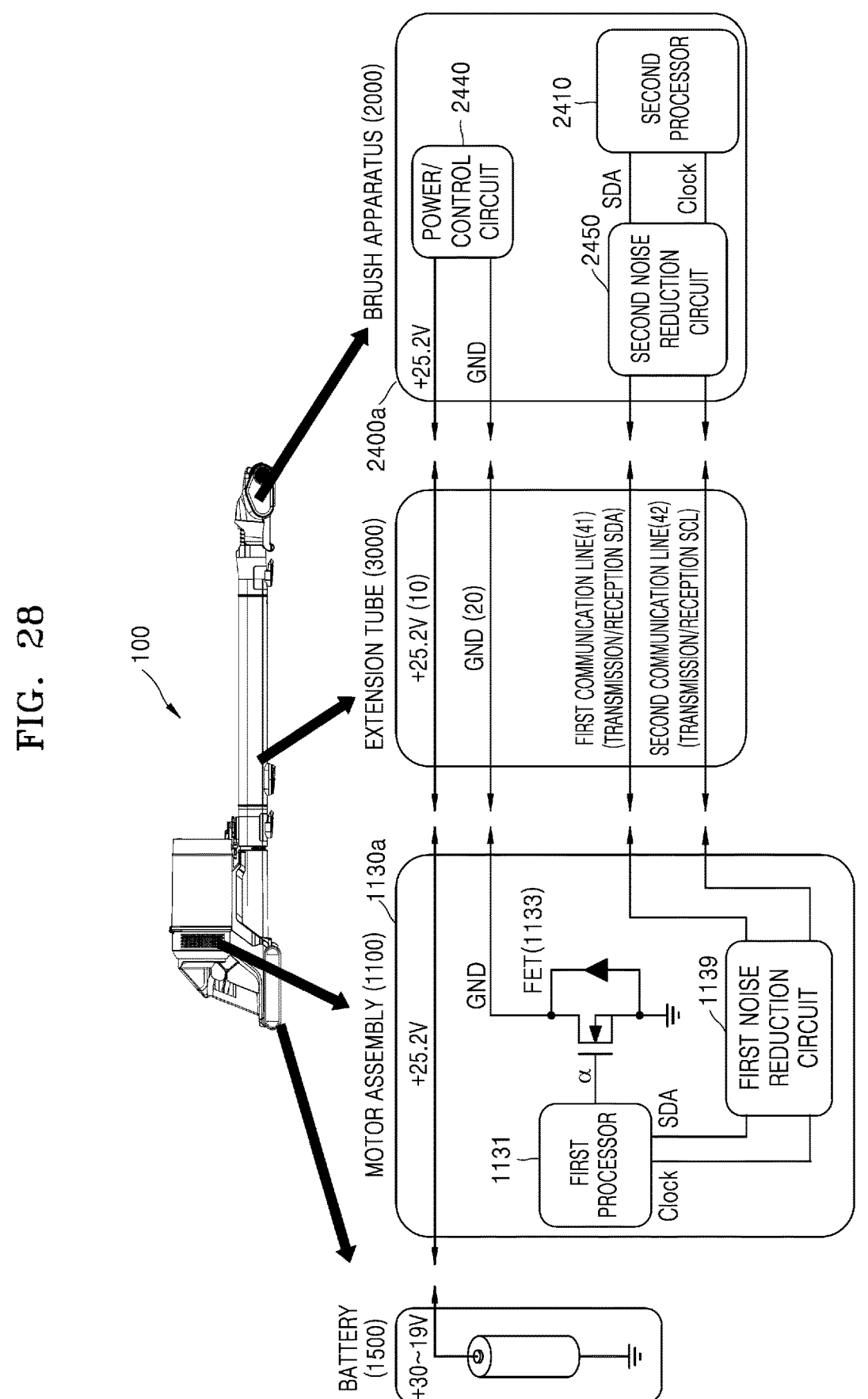
FIG. 28 is a diagram illustrating a circuit for inter integrated circuit (I2C) communication of a cordless vacuum cleaner, according to an embodiment of the disclosure.

FIG. 28 is a diagram illustrating a circuit for I2C communication of the cordless vacuum cleaner 100 according to an embodiment of the disclosure.

Referring to FIG. 28, the vacuum cleaner body 1000 may include a driving circuit 1130*a* for I2C communication, and the brush apparatus 2000 may also include a driving circuit 2400*a* for I2C communication. The driving circuit 1130*a* of the vacuum cleaner body 1000 shown in FIG. 28 may correspond to the driving circuit 1130 of the vacuum cleaner body 1000 shown in FIG. 20, and the driving circuit 2400*a* of the brush apparatus 2000 shown in FIG. 28 may correspond to the driving circuit 2400 shown in FIG. 20, and thus, redundant descriptions thereof are omitted.

According to an embodiment of the disclosure, the cordless vacuum cleaner 100 may include a first communication line 41 and a second communication line 42 for I2C communication instead of the signal line 30 connected to the power lines 10 and 20.

I2C communication, which is one of the synchronization communication methods, is a method of timing data transmission using a clock signal. Accordingly, the cordless vacuum cleaner 100 may include the first communication line 41 for transmitting and receiving serial data (SDA) and the second communication line 42 for transmitting and receiving a serial clock (SCL).

Due to the characteristics of the cordless vacuum cleaner 100, there is inevitably a lot of noise caused by attachment or detachment of the brush apparatus 2000 or movement or bumping of the cordless vacuum cleaner 100. Therefore, in order to minimize electrical or mechanical damage or stress during I2C communication between the vacuum cleaner body 1000 and the brush apparatus 2000, a noise reduction circuit may be applied to an input terminal to which the serial data SDA and the serial clock SCL are input. For example, the vacuum cleaner body 1000 may include a first noise reduction circuit 1139 and the brush apparatus 2000 may include a second noise reduction circuit 2450.

The first noise reduction circuit 1139 and the second noise reduction circuit 2450 may include at least one of a low pass filter, a high pass filter, a band pass filter, a damping resistor or a division resistor, but is not limited thereto.

The serial data SDA and the serial clock SCL transmitted from the second processor 2410 through the first communication line 41 and the second communication line 42 are input to the first processor 1131 through the first noise reduction circuit 1139, and thus, the influence of noise may be minimized. In addition, the serial data SDA and the serial clock SCL transmitted from the first processor 1131 through the first communication line 41 and the second communication line 42 are input to the pass through the second processor 2410 through the second noise reduction circuit 2450, and thus, the influence of noise may be minimized.

According to an embodiment of the disclosure, the vacuum cleaner body 1000 operates as a master device and the brush apparatus 2000 operates as a slave device, thereby performing I2C communication. An I2C communication signal may include a start signal (a start bit), a data signal (a command bit), and a stop signal (an end bit).

The first processor 1131 may transmit a signal indicating an operating condition to the second processor 2410 through the first communication line 41 and the second communication line 42. The operating condition may include at least one of an RPM of the drum 2200 of the brush apparatus 2000, a target trip level of the brush apparatus 2000, or a power consumption of the suction motor 1110 included in the vacuum cleaner body 1000.

The second processor 2410 of the brush apparatus 2000 may execute a command based on operation information corresponding to the received operating condition. For example, the brush apparatus 2000 may adjust the drum RPM, the trip level, etc. In addition, the second processor 2410 of the brush apparatus 2000 may transmit a response signal indicating the current state to the first processor 1131 of the vacuum cleaner body 1000 through the first communication line 41 and the second communication line 42.

Figure 29:
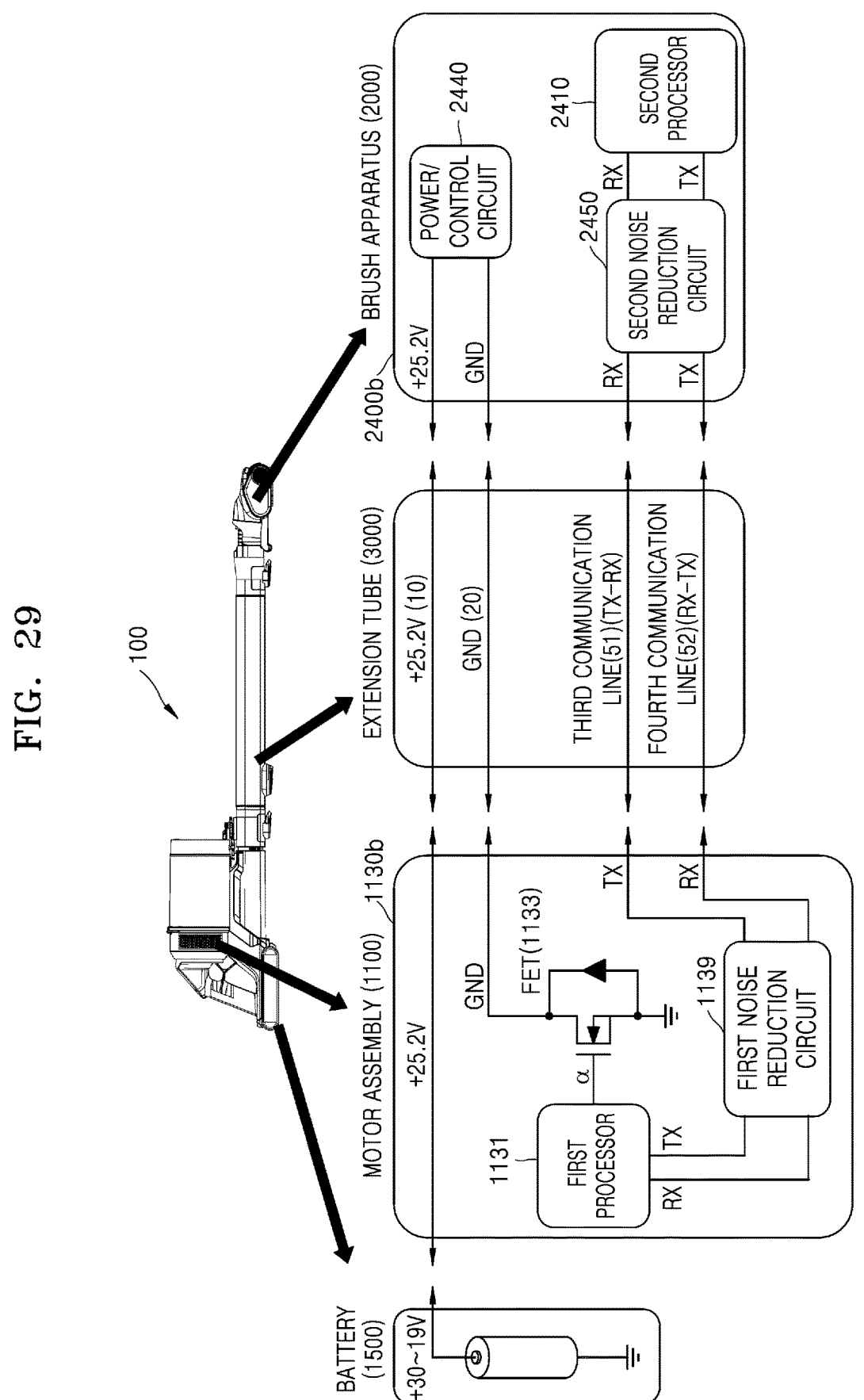
FIG. 29 is a diagram illustrating a circuit for universal asynchronous receiver/transmitter (UART) full-duplex communication of a cordless vacuum cleaner, according to an embodiment of the disclosure.

FIG. 29 is a diagram illustrating a circuit for UART full-duplex communication of the cordless vacuum cleaner 100 according to an embodiment of the disclosure.

Referring to FIG. 29, the vacuum cleaner body 1000 may include a driving circuit 1130*b* for UART full duplex communication, and the brush apparatus 2000 may also include a driving circuit 2400*b* for UART full duplex communication. The driving circuit 1130*b* of the vacuum cleaner body 1000 shown in FIG. 29 may correspond to the driving circuit 1130 of the vacuum cleaner body 1000 shown in FIG. 20, and the driving circuit 2400*b* of the brush apparatus 2000 shown in FIG. 29 may correspond to the driving circuit 2400 shown in FIG. 20, and thus, redundant descriptions thereof are omitted.

According to an embodiment of the disclosure, the cordless vacuum cleaner 100 may include two wires for UART full-duplex communication instead of the signal line 30 connected to the power lines 10 and 20. For example, the cordless vacuum cleaner 100 may include a third communication line 51 and a fourth communication line 52. The third communication line 51 may be a line for transmitting a signal from the first processor 1131 to the second processor 2410, and the fourth communication line 52 may be a line for transmitting a signal from the second processor 2410 to the first processor 1131. The first processor 1131 and the second processor 2410 may simultaneously transmit and receive signals through the third communication line 51 and the fourth communication line 52, respectively.

Due to the characteristics of the cordless vacuum cleaner 100, there is inevitably a lot of noise caused by attachment or detachment of the brush apparatus 2000 or movement or bumping of the cordless vacuum cleaner 100. Therefore, in order to minimize electrical or mechanical damage or stress during UART communication between the vacuum cleaner body 1000 and the brush apparatus 2000, a noise reduction circuit may be applied to an input terminal to which a signal is input. For example, the vacuum cleaner body 1000 may include the first noise reduction circuit 1139 and the brush apparatus 2000 may include the second noise reduction circuit 2450.

The first noise reduction circuit 1139 and the second noise reduction circuit 2450 may include at least one of a low pass filter, a high pass filter, a band pass filter, a damping resistor or a division resistor, but is not limited thereto.

A data signal transmitted from the first processor 1131 through the third communication line 51 is input to the second processor 2410 through the second noise reduction circuit 2450, and thus, the influence of noise may be minimized. In addition, a data signal transmitted from the second processor 2410 through the fourth communication line 52 is input to the first processor 1131 through the first noise reduction circuit 1139, and thus, the influence of noise may be minimized.

According to an embodiment of the disclosure, the vacuum cleaner body 1000 operates as a master device and the brush apparatus 2000 operates as a slave device, thereby performing UART full-duplex communication. A UART communication signal may include a start signal (a start bit), a data signal (a command bit), and a stop signal (an end bit).

The first processor 1131 may transmit a signal indicating an operating condition to the second processor 2410 through the third communication line 51. The operating condition may include at least one of an RPM of the drum 2200 of the brush apparatus 2000, a target trip level of the brush apparatus 2000, or a power consumption of the suction motor 1110 included in the vacuum cleaner body 1000.

The second processor 2410 of the brush apparatus 2000 may execute a command based on operation information corresponding to the received operating condition. For example, the brush apparatus 2000 may adjust the drum RPM, the trip level, etc. In addition, the second processor 2410 of the brush apparatus 2000 may transmit a response signal indicating the current state to the first processor 1131 of the vacuum cleaner body 1000 through the fourth communication line 52.

Figure 30:
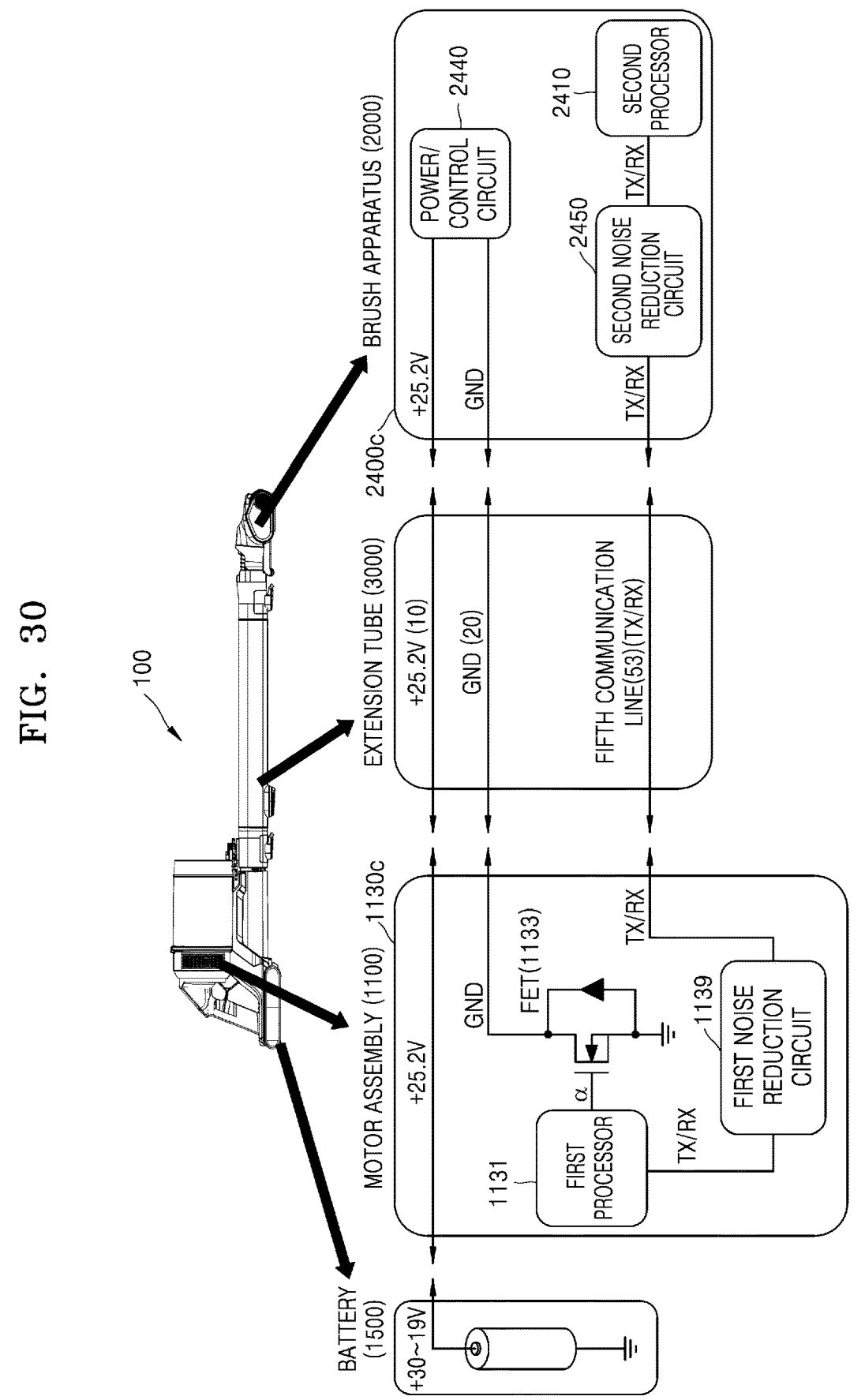
FIG. 30 is a diagram illustrating a circuit for UART half-duplex communication of a cordless vacuum cleaner, according to an embodiment of the disclosure.

FIG. 30 is a diagram illustrating a circuit for UART half-duplex communication of the cordless vacuum cleaner 100 according to an embodiment of the disclosure.

Referring to FIG. 30, the vacuum cleaner body 1000 may include a driving circuit 1130c for UART half-duplex communication, and the brush apparatus 2000 may also include a driving circuit 2400c for UART half-duplex communication. The driving circuit 1130c of the vacuum cleaner body 1000 shown in FIG. 30 may correspond to the driving circuit 1130b of the vacuum cleaner body 1000 shown in FIG. 29, and the driving circuit 2400c of the brush apparatus 2000 shown in FIG. 30 may correspond to the driving circuit 2400b shown in FIG. 29, and thus, duplicate descriptions thereof are omitted.

According to an embodiment of the disclosure, the cordless vacuum cleaner 100 may include one wire for UART half-duplex communication instead of the signal line 30 connected to the power lines 10 and 20. For example, the cordless vacuum cleaner 100 may include a fifth communication line 53. The fifth communication line 53 may be a line through which the first processor 1131 and the second processor 2410 alternately transmit signals. When the first processor 1131 transmits a first signal through the fifth communication line 53, the second processor 2410 may receive the first signal through the fifth communication line 53, and when the second processor 2410 transmits a second signal through the fifth communication line 53, the first processor 1131 may receive the second signal through the fifth communication line 53.

Meanwhile, a data signal transmitted from the first processor 1131 through the fifth communication line 53 may be input to the second processor 2410 through the second noise reduction circuit 2450, and thus, the influence of noise may be minimized. In addition, a data signal transmitted from the second processor 2410 through the fifth communication line 53 may be input to the first processor 1131 through the first noise reduction circuit 1139, and thus, the influence of noise may be minimized.

According to an embodiment of the disclosure, the vacuum cleaner body 1000 operates as a master device and the brush apparatus 2000 operates as a slave device, thereby performing UART half-duplex communication. An UART communication signal may include a start signal (a start bit), a data signal (a command bit), and a stop signal (an end bit).

The first processor 1131 may transmit a signal indicating an operating condition to the second processor 2410 through the fifth communication line 53. The operating condition may include at least one of an RPM of the drum 2200 of the brush apparatus 2000, a target trip level of the brush apparatus 2000, or a power consumption of the suction motor 1110 included in the vacuum cleaner body 1000.

The second processor 2410 of the brush apparatus 2000 may execute a command based on operation information corresponding to the received operating condition. For example, the brush apparatus 2000 may adjust the drum RPM, the trip level, etc. In addition, the second processor 2410 of the brush apparatus 2000 may transmit a response signal indicating the current state to the first processor 1131 of the vacuum cleaner body 1000 through the fifth communication line 53.

Figure 31:
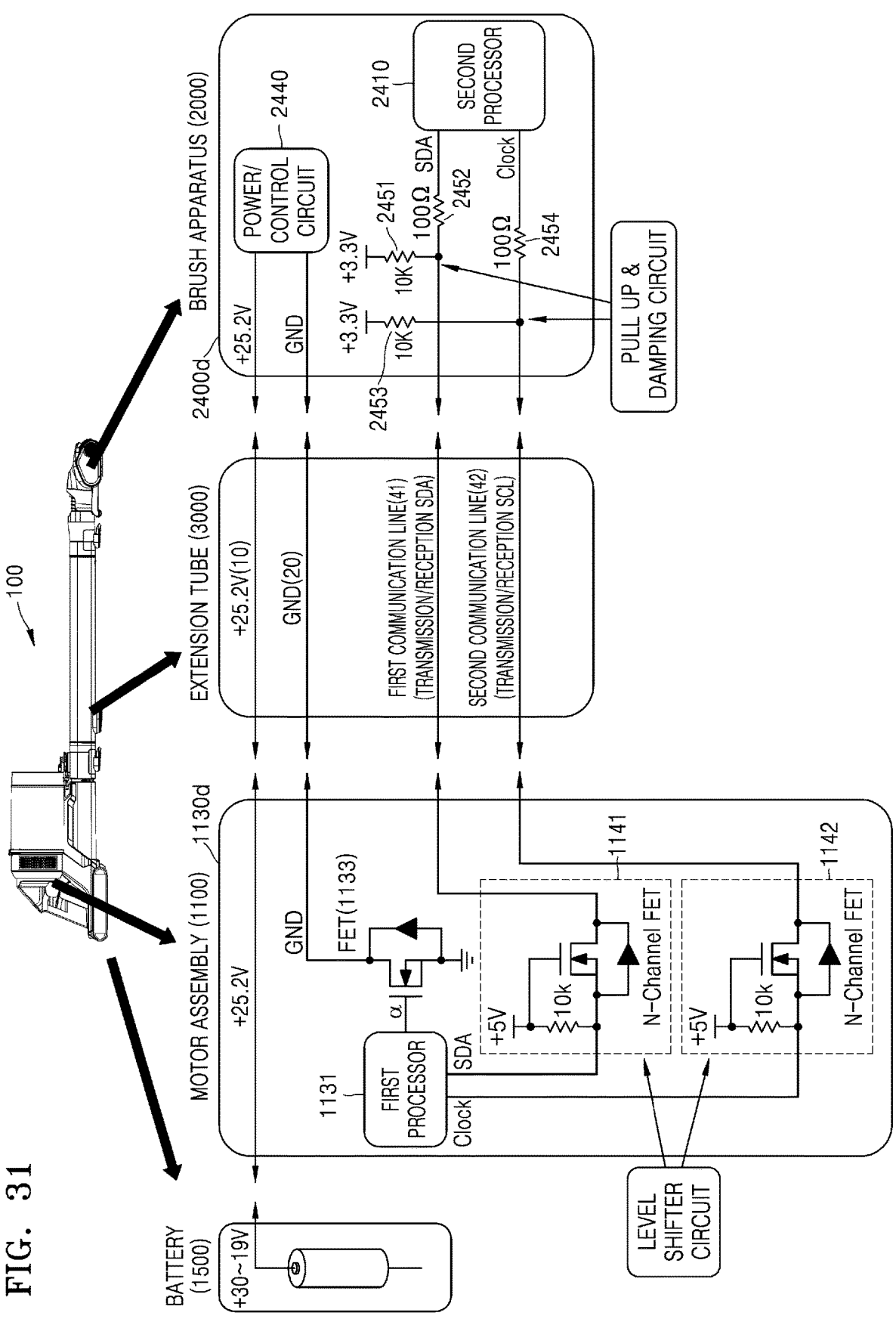
FIG. 31 is a diagram illustrating a circuit for I2C communication of a cordless vacuum cleaner, according to an embodiment of the disclosure.

FIG. 31 is a diagram illustrating a circuit for I2C communication of the cordless vacuum cleaner 100 according to an embodiment of the disclosure.

Referring to FIG. 31, the vacuum cleaner body 1000 may include a driving circuit 1130d for I2C communication, and the brush apparatus 2000 may also include a driving circuit 2400d for I2C communication. The driving circuit 1130d of the vacuum cleaner body 1000 shown in FIG. 31 may correspond to the driving circuit 1130 of the vacuum cleaner body 1000 shown in FIG. 20, and the driving circuit 2400d of the brush apparatus 2000 shown in FIG. 31 may correspond to the driving circuit 2400 shown in FIG. 20, and thus, redundant descriptions thereof are omitted.

According to an embodiment of the disclosure, the cordless vacuum cleaner 100 may include a first communication line 41 and a second communication line 42 for I2C communication instead of the signal line 30 connected to the power lines 10 and 20. The first communication line 41 may be a line for transmitting and receiving the serial data SDA, and the second communication line 42 may be a line for transmitting and receiving the serial clock SCL.

According to an embodiment of the disclosure, for communication resistant to noise, the driving circuit 1130d of the vacuum cleaner body 1000 may include a first level shifter circuit 1141 and a second level shifter circuit 1142. Each of the first level shifter circuit 1141 and the second level shifter circuit 1142 may be a level shift IC in which a switch device and a peripheral circuit are packed. The driving circuit 2400*d* of the brush apparatus 2000 may include a first pull-up resistor 2451, a first damping resistor 2452, a second pull-up resistor 2453, and a second damping resistor 2454.

The vacuum cleaner body 1000 may operate as a master device, thereby transmitting a signal indicating an operating condition to the second processor 2410 through the first communication line 41 and the second communication line 42. For example, when the first processor 1131 outputs a high signal (5 V) in a direction of the first level shifter circuit 1141, a switch device (e.g., an N-channel FET) included in the first level shifter circuit 1141 is in an off state, and thus, 3.3 V (High) connected to the first pull-up resistor 2451 may be applied to the first communication line 41, and 3.3 V (High) may also be input to the second processor 2410 through the first damping resistor 2452. On the other hand, when the first processor 1131 outputs a low signal (0 V) in the direction of the first level shifter circuit 1141, the switch device (e.g., the N-channel FET) included in the first level shifter circuit 1141 is in an on state, and thus, the voltage of the first communication line 41 may be 0 V (Low), and 0 V (Low) may also be input to the second processor 2410. That is, when the first processor 1131 outputs a high signal in the direction of the first level shifter circuit 1141, the high signal may be input to the second processor 2410 through the first communication line 41, and the first processor 1131 outputs a low signal in the direction of the first level shifter circuit 1141, the low signal may be input to the second processor 2410 through the first communication line 41.

Similarly, when the first processor 1131 outputs a high signal in the direction of the second level shifter circuit 1142, the High signal may be input to the second processor 2410 through the second communication line 42, and the first processor 1131 outputs a low signal in the direction of the second level shifter circuit 1142, the low signal may be input to the second processor 2410 through the second communication line 42.

Meanwhile, the second processor 2410 of the brush apparatus 2000 may transmit a response signal indicating the current state to the first processor 1131 of the vacuum cleaner body 1000 through the first communication line 41 and the second communication line 42. For example, when the second processor 2410 outputs the high signal (3.3 V) in a direction of the first damping resistor 2452, 3.3 V (High) may also be applied to the first communication line 41. At this time, because the switch device (e.g., the N-channel FET) included in the first level shifter circuit 1141 does not operate, 5 V (High) is input to the first processor 1131. That is, because +5 V power in the first level shifter circuit 1141 does not flow to the first communication line 41 via a 10 KΩ resistance and a body diode (BD) of the switch device (e.g., the N-channel FET) (a current path is not formed), 5 V is input to the first processor 1131, and SDA of the first processor 1131 is high (+5 V). On the other hand, when the second processor 2410 outputs the low signal (0 V) in the direction of the first damping resistor 2452, because the magnitude of the first damping resistor 2452 is very small compared to the first pull-up resistor 2451, a voltage (Low) close to 0 is also applied to the first communication line 41. For example, the voltage of the first communication line 41 may be 0.032673V (=3.3V*[100/(10K+100)] in a low state. In addition, because the resistance (10 KΩ) included in the first level shifter circuit 1141 is large, the voltage greatly drops, and thus, the voltage (Low) close to 0 is also applied to the first processor 1131. That is, the switch device (e.g., the N-channel FET) included in the first level shifter circuit 1141 is in an off state, but a current path through which +5 V moves to the first communication line 41 through the resistance (10 KΩ) and the BD of the switch device (e.g., the N-channel FET) is formed, and the SDA of the first processor 1131 becomes low. For example, assuming that a voltage VF of the BD of the switch device (e.g., the N-channel FET) is 0.6 V, the voltage (also referred to as a SDA voltage) input to the first processor 1131 may be as follows.

SDA voltage of first processor 1131=N-FET BD VF (0.6 V)+voltage of first communication line 41, i.e., =0.6 V+0.032673 V, i.e., =0.632673 V (i.e., approximately 4.367 V applied to the 10 KΩ resistance).

Therefore, when the second processor 2410 outputs the high signal (3.3 V) in the direction of the first damping resistor 2452, the high signal (5 V) may also be input to the first processor 1131 through the first communication line 41, and when the second processor 2410 outputs the low signal (0 V) in the direction of the first damping resistor 2452, a low signal (e.g., about zero volts (≈0 V)) may also be input to the first processor 1131 through the first communication line 41.

Similarly, when the second processor 2410 outputs a high signal (e.g., 3.3 V) in the direction of the second damping resistor 2454, a high signal (e.g., 5 V) may also be input to the first processor 1131 through the second communication line 42, and when the second processor 2410 outputs a low signal (e.g., 0 V) in the direction of the second damping resistor 2454, a low signal (e.g., about zero volts (≈0V)) may also be input to the first processor 1131 through the second communication line 42.

When the cordless vacuum cleaner 100 includes the first level shifter circuit 1141 and the second level shifter circuit 1142, even though the voltage output from the first processor 1131 and the voltage output from the second processor 2410 are different, I2C communication between the vacuum cleaner body 1000 and the brush apparatus 2000 is possible.

According to an embodiment of the disclosure, the driving circuit 1130*d* of the vacuum cleaner body 1000 may include the first pull-up resistor 2451, the first damping resistor 2452, the second pull-up resistor 2453, and the second damping resistor 2454, and the driving circuit 2400*d* of the brush apparatus 2000 may include the first level shifter circuit 1141 and the second level shifter circuit 1142.

Figure 32:
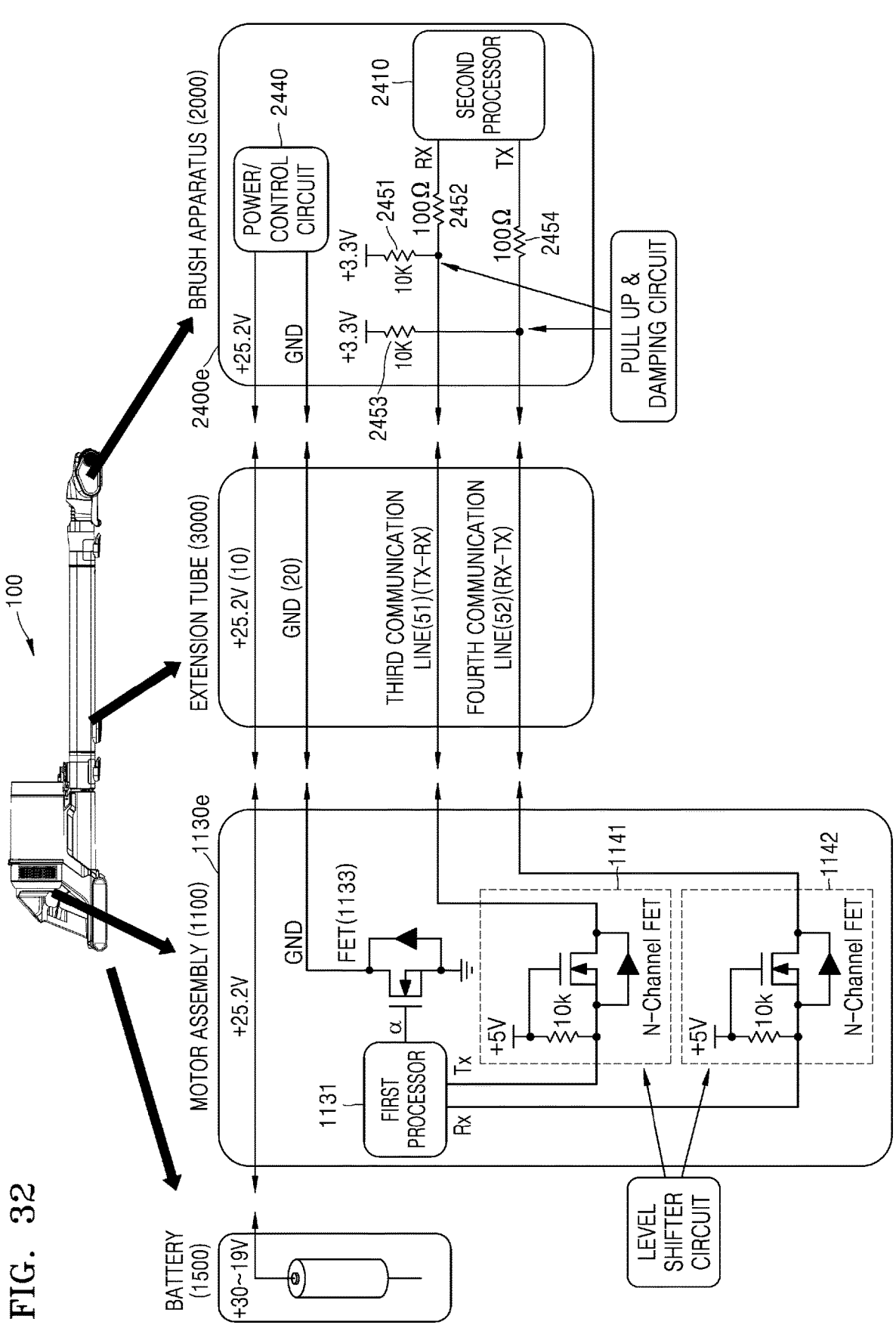
FIG. 32 is a diagram illustrating a circuit for UART communication of a cordless vacuum cleaner, according to an embodiment of the disclosure.

FIG. 32 is a diagram illustrating a circuit for UART communication of the cordless vacuum cleaner 100 according to an embodiment of the disclosure.

Referring to FIG. 32, the vacuum cleaner body 1000 may include a driving circuit 1130*e* for UART communication, and the brush apparatus 2000 may also include a driving circuit 2400*e* for UART communication. The driving circuit 1130*e* of the vacuum cleaner body 1000 shown in FIG. 32 may correspond to the driving circuit 1130 of the vacuum cleaner body 1000 shown in FIG. 20, and the driving circuit 2400*e* of the brush apparatus 2000 shown in FIG. 32 may correspond to the driving circuit 2400 shown in FIG. 20, and thus, redundant descriptions thereof are omitted.

According to an embodiment of the disclosure, the cordless vacuum cleaner 100 may include two wires for UART full-duplex communication instead of the signal line 30 connected to the power lines 10 and 20. For example, the cordless vacuum cleaner 100 may include a third communication line 51 and a fourth communication line 52. The third communication line 51 may be a line for transmitting a signal from the first processor 1131 to the second processor 2410, and the fourth communication line 52 may be a line for transmitting a signal from the second processor 2410 to the first processor 1131. The first processor 1131 and the second processor 2410 may simultaneously transmit and receive signals through the third communication line 51 and the fourth communication line 52, respectively.

According to an embodiment of the disclosure, for communication resistant to noise, the driving circuit 1130e of the vacuum cleaner body 1000 may include the first level shifter circuit 1141 and the second level shifter circuit 1142. Each of the first level shifter circuit 1141 and the second level shifter circuit 1142 may be a level shift IC in which a switch device and a peripheral circuit are packed. The driving circuit 2400e of the brush apparatus 2000 may include the first pull-up resistor 2451, the first damping resistor 2452, the second pull-up resistor 2453, and the second damping resistor 2454.

The vacuum cleaner body 1000 may operate as a master device, thereby transmitting a signal indicating an operating condition to the second processor 2410 through the third communication line 51. For example, when the first processor 1131 outputs a high signal 5 V, a switch device (e.g., an N-channel FET) included in the first level shifter circuit 1141 is in an off state, and thus, 3 V (High) connected to the first pull-up resistor 2451 may be applied to the communication line 51, and 3.3 V (High) may also be input to the second processor 2410 through the first damping resistor 2452. On the other hand, when the first processor 1131 outputs a low signal (e.g., 0 V), the switch device (e.g., the N-channel FET) included in the first level shifter circuit 1141 is in an on state, and thus, the voltage of the third communication line 51 may be 0 V (Low), and 0 V (Low) may also be input to the second processor 2410. That is, when the first processor 1131 outputs a high signal (e.g., 5 V), a high signal (e.g., 3.3 V) may be input to the second processor 2410 through the third communication line 51, and when the first processor 1131 outputs the low signal (e.g., 0 V), the low signal (e.g., 0 V) may be input to the second processor 2410 through the third communication line 51.

Meanwhile, the second processor 2410 of the brush apparatus 2000 may transmit a response signal indicating the current state to the first processor 1131 of the vacuum cleaner body 1000 through the fourth communication line 52. For example, when the second processor 2410 outputs the high signal (e.g., 3.3 V), 3.3V (High) may also be applied to the fourth communication line 52. At this time, because the switch device (e.g., the N-channel FET) included in the second level shifter circuit 1142 does not operate, 5 V (High) is input to the first processor 1131. On the other hand, when the second processor 2410 outputs the low signal (e.g., 0 V), because the magnitude of the second damping resistor 2454 is very small compared to the second pull-up resistor 2453, a voltage (Low) close to 0 is also applied to the fourth communication line 52. In addition, because the resistor 10 KΩ included in the second level shifter circuit 1142 is large, the voltage greatly drops, and thus, the voltage (Low) close to 0 is also applied to the first processor 1131. That is, when the second processor 2410 outputs the high signal (e.g., 3.3 V), the high signal (e.g., 5 V) may also be input to the first processor 1131 through the fourth communication line 52, and when the second processor 2410 outputs the low signal (0 V), a low signal (e.g., about zero volts (≈0 V)) may also be input to the first processor 1131 through the fourth communication line 52. Operations of the level shifter circuits 1141 and 1142 of FIG. 32 are the same as those of the level shifter circuits 1141 and 1142 of FIG. 31, and thus, redundant descriptions thereof are omitted.

When the cordless vacuum cleaner 100 includes the first level shifter circuit 1141 and the second level shifter circuit 1142, even though the voltage output from the first processor 1131 and the voltage output from the second processor 2410 are different, UART communication between the vacuum cleaner body 1000 and the brush apparatus 2000 is possible.

According to an embodiment of the disclosure, the driving circuit 1130e of the vacuum cleaner body 1000 may include the first pull-up resistor 2451, the first damping resistor 2452, the second pull-up resistor 2453, and the second damping resistor 2454, and the driving circuit 2400e of the brush apparatus 2000 may include the first level shifter circuit 1141 and the second level shifter circuit 1142.

Figure 33:
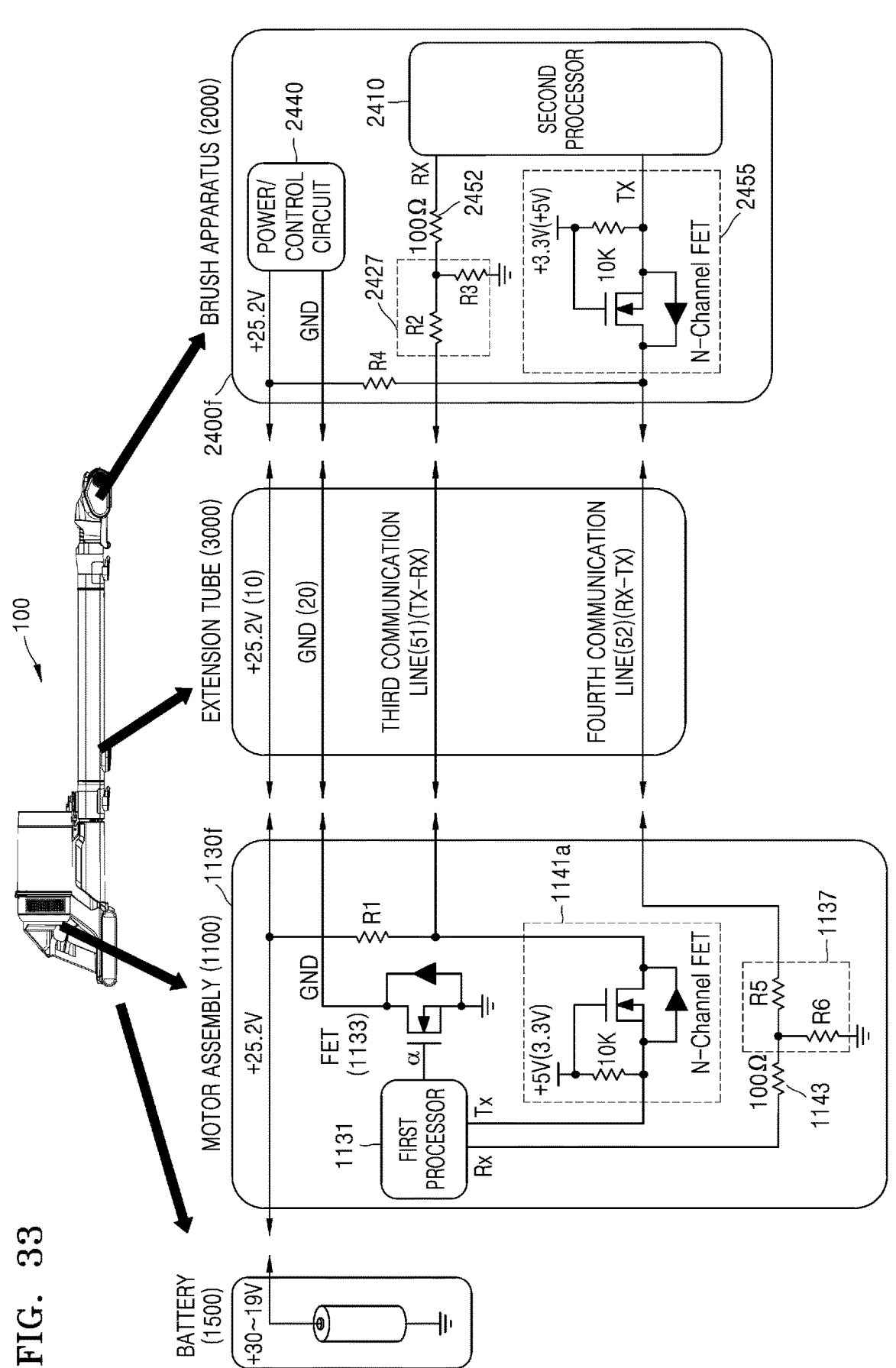
FIG. 33 is a diagram illustrating a circuit for UART full-duplex communication of a cordless vacuum cleaner, according to an embodiment of the disclosure.

FIG. 33 is a diagram illustrating a circuit for UART full-duplex communication of the cordless vacuum cleaner 100 according to an embodiment of the disclosure.

Referring to FIG. 33, the vacuum cleaner body 1000 may include a driving circuit 1130f for UART communication, and the brush apparatus 2000 may also include a driving circuit 2400f for UART communication. The driving circuit 1130f of the vacuum cleaner body 1000 shown in FIG. 33 may correspond to the driving circuit 1130 of the vacuum cleaner body 1000 shown in FIG. 20, and the driving circuit 2400f of the brush apparatus 2000 shown in FIG. 33 may correspond to the driving circuit 2400 shown in FIG. 20, and thus, redundant descriptions thereof are omitted.

According to an embodiment of the disclosure, the cordless vacuum cleaner 100 may include two wires for UART communication. For example, the cordless vacuum cleaner 100 may include the third communication line 51 and the fourth communication line 52. The third communication line 51 may be a line for transmitting a signal from the first processor 1131 to the second processor 2410, and the fourth communication line 52 may be a line for transmitting a signal from the second processor 2410 to the first processor 1131. The first processor 1131 and the second processor 2410 may simultaneously transmit and receive signals through the third communication line 51 and the fourth communication line 52, respectively.

According to an embodiment of the disclosure, for communication resistant to noise, the driving circuit 1130f of the vacuum cleaner body 1000 may include a first circuit 1141a in a similar type to the first level shifter circuit 1141, a third damping resistor 1143, and the first voltage divider 1137. The driving circuit 2400f of the brush apparatus 2000 may include the second voltage divider 2427, the first damping resistor 2452, and a second circuit 2455 in a similar type to the first level shifter circuit 1141.

The vacuum cleaner body 1000 may operate as a master device, thereby transmitting a signal indicating an operating condition to the second processor 2410 through the third communication line 51. For example, when the first processor 1131 outputs a high signal 5 V, a switch device (e.g., an N-channel FET) included in the first circuit 1141a is in an off state, and thus, a high voltage (e.g., 25.2 V) of a +power line 10 connected through a resistance (R1) is applied to the third communication line 51. At this time, a high signal (e.g., battery voltage (e.g., 25.2V)*R3/(R1+R2+R3)) may be input to the second processor 2410 through the second voltage divider 2427. On the other hand, when the first processor 1131 outputs a low signal (e.g., 0 V), the switch device (e.g., the N-channel FET) included in the first circuit 1141a is in an on state, and thus, the voltage of the third communication line 51 may be 0 V (Low), and 0 V (Low) may also be input to the second processor 2410. That is, when the first processor 1131 outputs a high signal (e.g., 5 V), a high signal (e.g., 3.3 V) may be input to the second processor 2410 through the third communication line 51, and when the first processor 1131 outputs the low signal (e.g., 0 V), the low signal (e.g., 0 V) may be input to the second processor 2410 through the third communication line 51.

Meanwhile, the second processor 2410 of the brush apparatus 2000 may transmit a response signal indicating the current state to the first processor 1131 of the vacuum cleaner body 1000 through the fourth communication line 52. For example, when the second processor 2410 outputs the high signal (e.g., 3.3 V), the switch device (e.g., the N-channel FET) included in the second circuit 2455 is in an off state, and thus, the high voltage (e.g., 25.2 V) of the +power line 10 connected through a resistance (R4) is applied to the fourth communication line 52. At this time, a high signal (e.g., battery voltage (e.g., 25.2V)*R6/(R4+R5+R6)) may be input to the first processor 1131 through the first voltage divider 1137. On the other hand, when the second processor 2410 outputs the low signal (0 V), the switch device (e.g., the N-channel FET) included in the second circuit 2455 is in an on state, and thus, the voltage of the fourth communication line 52 may be 0 V (Low), and 0 V (Low) may also be input to the first processor 1131. That is, when the second processor 2410 outputs the high signal (e.g., 3.3 V), the high signal may be input to the first processor 1131 through the fourth communication line 52, and when the second processor 2410 outputs the low signal (e.g., 0 V), the low signal (e.g., 0 V) may be input to the first processor 1131 through the fourth communication line 52.

According to an embodiment of the disclosure, when the vacuum cleaner body 1000 and the brush apparatus 2000 perform UART communication, high voltage signals may be transmitted and received through the third communication line 51 and the fourth communication line 52, and thus, communication between the vacuum cleaner body 1000 and the brush apparatus 2000 may be resistant to noise.

Figure 34:
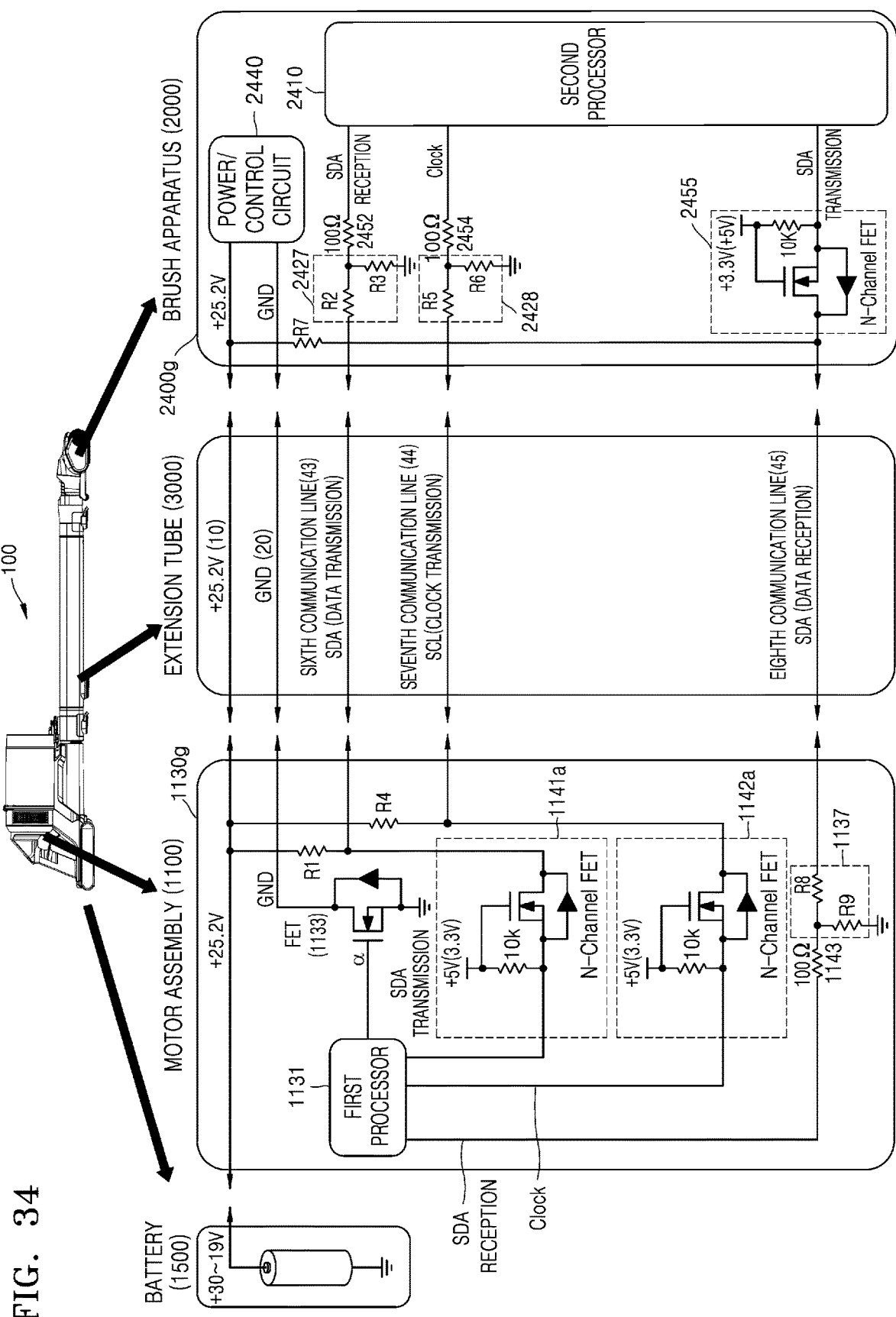
FIG. 34 is a diagram illustrating a circuit for I2C communication of a cordless vacuum cleaner, according to an embodiment of the disclosure.

FIG. 34 is a diagram illustrating a circuit for I2C communication of the cordless vacuum cleaner 100 according to an embodiment of the disclosure.

Referring to FIG. 34, the vacuum cleaner body 1000 may include a driving circuit 1130g for I2C communication, and the brush apparatus 2000 may also include a driving circuit 2400g for I2C communication. The driving circuit 1130g of the vacuum cleaner body 1000 shown in FIG. 34 may correspond to the driving circuit 1130 of the vacuum cleaner body 1000 shown in FIG. 20, and the driving circuit 2400g of the brush apparatus 2000 shown in FIG. 34 may correspond to the driving circuit 2400 shown in FIG. 20, and thus, redundant descriptions thereof are omitted.

According to an embodiment of the disclosure, the cordless vacuum cleaner 100 may include a sixth communication line 43, a seventh communication line 44, and an eighth communication line 45 for I2C communication. The sixth communication line 43 may be a line for transmitting the serial data SDA from the vacuum cleaner body 1000 to the brush apparatus 2000, the seventh communication line 44 may be a line transmitting the serial data SDA from the brush apparatus 2000 to the vacuum cleaner body 1000, and the eighth communication line 45 may be a line for transmitting the serial clock SCL from the vacuum cleaner body 1000 to the brush apparatus 2000.

According to an embodiment of the disclosure, for communication resistant to noise, the driving circuit 1130g of the vacuum cleaner body 1000 may include the first circuit 1141a in a similar type to the first level shifter circuit 1141, a third circuit 1142a in a similar type to the shifter circuit 1142, the third damping resistor 1143, and the first voltage divider 1137. The driving circuit 2400g of the brush apparatus 2000 may include the second voltage divider 2427, the first damping resistor 2452, a second damping resistor 2454, and the second circuit 2455 in a similar type to the first level shifter circuit 1141.

The vacuum cleaner body 1000 may operate as a master device, thereby transmitting a signal indicating an operating condition to the second processor 2410 through the sixth communication line 43 and the seventh communication line 44. For example, when the first processor 1131 outputs a high signal (e.g., 5 V) in a direction of the first circuit 1141a, a switch device (e.g., an N-channel FET) included in the first circuit 1141a is in an off state, and thus, the high voltage (e.g., 25.2 V) of the +power line 10 connected through an R1 resistance is applied to the sixth communication line 43. At this time, a high signal (e.g., battery voltage (e.g., 25.2V)*R3/(R1+R2+R3)) may be input to the second processor 2410 through the second voltage divider 2427. On the other hand, when the first processor 1131 outputs a low signal (0 V) in the direction of the first circuit 1141a, the switch device (e.g., the N-channel FET) included in the first circuit 1141a is in an on state, and thus, the voltage of the sixth communication line 43 may be 0 V (Low), and 0 V (Low) may also be input to the second processor 2410. That is, when the first processor 1131 outputs the high signal (e.g., 5 V) to transmit a data signal (e.g., SDA), the high signal 3.3 V may be input to the second processor 2410 through the sixth communication line 43, and when the first processor 1131 outputs the low signal 0 V to transmit the data signal (e.g., SDA), the low signal (e.g., 0 V) may be input to the second processor 2410 through the sixth communication line 43. Similarly, when the first processor 1131 outputs the high signal 5 V to transmit a clock signal (e.g., SCL), the high signal (e.g., 3.3 V) may be input to the second processor 2410 through the seventh communication line 44, and when the first processor 1131 outputs the low signal (e.g., 0 V) to transmit the clock signal (e.g., SCL), the low signal (e.g., 0 V) may be input to the second processor 2410 through the seventh communication line 44.

Meanwhile, the second processor 2410 of the brush apparatus 2000 may transmit a response signal indicating the current state to the first processor 1131 of the vacuum cleaner body 1000 through an eighth communication line 45 and a seventh communication line 44. For example, when the second processor 2410 outputs the high signal (e.g., 3.3 V), a switch device (e.g., an N-channel FET) included in the second circuit 2455 is in an off state, and thus, the high voltage (e.g., 25.2 V) of the +power line 10 connected through an R7 resistance is applied to the eighth communication line 45. At this time, a high signal (e.g., battery voltage (e.g., 25.2V)*R9/(R7+R8+R9)) may be input to the first processor 1131 through the first voltage divider 1137. On the other hand, when the second processor 2410 outputs the low signal (e.g., 0 V), the switch device (e.g., N-channel FET) included in the second circuit 2455 is in an on state, and thus, the voltage of the eighth communication line 45 may be 0 V (Low), and 0 V (Low) may also be input to the first processor 1131. That is, when the second processor 2410 outputs the high signal (e.g., 3.3 V) to transmit the data signal (e.g., SDA), the high signal may be input to the first processor 1131 through the eighth communication line 45, and when the processor 2410 outputs the low signal 0 V to transmit the data signal (e.g., SDA), the low signal 0 V may be input to the first processor 1131 through the eighth communication line 45.

According to an embodiment of the disclosure, when the vacuum cleaner body 1000 and the brush apparatus 2000 communicate using an I2C, high voltage signals may be transmitted and received through the sixth communication line 43, the seventh communication line 44, and the eighth communication line 45, and thus, communication between the vacuum cleaner body 1000 and the brush apparatus 2000 may be resistant to noise.

Figure 35:
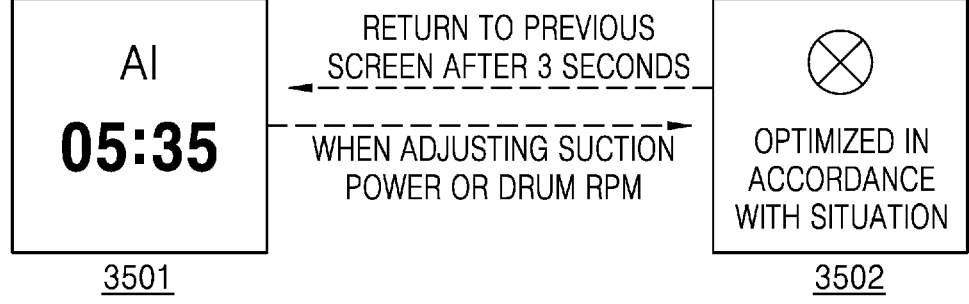
FIG. 35 is a diagram illustrating an operation in which a cordless vacuum cleaner outputs an operating state notification, according to an embodiment of the disclosure.

FIG. 35 is a diagram illustrating an operation in which the cordless vacuum cleaner 100 outputs an operating state notification according to an embodiment of the disclosure.

According to an embodiment of the disclosure, when a user selects an AI mode, the vacuum cleaner body 1000 may display a first graphical user interface (GUI) 3501 on an output interface (e.g., a liquid crystal display (LCD)). The first GUI 3501 may indicate that the cordless vacuum cleaner 100 is operating in the AI mode, and may indicate an available cleaning time (a remaining battery usage time) in the AI mode.

When the vacuum cleaner body 1000 identifies a usage environment state of the brush apparatus 2000 using the AI model, and adjust a strength of the suction power of the suction motor 1110 or a drum RPM of the brush apparatus 2000 according to the usage environment state of the brush apparatus 2000, a second GUI 3502 may be displayed on the output interface of the vacuum cleaner body 1000. For example, the second GUI 3502 may include a notification indicating "optimized in accordance with the situation".

When a certain time (e.g., 3 seconds) elapses after the second GUI 3502 is displayed on the output interface, the first GUI 3501 may be displayed again. Thereafter, when the strength of the suction power of the suction motor 1110 or the drum RPM of the brush apparatus 2000 changes again according to the usage environment state of the brush apparatus 2000, the second GUI 3502 may be displayed again.

FIG. 36 is a diagram illustrating a GUI of the cordless vacuum cleaner 100 according to an embodiment of the disclosure.

According to an embodiment of the disclosure, when a user selects the AI mode and communication between the vacuum cleaner body 1000 and the brush apparatus 2000 is possible, the vacuum cleaner body 1000 may display a first GUI 3601 on an output interface (e.g., an LCD). The first GUI 3601 may indicate that the cordless vacuum cleaner 100 is operating in the AI mode.

According to an embodiment of the disclosure, when communication between the vacuum cleaner body 1000 and the brush apparatus 2000 is impossible, the vacuum cleaner body 1000 may display a second GUI 3602 on the output interface (e.g., the LCD). The second GUI 3602 may include a notification that an operation of the cordless vacuum cleaner 100 is impossible in the AI mode. For example, when the vacuum cleaner body 1000 does not receive a second signal for a certain time after transmitting a first signal through the signal line 30, the vacuum cleaner body 1000 may determine that communication with the brush apparatus 2000 is impossible. When the vacuum cleaner body 1000 determines that communication with the brush apparatus 2000 is impossible, the vacuum cleaner body 1000 may output a notification indicating that the operation of the vacuum cleaner body 1000 is impossible in the AI mode through the output interface.

According to an embodiment of the disclosure, when the user presses a power button and selects the AI mode, but an operating current of the brush apparatus 2000 is not detected, the brush apparatus 2000 may not be properly coupled to the cordless vacuum cleaner 100. Accordingly, the vacuum cleaner body 1000 may display a third GUI 3603 requesting to check the state of the brush apparatus 2000. In addition, according to an embodiment of the disclosure, when the vacuum cleaner body 1000 determines that communication with the brush apparatus 2000 is impossible or when the load of the brush apparatus 2000 is greater than a threshold value (an overload state), the vacuum cleaner body 1000 may display the third GUI 3603 requesting to check the state of the brush apparatus 2000.

Meanwhile, according to an embodiment of the disclosure, when the vacuum cleaner body 1000 determines that communication with the brush apparatus 2000 is impossible, the vacuum cleaner body 1000 may switch an operation mode from an AI mode to a normal mode, and output a GUI corresponding to the normal mode through the output interface.

According to an embodiment of the disclosure, the cordless vacuum cleaner 100 identifying the current usage environment state of the brush apparatus 2000 using an AI model, and automatically adjusting the strength of the suction power of the suction motor 1110 according to the current usage environment state of the brush apparatus 2000 may be provided.

According to an embodiment of the disclosure, the cordless vacuum cleaner 100 identifying the current usage environment state of the brush apparatus 2000 using the AI model, and automatically adjusting the RPM of a rotating brush of the brush apparatus 2000 according to the current usage environment state of the brush apparatus 2000 may be provided.

The cordless vacuum cleaner 100 according to an embodiment of the disclosure may include the suction motor 1110 configured to form a vacuum inside the cordless vacuum cleaner 100, the pressure sensor 1400 configured to measure a flow path pressure inside the cordless vacuum cleaner 100, the load detection sensor 1134 configured to measure a load of the brush apparatus 2000, the memory 1900 storing an AI model trained to infer a usage environment state of the brush apparatus 2000, and the at least one processor 1001. The at least one processor 1001 may obtain data about the flow path pressure measured by the pressure sensor 1400 from the pressure sensor 1400.

The at least one processor 1001 may obtain data related to the load of the brush apparatus 2000 through the load detection sensor 1134. The at least one processor 1001 may identify a current usage environment state of the brush apparatus 2000 by applying the data related to the flow path pressure and the data related to the load of the brush apparatus to the AI model stored in the memory 1900. The at least one processor 1001 may adjust the strength of the suction power of the suction motor 1110 based on the identified current usage environment state of the brush apparatus 2000.

The data related to the load of the brush apparatus 2000 according to an embodiment of the disclosure may include at least one of an operating current of the brush apparatus 2000, a voltage applied to the brush apparatus 2000, or a power consumption of the brush apparatus 2000.

The current usage environment state of the brush apparatus 2000 according to an embodiment of the disclosure may include at least one of a state of a surface to be cleaned on which the brush apparatus 2000 is currently located, a relative location state of the brush apparatus 2000 within the surface to be cleaned, or a state of the brush apparatus 2000 lifted from the surface to be cleaned.

The at least one processor 1001 according to an embodiment of the disclosure may determine a target RPM of a rotating brush of the brush apparatus 2000 based on the identified current usage environment state of the brush apparatus 2000. The at least one processor 1001 may transmit a control signal indicating the determined target RPM of the rotating brush to the brush apparatus 2000.

The at least one processor 1001 according to an embodiment of the disclosure may receive a signal indicating a current state of the brush apparatus 2000 from the brush apparatus 2000 in response to the control signal.

The at least one processor 1001 according to an embodiment of the disclosure may determine at least one of a color or brightness of the lighting device 2300 included in the brush apparatus 2000 based on the identified current usage environment state of the brush apparatus 2000. The at least one processor 1001 may transmit a control signal indicating at least one of the determined color or brightness of the lighting device 2300 to the brush apparatus 2000.

The at least one processor 1001 may select a first AI model corresponding to a first type of the brush apparatus 2000 from among a plurality of AI models stored in the memory 1900. The at least one processor 1001 may identify the current usage environment state of the brush apparatus 2000 by applying the data about the flow path pressure and the data related to the load of the brush apparatus 2000 to the selected first AI model.

The brush apparatus 2000 according to an embodiment of the disclosure may include a first ID resistance indicating the first type of the brush apparatus 2000. The at least one processor 1001 may identify the first type of the brush apparatus 2000 corresponding to the first ID resistance based on a first voltage value input to the suction motor 1110.

The at least one processor 1001 may receive a data signal indicating the first type of brush apparatus 2000 from the brush apparatus 2000.

The at least one processor 1001 may modify a parameter value of the AI model by applying the strength of the suction power of the suction motor 1110 to the AI model. The at least one processor 1001 may identify the current usage environment state of the brush apparatus 2000 by applying the data about the flow path pressure and the data related to the load of the brush apparatus 2000 to the AI model having the modified parameter value.

The AI model according to an embodiment of the disclosure may include at least one of a SVM model, a neural network model, a random forest model, or a graphical Model.

The pressure sensor 1400 according to an embodiment of the disclosure may include at least one of an absolute pressure sensor or a relative pressure sensor.

The pressure sensor 1400 according to an embodiment of the disclosure may be provided in the suction duct 40 of the vacuum cleaner body 1000 including the suction motor 1110.

The at least one processor 1001 may obtain a difference between a first pressure value measured through the pressure sensor 1400 before driving the suction motor 1110 and a second pressure value measured through the pressure sensor 1400 after driving the suction motor 1110 as the data about the flow path pressure.

The at least one processor 1001 may the strength of the suction power of the suction motor 1110 to a first strength that is a medium intensity when the current usage environment state of the brush apparatus 2000 is a state of cleaning a hard floor. The at least one processor 1001 may adjust the strength of the suction power of the suction motor 1110 to a second strength lower than the first strength when the current usage environment state of the brush apparatus 2000 is a state of cleaning a mat or a high-density carpet. The at least one processor 1001 may adjust the strength of the suction power of the suction motor 1110 to a third strength higher than the first strength when the current usage environment state of the brush apparatus 2000 is a state of cleaning a normal carpet.

The at least one processor 1001 may adjust the strength of the suction power of the suction motor 1110 to a minimum intensity, and determine the target RPM of the brush apparatus 2000 to a lowest stage when the current usage environment state of the brush apparatus 2000 is a state of being lifted from the surface to be cleaned by a certain distance or more.

The least one processor 1001 may adjust the strength of the suction power of the suction motor 1110 to a maximum intensity when the current usage environment state of the brush apparatus 2000 is a state of cleaning a wall corner.

The at least one processor 1001 may adjust a trip level of the brush apparatus 2000 based on the adjusted strength of the suction power of the suction motor 1110.

The at least one processor 1001 may identify a transition of the current usage environment state of the brush apparatus 2000 by applying the data related to the flow path pressure and the data related to the load of the brush apparatus 2000 to the AI model. The at least one processor 1001 may adjust the strength of the suction power of the suction motor 1110 as the transition of the current usage environment state of the brush apparatus 2000 is identified.

A method, performed by the cordless vacuum cleaner 100, of automatically adjusting the strength of a suction power of the suction motor 1110 according to an embodiment of the disclosure may include obtaining data about a flow path pressure measured by the pressure sensor 1400 of the cordless vacuum cleaner 100, obtaining data related to a load of the brush apparatus 2000 through the load detection sensor 1134, identifying a current usage environment state of the brush apparatus 2000 by applying the data related to the flow path pressure and the data related to the load of the brush apparatus 2000 to a previously trained AI model, and adjusting the strength of the suction power of the suction motor 1110 based on the identified current usage environment state of the brush apparatus 2000.

According to an embodiment of the disclosure, a method of operating a vacuum cleaner may include coupling a vacuum attachment to the vacuum cleaner; identifying, by a processor of the vacuum cleaner, the vacuum attachment coupled to the vacuum cleaner as a first vacuum attachment among a plurality of different types of vacuum attachments configured to couple with the vacuum cleaner; selecting, by the processor, a first artificial intelligence (AI) model corresponding to the first vacuum attachment among a plurality of different AI models corresponding to the different types of vacuum attachments; delivering electrical power from a battery of the vacuum to a suction motor (1110) of the vacuum cleaner and generating a suction force by the vacuum cleaner based on an amount of power consumed by the suction motor; and controlling, by the processor, the amount of power delivered from the battery based at least in part on the selected first AI model to dynamically adjust the suction force.

According to an embodiment of the disclosure, the method of operating a vacuum cleaner may include determining, by the processor, a usage environment state of the first vacuum attachment; and adjusting the amount of power in response to a change in the usage environment state.

According to an embodiment of the disclosure, the determining the usage environment state may include measuring, by a pressure sensor (1400) in signal communication with the processor, a flow path pressure inside the vacuum cleaner; measuring, by a load detection sensor (1134) in signal communication with the processor, a load of the vacuum attachment; and determining the usage environment state by applying the data related to the flow path pressure and the data related to the load of the brush apparatus (2000) to the AI model.

According to an embodiment of the disclosure, the method of operating a vacuum cleaner may include replacing the first vacuum attachment with a second vacuum attachment different than the first vacuum attachment; identifying, by the processor, the second vacuum attachment; and selecting, by the processor, a second AI model corresponding to the second vacuum attachment.

According to an embodiment of the disclosure, the method of operating a vacuum cleaner may include controlling, by the processor, the amount of power delivered from the battery based at least in part on the second AI model to dynamically adjust the suction force.

A device-readable storage medium may be provided in the form of a non-transitory storage medium. In this regard, the term "non-transitory storage medium" simply means that the storage medium is a tangible device and does not include a signal (e.g., an electromagnetic wave), but this term does not differentiate between where data is semi-permanently stored in the storage medium and where the data is temporarily stored in the storage medium. For example, the "non-transitory storage medium" may include a buffer in which data is temporarily stored.

According to an embodiment of the disclosure, the method according to various embodiments disclosed herein may be included and provided in a computer program product. The computer program product may be traded as a commodity between a seller and a buyer. The computer program product may be distributed in the form of a machine-readable storage medium (e.g., CD-ROM), or be distributed (e.g., downloaded or uploaded) online via an application store, or between two user devices (e.g., smartphones) directly. In the case of online distribution, at least a part of the computer program product (e.g., a downloadable app) may be temporarily stored or temporarily generated in a device-readable storage medium, such as a memory of a manufacturer server, an application store server, or a relay server.

The invention claimed is:

1. A cordless vacuum cleaner comprising:
a vacuum cleaner body; and
a brush apparatus detachably coupled to the vacuum cleaner body,
wherein the vacuum cleaner body comprises:
a suction motor configured to generate a vacuum inside the cordless vacuum cleaner;
a pressure sensor configured to measure a flow path pressure inside the cordless vacuum cleaner;
a load detection sensor configured to measure an electrical load of the brush apparatus;
a memory storing at least one artificial intelligence (AI) model trained to identify a type of floor to which the brush apparatus is applied, wherein the at least one AI model is dynamically modifiable; and
at least one processor configured to:
determine an electrical input power consumed by the cordless vacuum cleaner and determine a suction power of the suction motor based on the electrical input power, modify at least one parameter of the at least one AI model stored in the memory based on the determined suction power of the suction motor,
determine the flow path pressure through the pressure sensor,
determine the electrical load of the brush apparatus through the load detection sensor,
identify a current type of floor by applying the flow path pressure and the electrical load of the brush apparatus to the at least one AI model having the modified at least one parameter, and
adjust the suction power of the suction motor, based on the current type of floor identified by the at least one AI model having the modified at least one parameter.

2. The cordless vacuum cleaner of claim 1, wherein the electrical load of the brush apparatus comprises at least one of an operating current of the brush apparatus, a voltage applied to the brush apparatus, or a power consumption of the brush apparatus.

3. The cordless vacuum cleaner of claim 1, wherein the current type of floor comprises at least one of a hard floor, a carpet, or a mat.

4. The cordless vacuum cleaner of claim 1, wherein the at least one processor is configured to:
determine a target revolutions per minute (RPM) of a rotating brush of the brush apparatus, based on the identified current type of floor, and
transmit a control signal indicating the determined target RPM of the rotating brush to the brush apparatus.

5. The cordless vacuum cleaner of claim 4, wherein the at least one processor is configured to receive a signal indicating a current state of the brush apparatus from the brush apparatus, in response to the control signal.

6. The cordless vacuum cleaner of claim 1, wherein the at least one processor is configured to:
determine at least one of a color or a brightness of a lighting device included in the brush apparatus, based on the identified current type of floor, and
transmit a control signal indicating at least one of the determined color or the brightness of the lighting device to the brush apparatus.

7. The cordless vacuum cleaner of claim 1, wherein the at least one processor is configured to:
select a first dynamically modifiable AI model corresponding to a first type of the brush apparatus from among a plurality of dynamically modifiable AI models stored in the memory, and
identify the current type of floor by applying the flow path pressure and the electrical load of the brush apparatus to the selected first dynamically modifiable AI model.

8. The cordless vacuum cleaner of claim 7, wherein the brush apparatus has assigned thereto a first identification (ID) resistance indicating a resistance that is applied to the suction motor when the first type of the brush apparatus is coupled to the to the cordless vacuum cleaner, and
wherein the at least one processor is configured to identify the first type of the brush apparatus corresponding to the first ID resistance by determining a first voltage value input to the suction motor via an electrical connection established through an electrical circuit that is established between a first electrical interface of the cordless vacuum cleaner and a corresponding second electrical interface of the detachably coupled first type of brush apparatus when the first type of the brush apparatus is detachably coupled to the to the cordless vacuum cleaner.

9. The cordless vacuum cleaner of claim 7, wherein the at least one processor is configured to receive a data signal indicating the first type of the brush apparatus from the brush apparatus via a signal line different from the power lines, the data signal being generated by the brush apparatus, the brush apparatus transmitting the data signal to the at least one processor of the vacuum cleaner body by controlling an operation of a switch element connected to the signal line.

10. The cordless vacuum cleaner of claim 1, wherein the at least one processor is configured to:

modify a parameter value of the at least one AI model by applying the current strength of the suction power of the suction motor to the at least one AI model, and identify the current type of floor by applying the flow path pressure and the electrical load of the brush apparatus to the at least one AI model having the modified parameter value.

11. The cordless vacuum cleaner of claim 1, wherein the at least one dynamically modifiable AI model comprises at least one of a support vector machine (SVM) model, a neural network model, a random forest model, or a graphical model.

12. The cordless vacuum cleaner of claim 1, wherein the pressure sensor comprises at least one of an absolute pressure sensor or a relative pressure sensor.

13. The cordless vacuum cleaner of claim 1, further comprising a vacuum cleaner that includes the suction motor, wherein the pressure sensor is disposed in a suction duct of the vacuum cleaner body.

14. The cordless vacuum cleaner of claim 1, wherein the at least one processor is configured to obtain, as the flow path pressure, a difference between a first pressure value measured through the pressure sensor before driving the suction motor and a second pressure value measured through the pressure sensor after driving the suction motor.

15. The cordless vacuum cleaner of claim 1, wherein the at least one processor is configured to:

adjust the current strength of the suction power of the suction motor to a first strength that is a medium intensity when the current type of floor is a hard floor, adjust the current strength of the suction power of the suction motor to a second strength lower than the first strength when the current type of floor is a mat or a high-density carpet, and adjust the current strength of the suction power of the suction motor to a third strength higher than the first strength when the current type of floor is a normal carpet.

16. The cordless vacuum cleaner of claim 15, wherein the at least one processor is further configured to:

identify that the brush device is lifted from a surface to be cleaned based on the flow path pressure and the electrical load, and based on identifying that the brush device is lifted from the surface to be cleaned, adjust the current strength of the suction power of the suction motor to a fourth strength that is a minimum intensity and is less than the second strength.

17. The cordless vacuum cleaner of claim 15, wherein the at least one processor is configured to adjust the current strength of the suction power of the suction motor to a fifth strength that is a maximum intensity and is greater than the third strength when the brush apparatus is applied to a wall corner.

18. The cordless vacuum cleaner of claim 1, wherein the at least one processor is configured to:

identify a transition of the current type of floor to a second type of floor different from the current type of floor by applying the flow path pressure and the electrical load of the brush apparatus to the at least one dynamically modifiable AI model, and adjust the current strength of the suction power of the suction motor as the transition of the current type of floor is identified.

19. A method, performed by a cordless vacuum cleaner, of automatically adjusting a suction power of a suction motor of the cordless vacuum cleaner, the method comprising:

determining an electrical input power consumed by the cordless vacuum cleaner and determine the suction power of the suction motor based on the electrical input power;

modifying at least one parameter of at least one AI model stored in a memory of the cordless vacuum cleaner based on the determined suction power of the suction motor;

obtaining a flow path pressure measured by a pressure sensor of the cordless vacuum cleaner;

obtaining an electrical load of a brush apparatus using a load detection sensor of the cordless vacuum cleaner;

identifying a current type of floor at which the brush apparatus is applied by applying the flow path pressure and the electrical load of the brush apparatus to the at least one AI model having the modified at least one parameter; and adjusting the suction power of the suction motor, based on the current type of floor identified by the at least one AI model having the modified at least one parameter.

* * * * *